US007860781B1

(12) United States Patent  (10) Patent No.: US 7,860,781 B1
Bodi et al.  (45) Date of Patent: Dec. 28, 2010

(54) METHODS AND SYSTEMS FOR ASSET/LOAN MANAGEMENT AND PROCESSING

(75) Inventors: Dave J. Bodi, Overland Park, KS (US); Randall J. Spellins, Little Rock, AR (US); Rick Drescher, Lawrenceville, GA (US); Michael I. Matheson, Grapevine, TX (US); Noel F. Fouts, Arlington, TX (US)

(73) Assignee: Midland Loan Services, Inc., Overland Park, KS (US)

( * ) Notice: Subject to any disclaimer, the term of this patent is extended or adjusted under 35 U.S.C. 154(b) by 1060 days.

(21) Appl. No.: 10/336,501

(22) Filed: Jan. 3, 2003

Related U.S. Application Data

(60) Provisional application No. 60/345,851, filed on Jan. 4, 2002.

(51) Int. Cl.
*G06Q 40/00* (2006.01)
(52) U.S. Cl. .............................. 705/38; 705/35; 705/36
(58) Field of Classification Search .................. 705/35, 705/36, 38
See application file for complete search history.

(56) References Cited

U.S. PATENT DOCUMENTS

| | | | | |
|---|---|---|---|---|
| 4,736,294 | A | * | 4/1988 | Gill et al. ....................... 705/38 |
| 4,914,587 | A | | 4/1990 | Clouse |
| 5,241,466 | A | | 8/1993 | Perry et al. |
| 5,323,315 | A | | 6/1994 | Highbloom |
| 5,544,255 | A | | 8/1996 | Smithies et al. |
| 5,615,268 | A | | 3/1997 | Bisbee et al. |
| 5,629,981 | A | | 5/1997 | Nerlikar |
| 5,630,127 | A | | 5/1997 | Moore et al. |
| 5,699,528 | A | | 12/1997 | Hogan |
| 5,765,144 | A | | 6/1998 | Larche et al. |
| 5,790,260 | A | | 8/1998 | Myers |
| 5,813,009 | A | | 9/1998 | Johnson et al. |
| 5,870,721 | A | | 2/1999 | Norris |
| 5,893,079 | A | * | 4/1999 | Cwenar ..................... 705/36 R |
| 5,930,759 | A | | 7/1999 | Moore et al. |
| 5,930,778 | A | | 7/1999 | Geer |
| 5,963,925 | A | | 10/1999 | Kolling et al. |

(Continued)

OTHER PUBLICATIONS

"Defining Business Rules—What Are They Really?" http://businessrulesgroup.org/first_paper/, Mar. 4, 2001. Date taken from www.archive.org. Archive page attached.

(Continued)

*Primary Examiner*—James A Kramer
*Assistant Examiner*—Samica L Norman
(74) *Attorney, Agent, or Firm*—K&L Gates LLP

(57) ABSTRACT

In one embodiment of the present methods and systems, in a servicing entity, a computer-assisted method is provided for managing commercial mortgages. The method includes storing information associated with a plurality of mortgages in a data model; allowing a plurality of participants to access the mortgage information to enable shared servicing of the plurality of mortgages; storing a set of business rules in a database, the set of business rules being configured for application to the mortgage information, the database being operatively associated with the data model; and, allowing the plurality of participants to access the mortgage information from origination of the plurality of mortgages to disposition of the plurality of mortgages. System and computer-readable media embodiments associated with the present method embodiments are also provided.

29 Claims, 67 Drawing Sheets

U.S. PATENT DOCUMENTS

| | | | |
|---|---|---|---|
| 5,983,206 | A | 11/1999 | Oppenheimer |
| 5,987,434 | A | 11/1999 | Libman |
| 5,995,947 | A | 11/1999 | Fraser et al. |
| 6,012,047 | A | 1/2000 | Mazonas |
| 6,016,482 | A * | 1/2000 | Molinari et al. ............... 705/35 |
| 6,021,202 | A | 2/2000 | Anderson et al. |
| 6,029,887 | A | 2/2000 | Furuhashi et al. |
| 6,043,819 | A | 3/2000 | LeBrun et al. |
| 6,070,151 | A | 5/2000 | Frankel |
| 6,076,072 | A | 6/2000 | Libman |
| 6,105,007 | A | 8/2000 | Norris |
| 6,131,810 | A | 10/2000 | Weiss et al. |
| 6,185,683 | B1 | 2/2001 | Ginter et al. |
| 6,209,095 | B1 | 3/2001 | Anderson et al. |
| 6,223,983 | B1 | 5/2001 | Kjonaas et al. |
| 6,226,623 | B1 | 5/2001 | Schein |
| 6,233,566 | B1 | 5/2001 | Levine et al. |
| 6,237,096 | B1 | 5/2001 | Bisbee et al. |
| 6,249,775 | B1 | 6/2001 | Freeman |
| 6,266,054 | B1 | 7/2001 | Lawton et al. |
| 6,266,666 | B1 | 7/2001 | Ireland et al. |
| 6,270,457 | B1 | 8/2001 | Bardy |
| 6,275,824 | B1 | 8/2001 | O'Flaherty |
| 6,279,008 | B1 | 8/2001 | Ng et al. |
| 6,292,788 | B1 | 9/2001 | Roberts |
| 6,324,541 | B1 | 11/2001 | de l'Etraz et al. |
| 6,345,262 | B1 | 2/2002 | Madden |
| 6,367,013 | B1 | 4/2002 | Bisbee et al. |
| 6,389,588 | B1 | 5/2002 | Wadhwa |
| 6,460,021 | B1 | 10/2002 | Kirksey |
| 6,615,187 | B1 | 9/2003 | Ashenmil et al. |
| 7,107,239 | B2 | 9/2006 | Graff |
| 7,178,422 | B2 | 2/2007 | Armstrong et al. |
| 7,181,422 | B1 | 2/2007 | Philip et al. |
| 7,315,841 | B1 | 1/2008 | McDonald et al. |
| 7,340,427 | B1 | 3/2008 | Cornell |
| 7,386,507 | B2 | 6/2008 | Davis et al. |
| 2001/0034701 | A1 * | 10/2001 | Fox et al. ....................... 705/38 |
| 2001/0047326 | A1 * | 11/2001 | Broadbent et al. ............ 705/38 |
| 2002/0019804 | A1 | 2/2002 | Sutton |
| 2002/0029207 | A1 | 3/2002 | Bakalash et al. |
| 2002/0038285 | A1 | 3/2002 | Golden et al. |
| 2002/0055905 | A1 | 5/2002 | Jannah et al. |
| 2003/0018558 | A1 | 1/2003 | Heffner et al. |
| 2003/0018563 | A1 | 1/2003 | Kilgour et al. |
| 2003/0050884 | A1 * | 3/2003 | Barnett ......................... 705/35 |
| 2004/0019558 | A1 | 1/2004 | McDonald et al. |
| 2005/0102225 | A1 | 5/2005 | Oppenheimer et al. |
| 2007/0067229 | A1 * | 3/2007 | Parthasarathy ............... 705/35 |

OTHER PUBLICATIONS

Search Report on word mark "Enterprise" obtained from Trademark Electronic Search System (TESS), http://tess.uspto.gov, filed Jul. 12, 2000.
Brochure "Zenetics company & product information," Apr. 2001.
Website "Business Rules and Mortgage Banking," http://www.astera.com/CentMortgWP.html, accessed on Sep. 10, 2002.
"Business Rules Primer," obtained from http://www.astera.com accessed on Mar. 2000.
"Enterprise Loan Management System" (CD-ROM) Dec. 2001.
"Loan Securitization," printed from http://www.mortgage-investments.com/Investment_in_mortgages/loan_securitization,htm, Internet site, accessed on Oct. 17, 2001, 1 page.
"A Simplified Example of Small Business Loan Securitization," printed from http://minneapolisfed.org/pubs/region/95-09/reg959-1.html, Internet site, accessed on Oct. 17, 2001, 1 page.
U.S. Appl. No. 09/998,152, filed Nov. 30, 2001.
Inventorying. (n.d.). The American Heritage® Dictionary of the English Language, Fourth Edition. Retrieved Jun. 12, 2007, from Dictionary.com website: http://dictionary.reference.com/browse/inventorying.
*Enterprise!* Loan Management System, Version 3.3, CMBS Reporting Module—Product Summary, Updated December, Midland Loan Services, 2001.
Enterprise! Loan Management System, Version 3.3 Core System—Product Summary, Midland Loan Services.
Enterprise! Loan Management System, Version 3.3 Life Insurance Accounting Module—Product Summary Midland Loan Services, Sep. 2001.
State of Research and Development at Midland Loan Services, Midland Loan Services.
Enterprise! (printout of video), Midland Loan Services.
"Enterprise!" Univest Financial Group, LLC, Loan Management System Demo for CSSA Conference, Apr. 27, 1999.
"Enterprise", Version 3.2, Midland Loan Services.
Shea, L., "Monitor an Enterprise of SQL Servers—Automating Management by Exception with Perl", The 3rd Large Installation System Administration of Windows NT Conference, Aug. 2000. Accessed Dec. 26, 2001 at http://www.usenix.org/events/lisant2000/full_papers/shea/shea_html/.
"Object/Relational Mapping using Generic Business Objects", Difference between Generic Business Objects and Custm Business Objects, 4 pages. Accessed Dec. 31, 2001 at http://userserols.com/goldinj/mtos/gbos.html.
Ambler S., "Object-Oriented Business Rules", How to record the transactional logic behind UML object models, Software Development Online, Jun. 2000, 5 pages. Accessed Dec. 31, 2001 at http://www.sdmagazine.com/documents/s=743/sdm0006j/0006j.htm.
Dr. Paul Dorsey, "Implementing Business Rules", Dulcian, Inc., 1998, 12 pages. Accessed Dec. 31, 2001 at http://www.dulcian.com/papers/Implementing%20Business%20Rules.htm.
"Project Horizon—Operation A to Z", 9 pages, in Power Point form.
"Midland Loan Services—E! PAAS Data Design", 65 pages.
"Data Dictionary", Aug. 25, 2001, 131 pages.
"ZENetics company & product information," brochure, Apr. 2001, 26 pages.
ZENetics, dual-sided, tri-fold brochure, Arlington, Texas, 2 pages.
Office Action dated Feb. 20, 2009 in U.S. Appl. No. 12/140,621.
"SS&C Technologies, Inc.—Markets: Real Estate: Loan Management," printed from http://www.sscinc.com/markets/real_estate/default.asp?P=2, Internet site, accessed on Nov. 27, 2001, 1 page.
"SS&C Technologies, Inc.— LMS: Screen Shots" "Report Screen Shot," printed from http://www.sscinc.com/lms/screen_shots.asp?P=2, Internet site, accessed on Nov. 27, 2001, 1 page.
"SS&C Technologies, Inc.—LMS: Screen Shots" "Investor Reporting Module-Pool Setup," printed from http://www.sscinc.com/lms/screen_shots.asp?P=3, Internet site, accessed on Nov. 27, 2001, 1 page.
"SS&C Technologies, Inc.—LMS: Screen Shots" "Collateral Management," printed from http://www.sscinc.com/lms/screen_shots.asp?P=5, Internet site, accessed on Nov. 27, 2001, 1 page.
"SS&C Technologies, Inc.—LMS: Screen Shots" "SnapShots Screen Shot" printed from http://www.sscinc.com/lms/screen_shots.asp?P=9, Internet site, accessed on Nov. 27, 2001, 1 page.
Definition of "Associate," *Webster's Revised Unabridged Dictionary*, (1913+1828)—The ARTFL Project,, 1913 edition, printed from http://machaut.uchicago.edu/?action=seach&word=associated& resource=Website%27s&q, Internet site, accessed on Feb. 17, 2009, 3 pages.
Midland Loan Services advertising tri-fold pocket folder, Overland Park, Kansas, Sep. 2002, 8 pages.
Office Action dated Nov. 6, 2009 in U.S. Appl. No. 12/140,621.

* cited by examiner

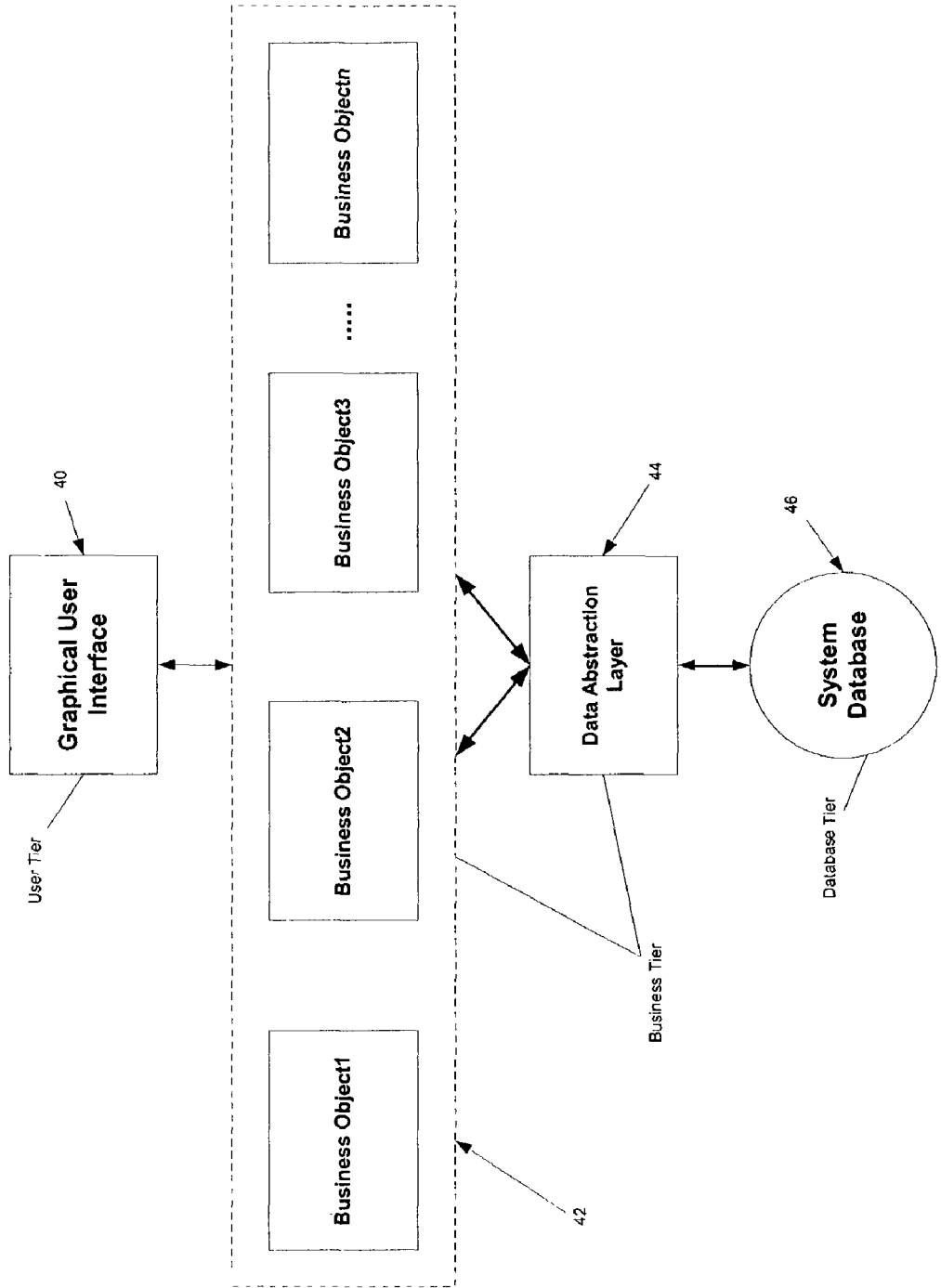

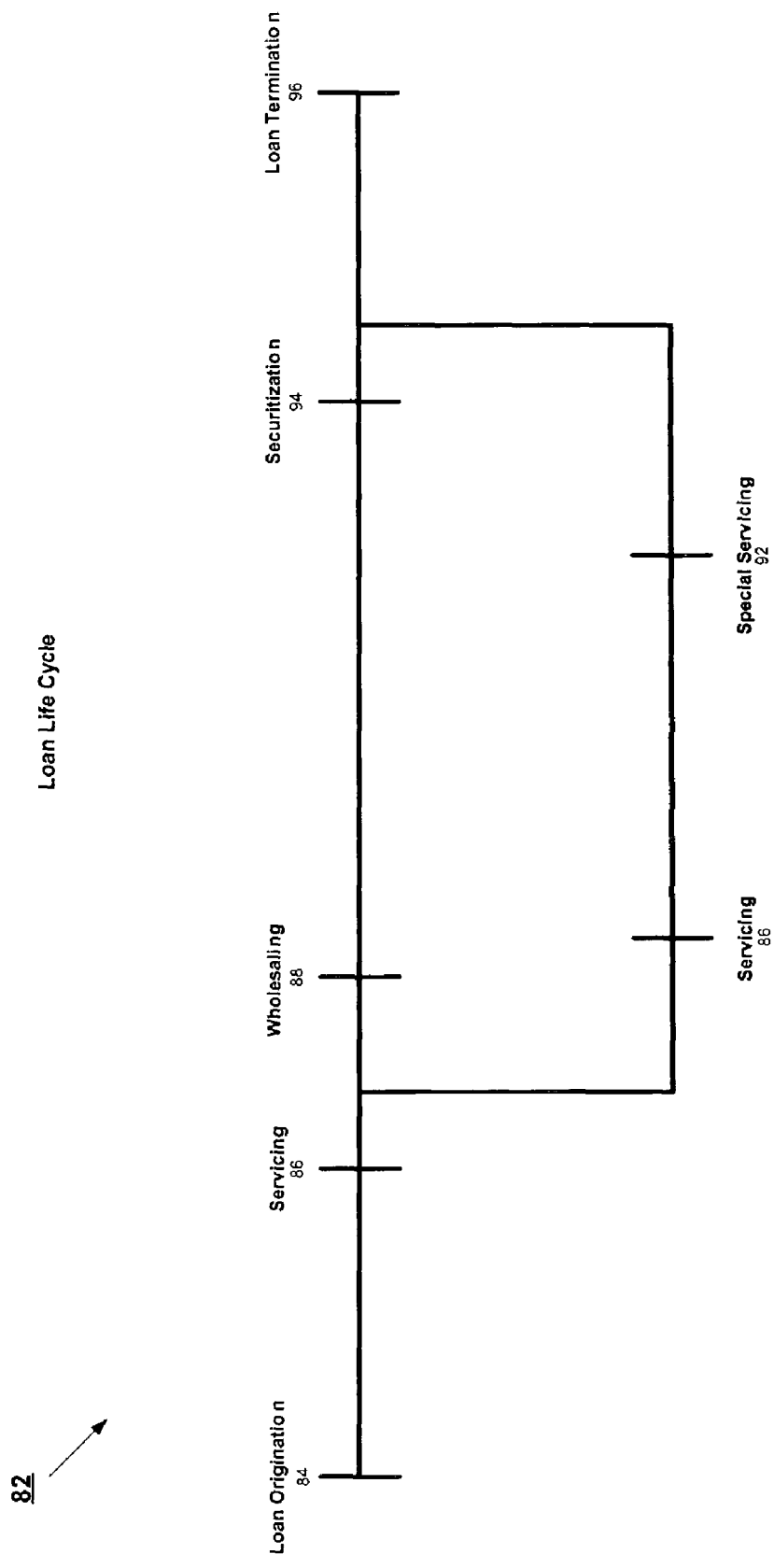

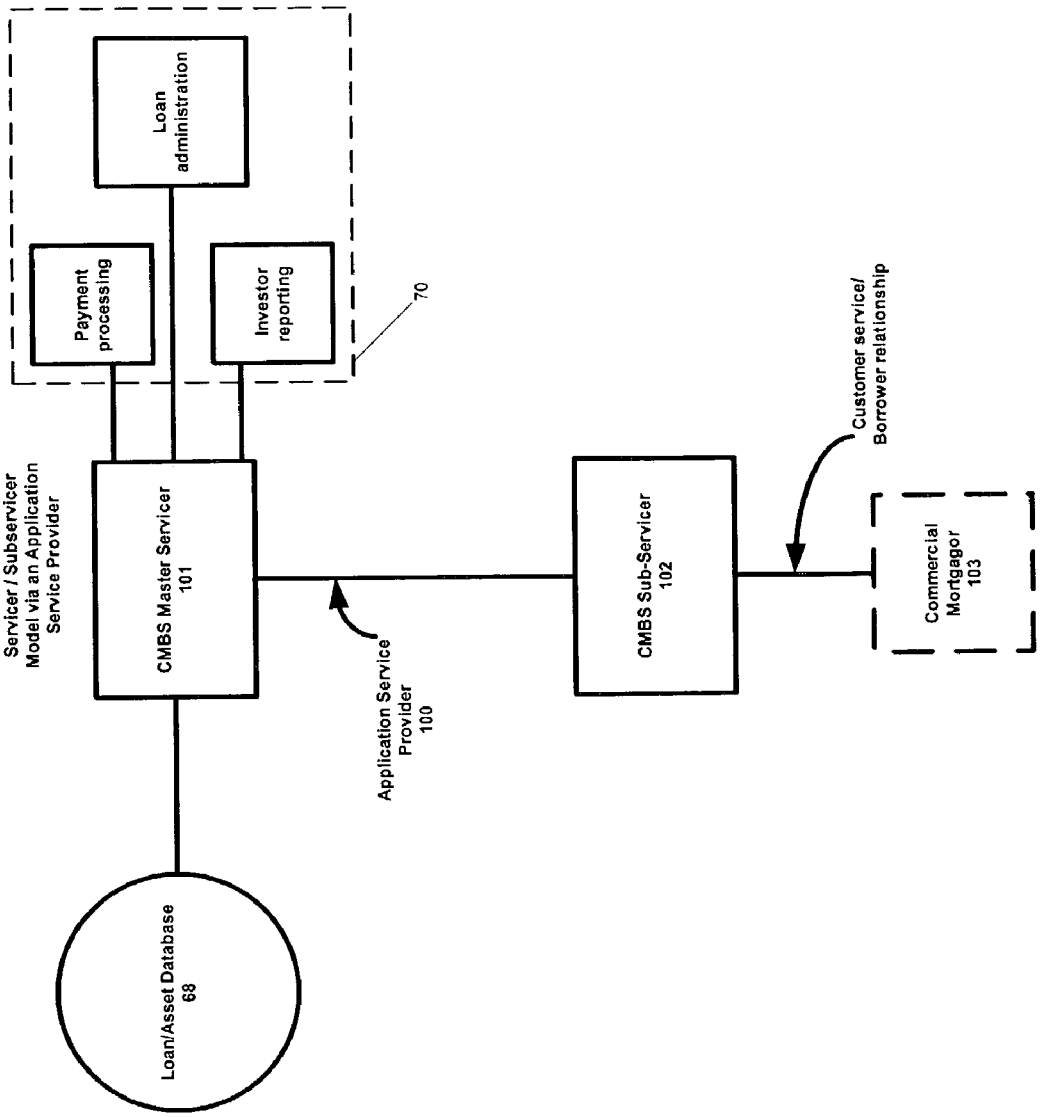

Investment Life Cycle Model

Figure 5A
Busines Rule Storage Example
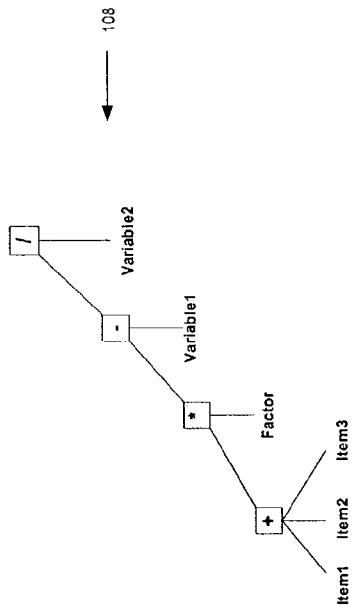
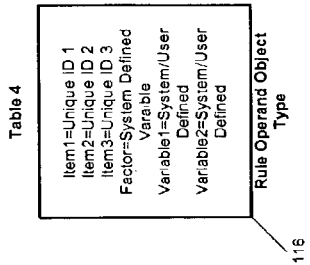
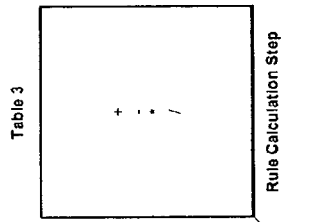
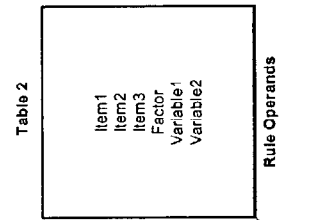
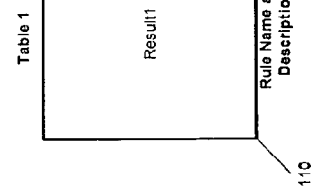

METHODS AND SYSTEMS FOR ASSET/LOAN MANAGEMENT AND PROCESSING

CROSS REFERENCE TO RELATED APPLICATION

This application claims priority to U.S. Provisional Application Ser. No. 60/345,851, filed Jan. 4, 2002, which is incorporated herein by reference.

BACKGROUND

In the early 1990's, the commercial real estate finance industry was just beginning to recognize the potential of accessing capital markets through Commercial Mortgage Backed Securities (CMBS). Traditionally, commercial mortgages had been originated and held on balance sheets, with servicing provided by the originating mortgage banker or portfolio lender. Entities such as the Resolution Trust Corporation (RTC), for example, stimulated the CMBS industry by bundling and securitizing multiple performing commercial and multifamily loans. These transactions placed pressure on servicers to handle the change in volume and complexity.

Most commercial loan servicers employed residential asset/loan servicing systems that had been reprogrammed to accommodate the commercial market. Built on mid-range or mainframe platforms, however, these systems—although to a degree stable and reliable—were usually rigid and hard to modify or scale without enormous time and expense. Systems administration and maintenance costs, for example, as well as hardware capital expenditures, were substantial.

In mid-range or mainframe environments, information is housed and maintained at the server level, and therefore user workstations have limited flexibility. These platforms also require costly proprietary hardware and dedicated, specialized systems resources. A relatively minor change in functionality could require redeployment of the entire system. While being useful for a comparatively simpler, more standardized residential mortgage market, these platforms are less than ideal for the complexity of commercial loan servicing—and the rapidly evolving CMBS sector of the industry.

Technology providers then began developing client/server applications presented on the Windows® platform made universal by Microsoft Corporation, for example. Graphical User Interfaces (GUIs), or point-and-click screens, replaced the prior "green" screens of mid-range and mainframe computing environments, as technology providers worked to meet customer demand for user-friendly front-ends. In addition to a Windows-based environment, client/server systems offered users more flexibility, because individual copies of the software resided on each workstation. This made the systems easier to use, but the underlying technology remained difficult and costly to modify and maintain. With software at every desktop, however, administration costs escalated and performance declined as the user community grew. Modifying a client/server system was also generally a time-consuming and expensive endeavor.

By the mid-1990's, the CMBS market had taken hold and was growing rapidly. One study showed, for example, that CMBS issuance in the United States grew from less than $18 billion in 1995 to more than $77 billion in 1998—a four-year increase of more than 400 percent. Borrowers were attracted to the availability of high leverage at relatively low rates on a non-recourse basis, and investors, in turn, benefited from high risk-adjusted returns, diversity and liquidity. However, CMBS investors lacked the implicit agency assurance the residential mortgage-backed securities market enjoyed. There was no commercial equivalent to Fannie Mae or Freddie Mac, for example, to backstop the industry. Instead, CMBS issuers were able to sell non-investment grade bonds including the first-loss risk to high-yield investors. These B-piece investors had the ability to analyze and price the credit risk of the underlying mortgage collateral, and the capability to control the resolution of defaulted loans through special servicing. The industry relied on loan servicers to provide the information critical to supporting the ongoing surveillance of rating agencies and the risk management B-piece investors. The result has been improved liquidity for CMBS investments, and an active B-piece market.

CMBS servicers have worked to capture and report information demanded by rating agencies and investors. Faced with rapid industry growth, constantly shifting requirements, and limitations of existing technology, CMBS servicers have worked around their core systems to create custom system solutions. With multiple property types and complex loan structures common on CMBS issuance, these custom systems became the status quo for handling a broad range of operational activities and generating reports to rating agencies, trustees and investors. High monthly loan volumes, coupled with short turnarounds, however, strained the systems of servicers. In addition, adequate reporting standards did not exist.

The Commercial Mortgage Securities Association (CMSA®) then introduced a CMBS investor reporting package. The package provided servicers with common standards needed for investor reporting on CMBS transactions. Although CMBS servicers utilized capacity-limited systems and manual processes to capture the data and deliver the reports, the CMSA® package represented a step toward standardization. Some technology vendors have incorporated the CMSA® investor reporting standards into their software packages.

Typically, a commercial, loan servicer would license a core servicing system for loan administration, escrow administration, and payment processing, and then design internal systems to customize information for its CMBS portfolios. These internal systems were often built on a host of different platforms, however, that were difficult to integrate with each other or with the core servicing system. Data integrity across these multiple systems was an issue. What often resulted was an inefficient combination of systems, databases and manual processes.

A majority of servicers continue to struggle to meet CMBS requirements with such inefficient, counter-productive methods and systems. Servicers are subject to adverse fluctuations in the real estate economic environment. Systems currently in place—licensed or proprietary—may have been designed in the context of a strong market, for example, and may have little capacity to adapt to the specific servicing requirements in a down market. A rise in non-performing loans could have a dramatic impact on operations of a servicer, especially a servicer that uses limited-capacity side systems or manual processes to track scheduled versus actual loan balances and protective advances. Servicers using such systems and processes may transfer many loan administration activities to third-party special servicers. In addition, the inability to adapt to market changes could prove a substantial problem to such servicers. CMBS servicers therefore need to use a flexible infrastructure that can adapt to increased loan defaults and resultant special servicer interaction.

There is a widespread recognition that the CMBS servicing industry needs a technology boost. Empowering technologies such as browser-based applications and open relational databases, for example, have helped other industries to reduce costs, streamline operations and leverage information. Recognizing this, financial servicers have created certain web-based systems to service CMBS and have acquired mortgage technology products designed for use by the financial industry.

What follows is a description of certain existing technologies that may be applied to asset/loan servicing and CMBS servicing, in particular. Browser-based applications utilize a browser-server, where the system resides and all data is stored. Each workstation is equipped with a standard browser. These systems are typically hardware independent, allowing a company to choose commercially available workstations. Unlike mid-range, mainframe and client/server applications, browser-based systems are extendible to users located anywhere, at anytime, with maximum utilization and speed, thereby enabling a wide-area network. Familiar navigation functionality provides an Internet browser with the capacity to move readily through the system. Due to their highly robust and reliable operation environments, browser-based applications can accommodate user and data growth with relatively little impact on performance. Changes to the system can be substantially seamless and automatic, taking place at the server level. Users can exchange and integrate internal and external information from other computer applications and languages (including, for example, e-mail and Microsoft® Office), facilitating communication, reducing paperwork and laying the groundwork for e-commerce.

Open relational databases allow users to establish relationships across the database for a high degree of flexibility without sacrificing ease of use. These databases can be integrated with almost all computer platforms and languages. In a highly normalized relational database, changes in business requirements have relatively little or no impact on existing software. A relational database also provides facilities for many different programs to be used as reporting or analytical tools. Sophisticated, ad-hoc queries can be made across any data element. This flexibility can be useful, for example, in handling the dynamic, complex deal structures of the CMBS market.

A business rule is a statement that defines or constrains some aspect of a business. It is intended to assert business structure or to control or influence the behavior of a business. No universally applied business rule standards currently exist to define various phases of commercial mortgage securitization.

Rules-based functionality can be configured to allow servicers to establish business rules and automate manual processes associated with loan processing. With a rules-based system, servicers can manage their portfolios by exception, specifying workflows, exception conditions, and notifications of anomalies at both the server and user levels.

Object-oriented, multi-tier architecture enables long-term reuse of system code components, regardless of the user interface, for rapid application development and functionality changes. In addition to superior modeling of business requirements, this type of system scales as data and users grow, while maintaining relatively high availability and performance.

The present inventors believe that the application of these emerging technologies could dramatically improve asset/loan-servicing environments including, for example, the CMBS environment. Servicers could reduce their hardware and software expenses, system administration and, maintenance costs and user training. Rules-based functionality and management by exception could reduce headcount per loan, enabling personnel to focus on higher value-added activities. By using the Internet to transmit data, the servicer could receive third-party information, such as property operating statements, rent rolls, site inspections, appraisals and the like in an electronic form, which can be directly imported into the servicing system. Special servicers could directly access the system to review and update loan information and communicate with the servicer.

Sub-servicing may also change with the ability to distribute functions through a shared-servicing relationship. The sub-servicer could retain the borrower relationship and customer service functions, while the master servicer could provide the payment processing, loan administration and investor reporting functions. Redundancies and overall costs could be reduced, increasing the value of the servicing rights of both the sub-servicer and master servicer. CMBS investor reporting, including on-line facilities, could be fully automated with improved data integrity.

Another benefit of these advancements is that they need not be reserved only for relatively large servicers that can afford to acquire or license new technology. Ideally suited to the Application Service Provider (ASP) environment, these systems could let small-size and medium-size servicers or sub-servicers affordably access and exploit technology. Improved methods and systems are needed for servicers to have the opportunity to modify existing servicing operations to reduce costs, enhance productivity and better manage their loans.

Database models of existing systems usually account for the processing of assets under the basis of a loan but do not model the business objects. Conventional models generally take the approach that this is a loan system and do not handle ownership of the assets being processed. In addition, existing databases do not account for functions that must be performed with respect to providing reports to borrowers, as well as information relating to who owns the asset/loan for the reporting relationship. Instead, conventional systems usually must provide multiple side systems with multiple data models in order to do everything necessary for processing and reporting asset/loan information.

The present inventors have concluded that what are needed are systems and methods designed to model the life of a loan/asset and to provide an object/data model to handle the origination of a loan through disposition of the loan. The database model should handle the life of the loan and/or the life of the asset, as well as substantially all of the accounting functions the owner would use to manage the loan.

The present inventors further conclude that what are needed are systems and methods that provide a comprehensive relational/object model that captures many or all complex data relationships for multiple and complex asset classes. The asset classes may include, for example, both residential and commercial real estate loans, consumer loans, and real estate owned. The model should capture both key information for the processing and management of such assets and should also include the complex ownership relationships for such assets. The model should further include a comprehensive rules engine to calculate, for example, complex fees such as distributions of cash received by investors.

SUMMARY

In one embodiment of the present methods and systems, in a servicing entity, a computer-assisted method is provided for managing commercial mortgages. The method includes storing information associated with a plurality of mortgages in a data model; allowing a plurality of participants to access the mortgage information to enable shared servicing of the plurality of mortgages; storing a set of business rules in a database, the set of business rules being configured for application to the mortgage information, the database being operatively associated with the data model; and, allowing the plurality of participants to access the mortgage information from origination of the plurality of mortgages to disposition of the plurality of mortgages.

In another embodiment of the present methods and systems, in a servicing entity, a system is provided for managing commercial mortgages during a period from origination to disposition. The system includes a data model configured for storing commercial mortgage information associated with a plurality of mortgages and configured for allowing a plurality of participants to access the commercial mortgage information to enable shared servicing of the plurality of mortgages; a commercial mortgage management database operatively associated with the data model, the commercial mortgage management database configured for storing at least a portion of the commercial mortgage information; a production and administration database operatively associated with the data model, the production and administration database configured for storing at least a portion of the commercial mortgage information; at least one set of business rules stored on at least one of the commercial mortgage management database and the production and administration database, the set of business rules being configured for processing the commercial mortgage information; and, the data model being configured to allow the plurality of participants to access the commercial mortgage information from origination of the plurality of mortgages to disposition of the plurality of mortgages.

In another embodiment of the present methods and systems, a computer-readable medium is provided including instructions for performing a method for managing commercial mortgages. The method includes storing information associated with a plurality of mortgages in a data model; allowing a plurality of participants to access the mortgage information to enable shared servicing of the plurality of mortgages; storing a set of business rules in a database, the set of business rules being configured for application to the mortgage information, the database being operatively associated with the data model; and, allowing the plurality of participants to access the mortgage information from origination of the plurality of mortgages to disposition of the plurality of mortgages.

BRIEF DESCRIPTION OF THE DRAWINGS

FIGS. 2A and 2B include block diagrams of the software architecture of one embodiment of the present system;

FIG. 3 is a schematic diagram that depicts a typical commercial loan life cycle;

FIG. 4 depicts a block diagram representing the loan master/sub-servicer relationship facilitated by an application service provider;

FIG. 5A depicts schematically one example of rule storage in the database of the present system;

FIG. 8 is an example of a graphical user interface, provided in accordance with at least one embodiment of the present methods and systems, depicting loan search results, wherein the results include loan numbers that are selectable hyperlinks by a user;

FIG. 9 is an example of a graphical user interface, provided in accordance with at least one embodiment of the present methods and systems, depicting asset information, including balance information related to a particular asset/loan;

FIG. 10 is an example of a graphical user interface, provided in accordance with at least one embodiment of the present methods and systems, depicting detailed asset summary information;

FIG. 13 is an example of a graphical user interface, provided in accordance with at least one embodiment of the present methods and systems, depicting user entered comments related to an asset where a user viewing a summary of the comments has the ability to sort the comments by selectable sort criteria;

FIG. 14 is an example of a graphical user interface, provided in accordance with at least one embodiment of the present methods and systems, depicting edit group information where the edit group is a group of edits to be run against a loan for a certain purpose;

FIG. 23 is an example of, a graphical user interface, provided in accordance with at least one embodiment of the present methods and systems, depicting loan terms. Under the menu bar, a hyperlink is provided so that a user may view the actual loan documents;

FIG. 24 is an example of a graphical user interface, provided in accordance with at least one embodiment of the present methods and systems, depicting a dialog box for displaying loan term history;

FIG. 39 is an example of a graphical user interface, provided in accordance with at least one embodiment of the present methods and systems, depicting detailed information relating to escrow and reserve information;

FIG. 40 is an example of a graphical user interface, provided in accordance with at least one embodiment of the present methods and systems, depicting loan escrow rules;

FIG. 57 is an example of a graphical user interface, provided in accordance with at least one embodiment of the present methods and systems, for editing and viewing Commercial Mortgage Securities Association (CMSA®) collateral property information;

FIG. 68 is an example of a graphical user interface, provided in accordance with at least one embodiment of the present methods and systems, for entering and viewing information related to file maintenance;

FIG. 69 is an example of a graphical user interface, provided in accordance with at least one embodiment of the present methods and systems, for generating portfolio reports;

FIG. 102 is an example of a graphical user interface, provided in accordance with at least one embodiment of the present methods and systems, for adding, editing and viewing which group a particular financial statement is associated with;

DETAILED DESCRIPTION OF EMBODIMENTS OF THE INVENTION

The present methods and systems address the above-described needs by providing a system, method and computer program that model the life of loan/asset and provide object/data handling from the origination of a loan through its disposition and captures complex data relationships for multiple and complex asset classes.

The present system and method is implemented in one embodiment by a data model comprised of two databases: a loan/asset database and a production and asset administration database. The loan database is comprised of the following tables: ownership, loan/asset data, business rules, collateral and entity. The present system, in one embodiment, stores the user-customizable business rules in multiple tables of its relational system database. These rules are stored as data in the database and dynamically drive processing results. This flexibility enables the complex accounting processes that allow the system to be user friendly. This feature is beneficial since the present system and method, in one embodiment, utilizes double entry accounting methods that can be conformed to the requirements of Generally Accepted Accounting Principles (GAAP), tax, statutory, or management accounting.

The double entry bookkeeping system uses journals and is based on both the income statement and the balance sheet. Transactions are first entered in a journal and then monthly totals of the journal transactions are entered in ledger accounts. Ledger accounts include income, expense, asset, liability, and net worth (the difference between what your business owns and what it owes).

It is possible to use any or all of these accounting methods through a general ledger profiles-based setup procedure. Each transaction made to the general ledger, regardless of the type of general ledger set up, has equal and offsetting entries and can track assets, liabilities, equity, income and expenses. These methods promote a trial balance with debits equaling credits for balanced double entry recording. In one embodiment, the present system and method utilizes an automated double-entry system.

The present system and method also utilize business rules that are not generic by nature, but are instead system defined. This provides a more robust rule model, as users do not have to build basic accounting components from scratch. The system-defined objects are a part of the compiled application and are not stored in the relational database. This not only simplifies the process of defining rules in the present system and method, but also improves performance, as the complicated accounting components are defined in compiled machine code instead of being loaded from the database. Rules, in the present methods and systems, on average, are comparatively shorter and less complicated than their conventional counterparts, as the rules need fewer operands because of their built-in high-level components.

Figure 1:
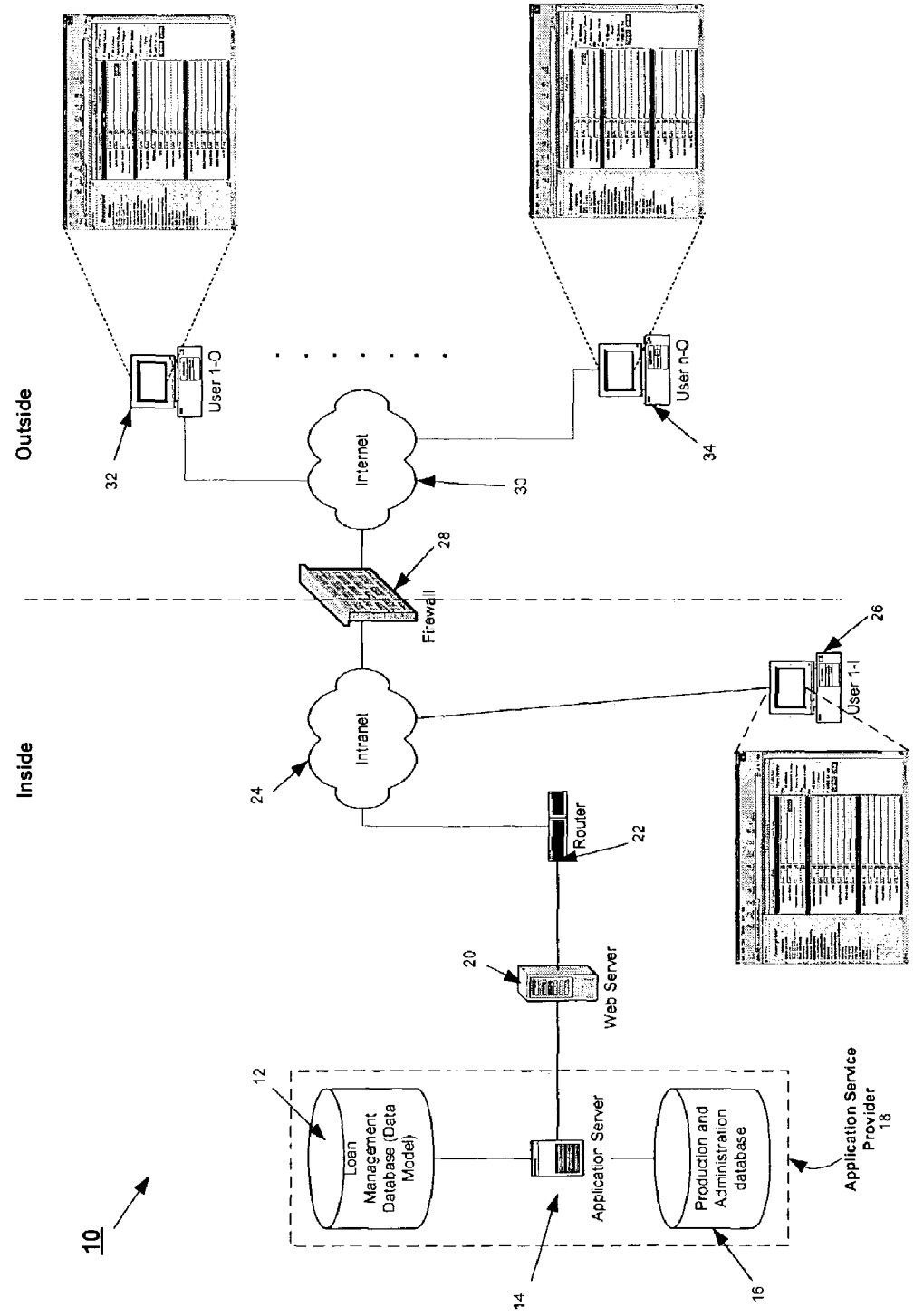
FIG. 1 is a diagram illustrating connectivity of the various components of one embodiment of the present system.

FIG. 1 is a block diagram illustrating the physical architecture of an embodiment of the present invention 10 and showing connectivity among the various components. The system includes two databases: the loan management database 12 and the production and administration database 16. The system also includes an application server 14 (PC) (e.g., an IBM or compatible server running the Microsoft Windows® based operating system, or the like), connected to the databases. Collectively, the databases 12, 16 and the server 14 form an application service provider 18. The system can execute software on the PC and during its operation provide users with graphical user interface (GUI) "front-end" screens. In general, the sub-servicer PC may be any processing device with access to the Internet including, but not limited to, a desktop computer, laptop, palmtop, workstation, set-top box, personal data assistant (PDA), and the like.

The components of the system, as shown in FIG. 1, are divided into two regions—"inside" and "outside" of the firewall. The components appearing in the inside region refer to those components that the contact application service provider would have as part of their infrastructure in order to provide the tools and services contemplated by the present systems and methods. As will be apparent to one skilled in the relevant art(s), substantially all the components "inside" of the system are connected and communicate by means of a wide or local area network (WAN or LAN) running a secure communications protocol (e.g., secure sockets layer (SSL)).

The system of FIG. 1 includes an application server 14 that serves as the "back-bone" (i.e., processor) of the present invention. The system includes a second server 20, which provides the "front-end" for the system. The Web server 20 is a typical Web server process running at a Web site, which sends out web pages in response to Hypertext Transfer Protocol (HTTP) requests from remote browsers 26, 32, 34 (i.e., subscribers of the contact intelligence service provider). That is, the Web server 20 provides the GUI to users of the system in the form of Web pages. These Web pages sent to the sub-servicer's PC result in GUI screens being displayed. In an embodiment of the present invention, the Web server 20 can be implemented using a Windows NT server platform.

The Web server 20 is connected to a router 22. As is also well known in the relevant art(s), routers forward packets between networks and are commercially available from many vendors such as Cisco Systems, Inc. of San Jose, Calif. The router 22 forwards network packets from the inside region of the system to the outside region over an intranet 24, through a firewall 28, and finally to the Internet 30. The firewall 28 serves as the connection and separation between the intranet 24, which includes the plurality of network elements "inside" of the intranet 24, and the global Internet 30 "outside" of the intranet 24. In general, a firewall is a dedicated gateway machine with special security precaution software. A firewall is typically used, for example, to service Internet connections and dial-in lines and protects the cluster of less intensively administered network elements hidden behind the firewall from external invasion. Firewalls are well known in the relevant art(s) and are commercially available from many vendors such as Check Point Software Technologies Corporation of Redwood City, Calif., or Cisco Systems, Inc. of San Jose, Calif.

As will be appreciated by those skilled in the relevant art(s), this configuration of router 22, firewall 28, and Web server 20 is flexible and can be omitted in certain embodiments. Additional routers and/or firewalls can also be added. Various embodiments of the present systems and methods can use a Web server, such as Microsoft® Internet Information Server 4.0, that offers scalability and integration with the operating system and other products used in the system. The Web server 20 preferably includes publishing features, customizable tools, and technologies that permit the creation of Web pages, the publication of information to the World Wide Web, the sharing of files and data on operating systems such as Windows NT®, Novell NetWare® and UNIX servers, and over numerous databases, including Microsoft® SQL Server, Oracle®, and Sybase® databases, and the search capacity for content in Hypertext Markup Language and Microsoft® Office document types, and multiple languages.

The Web server 20 can offer process isolation, a feature which protects applications and Web sites from failure caused by malfunctioning components or Web-applications on the server by running them in separate memory spaces. The Web server 20 can also have, when combined with the operating system, built-in distributed application services that automatically scale to serve thousands of simultaneous users. In one embodiment, a high performance, open architecture, scalable database, such as Microsoft® SQL Server 7.0, is used in the system 10.

The databases 12, 16 can include a high-capacity storage medium configured to store individual asset records and related loan information. In one aspect, the databases 12, 16 are configured as a set of high speed, high-capacity hard drives, such as organized into a Redundant Array of Inexpensive Disks (RAID) volume, for example. However, any form of volatile storage, non-volatile storage, removable storage, fixed storage, random access storage, sequential access storage, permanent storage, erasable storage, and the like would be equally suitable. The databases 12, 16 can be a high performance, open architecture, scalable databases, such as Microsoft® SQL Server 7.0.

The computer program can be one that provides a scalable platform to deliver high performance Web applications with any major Web server on Windows. Internet Information Server and its cooperating language are suitable for use in developing the system.

Figure 2B:
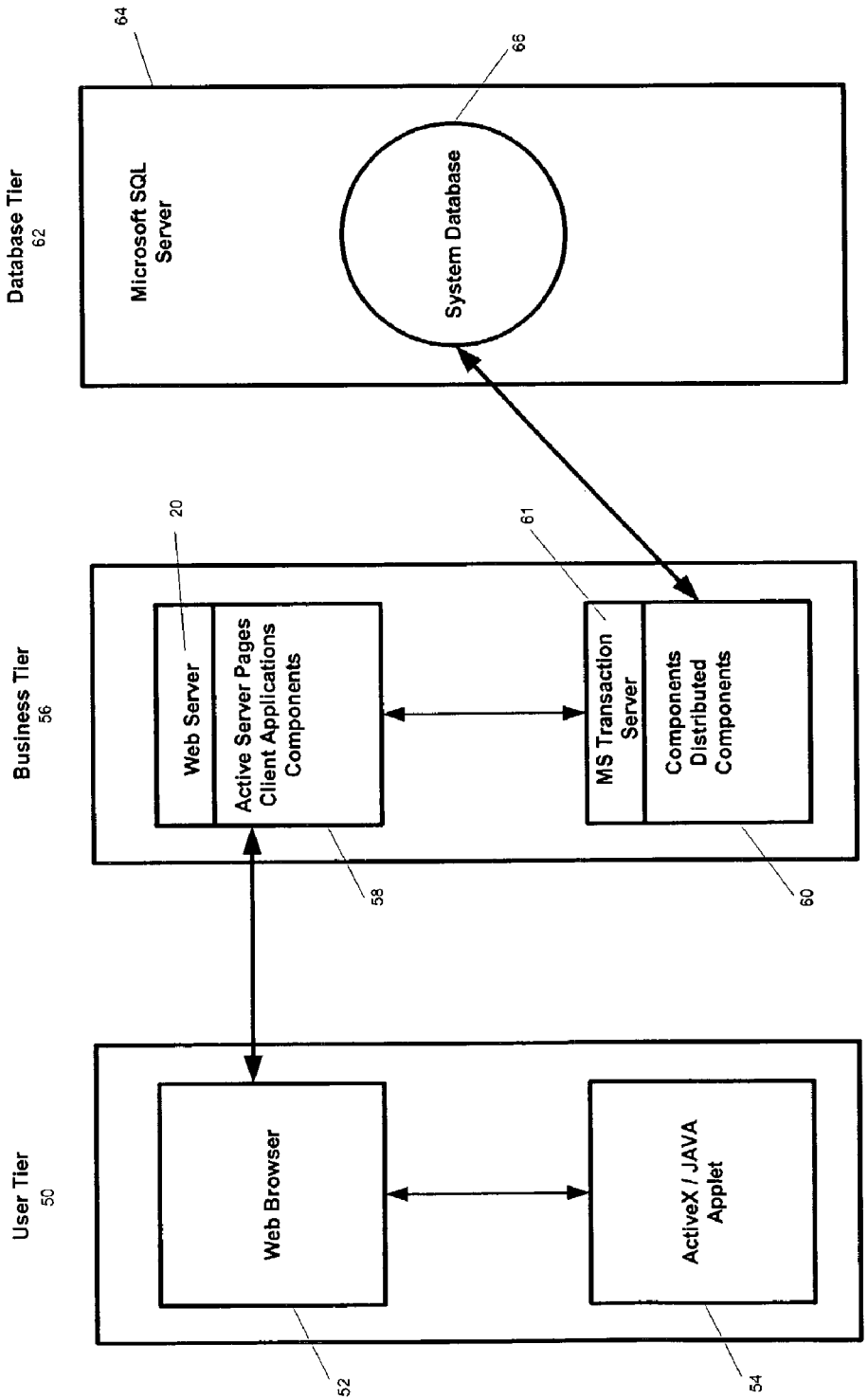

Referring to FIGS. 2A and 2B, block diagrams are shown illustrating software architecture according to an embodiment of the present system and communications among various components of the architecture. The system and method software architecture is a multi-tiered or layered architecture, which includes the GUI framework layer 40, business objects layer 42, a data abstraction layer 44 and a system database layer 46. The data abstraction layer 44 manages access to the system database layer 46. As is well known in the relevant art(s), a layered architecture allows each layer of the software architecture to be designed, written, and re-implemented independently of the other layers. This multi-tier architecture permits use and reuse of system code components or objects show in FIG. 2A. The GUI framework layer 40 is analogous to a user tier; the combination of the business object layer 42 and the data abstraction layer 44 is analogous to a business tier; and, the system database tier 46 is analogous to a database tier.

Referring now to FIG. 2B, an example of one embodiment of the present system and method is depicted. As discussed above, a user tier 50, business tier 56 and a database tier 62 are shown. The software architecture of the present system includes software code (control) logic 58, 60 that implements the present methods and is executed on a PC or server.

In the user tier 50, the code provides the user with the functionality to intelligently browse and service a loan or view loan information with a web browser 52 running ActiveX or JAVA Applets 54 for example. The browser 52 is in communication with the web server 20. The web server 20 is in communication with, in one embodiment, a transaction server 61 which allows just-in-time use of objects. The transaction server 61 is in communication with, in one embodiment, a database server 64 wherein a system database 66 resides. In one embodiment, the system database comprises the databases 12 and 16.

In one embodiment of the present invention, the code logic 58 is implemented in the business tier 56 in an object-oriented programming language that contains "objects," which are a set of data structures encapsulated with a set of routines called "methods" that operate on the data that reside on the transaction server 61. Thus, the architecture follows an open architecture standard for object-oriented programming languages such as, for example, the Common Object Model (COM) or Simple Object and Access Protocol (SOAP), which are both well known in the relevant art(s). In one embodiment of the present invention, the software code 58 is written in a high-level programming language such as the Visual BASIC (VB) programming language. VB is an event-driven programming language that allows code to be invoked when a user performs certain operations on graphical on-screen objects. Thus, the use of a programming language such as VB facilitates the browsing and search functions of the GUI screens (see FIGS. 6 through 113).

A second layer, also in the business tier 56, includes a number of components or packages 60 associated with the transaction server 61 that encompass one or more pieces of functionality required to implement the system. Each component is comprised of one or more classes (the static definition of an object), and the decision as to which class is contained in which component is a design issue and is usually resolved so that related areas of functionality are kept within a single component. This, as with the layered implementation of the architecture, allows portions of an application written in an object-oriented manner to be redesigned independently of other components.

For example, in an embodiment where a database is implemented using relational technology, the architecture of the present system and method is based around the object-oriented paradigm whereas the database implementations use a relational paradigm. A translation layer provides a mechanism to translate the objects within the application to a relational form and additionally insulates the rest of the architecture from differences in implementation of the different databases in the various embodiments of the system.

In one embodiment where the database 66 is implemented using object database technology, a translation layer provides a mechanism to insulate the rest of the architecture from differences in implementation of the different databases in the various embodiments of the system.

In one embodiment of the present invention, the software code 60 communicates with one or more loan databases using the Object Linking and Embedding Database (OLE-DB) interface. As is well known in the relevant art(s), OLE-DB is a standard for accessing different database systems from a high level programming language application such as a scripting language where a user accesses the database from a remote PC by means of a browser. It enables these applications to submit statements to OLE-DB using an OLE-DB structured query language (SQL) and then translates these to the particular SQL commands employed by the underlying database product. In an alternative embodiment, the system and method enabled software communicates with the databases using the Active Data Objects (ADO) interface.

Figure 2C:
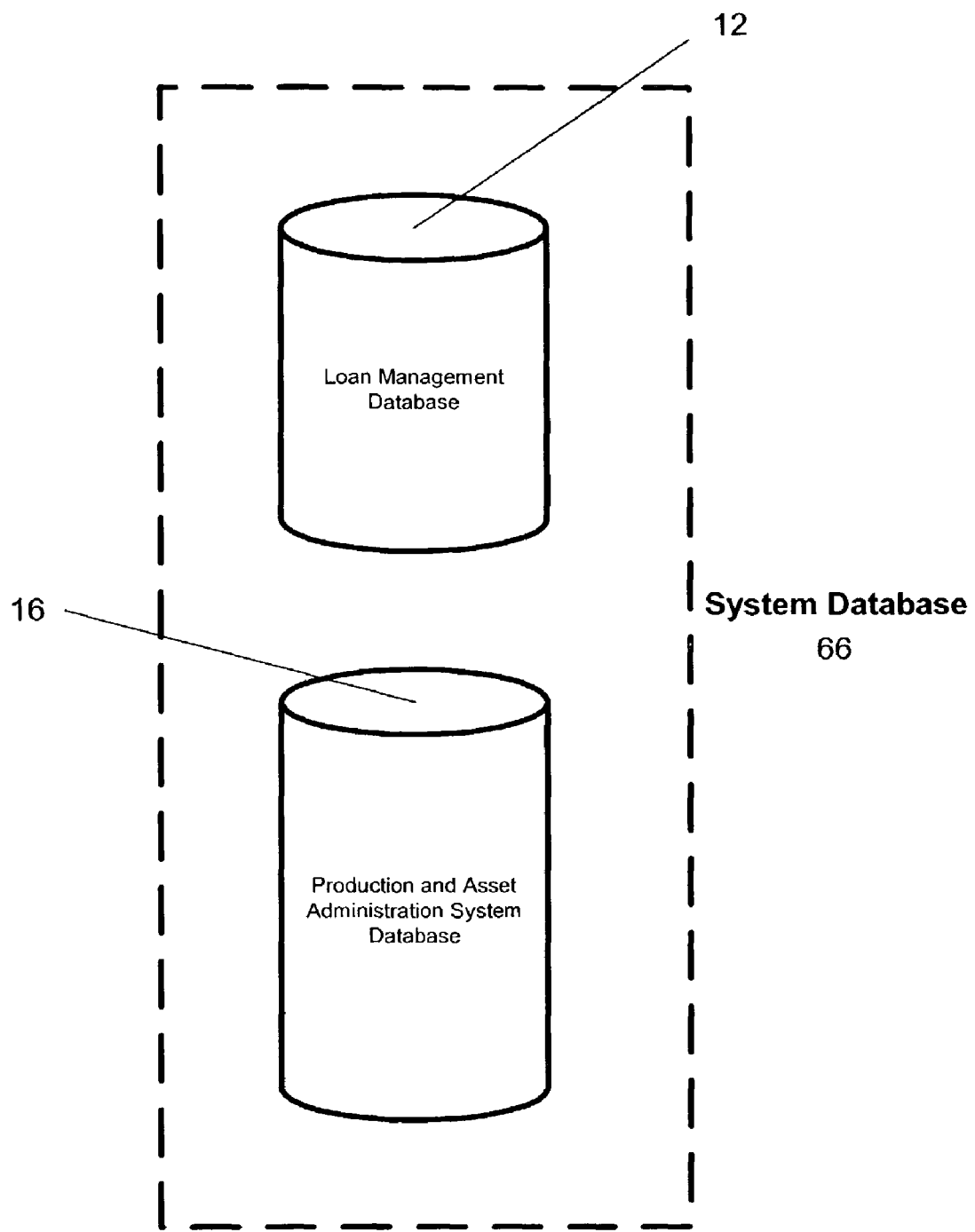
FIGS. 2C, 2D and 2E include schematics that depict an illustrative embodiment of a database structure provided in accordance with the present system.

Referring to FIG. 2C, and embodiment of the system database 66 is shown as two separate databases 12 and 16. In one embodiment of the present invention, the loan databases 12, 16 are implemented using a relational database product (e.g., Microsoft® Access, Microsoft® SQL Server, IBM® DB2, ORACLE®, INGRES, or the like). As is well known in the relevant art(s), relational databases allow the definition of data structures, storage and retrieval operations, and integrity constraints, where data and relations between them are organized in tables. Further, tables are collections of records and each record in a table possesses the same fields. A collection of tables is known as a data model. One embodiment of a data model of one database of the present system and method is shown in FIG. 2D and a detailed description of the data model, including specific tables and fields is shown in Appendix 1.

Figure 2D:
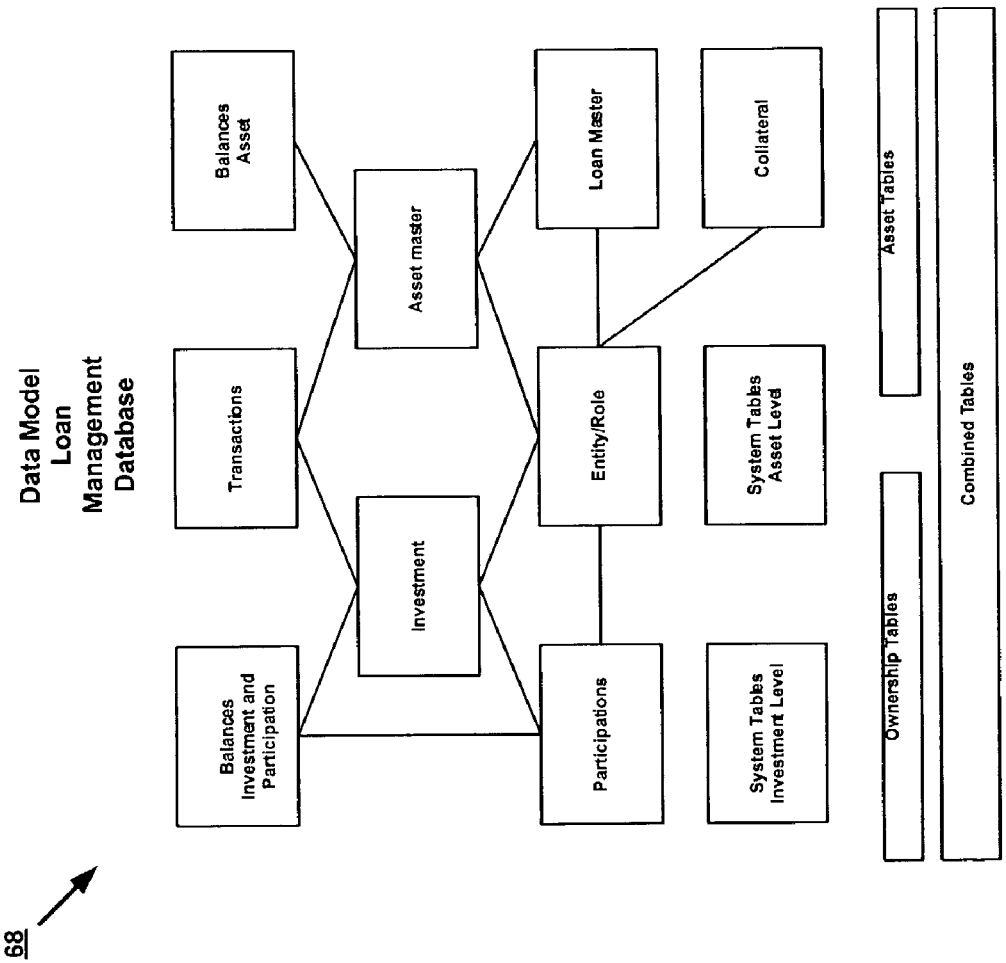

Referring to FIG. 2D, one embodiment of a data model 68 for the loan management database and table types is graphically shown. Both databases 12, 16 may be combined into one database in other embodiments (not shown).

Figure 2E:
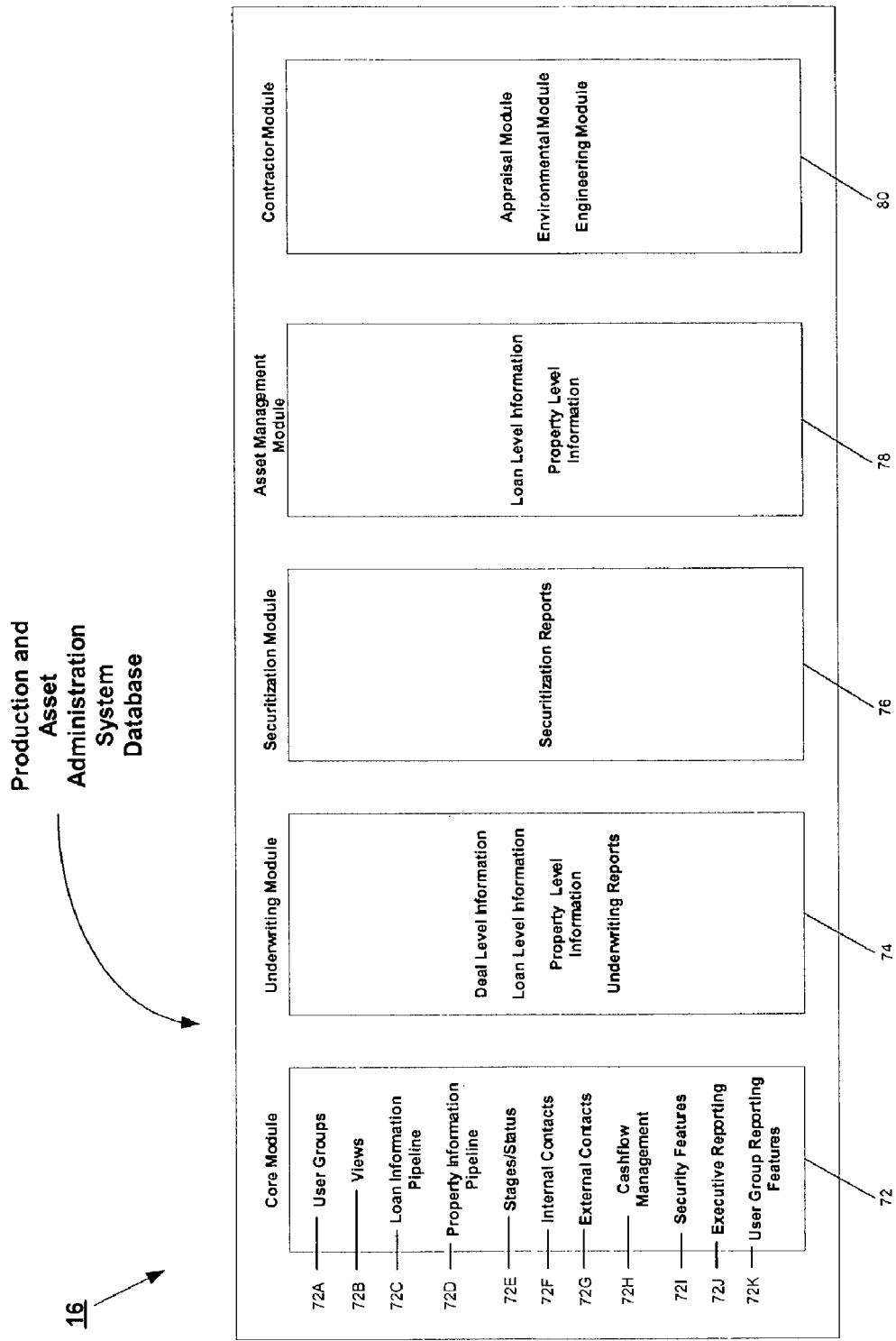

Referring to FIG. 2E, the production and administration system (PAAS) database 16 of one embodiment of the present system and method is shown. The PAAS database 16 is divided into five modules. The first module is the core module 72 and the core module is divided into sub-modules. The first sub-module of the core module is user groups 72A. These groups are the primary control mechanism within the system. Each user is assigned to one or more user groups, depending on the specific functions that person performs. A user group administrator determines admittance to the user group and information access of each user. The user group then filters the deals, screens, data, list fields and reports that the user can access in the system. These partitions allow User Groups to easily view and manipulate their specific information, without having to contend with other groups' information.

Again referring to FIG. 2E, a second sub-module of the core module 72 is views 72B. Views 72B allow users to quickly modify how they view deal information, based upon their own user-defined criteria. User group administrators manage all screens and data that users in their groups are able to see or edit. Typically, a user group administrator will set up a group's views to correspond with selected phases of a project. With one click, a user in that group is able to change the view of a deal within those preset parameters, from pipeline to underwriting to closing.

The third sub-module of the core module 72 in FIG. 2E is loan information 72C (Pipeline Phase). This sub-module tracks a limited number of critical loan fields during the pipeline phase of a deal as is known in the art. The individual user groups define the critical loan fields.

The fourth sub-module of the core module 72 of FIG. 2E is property information 72D (Pipeline Phase). This sub-module tracks a limited number of critical property fields during the pipeline phase of a deal. The individual user groups define the critical property fields.

The fifth sub-module of the core module 72 of FIG. 2E is the stages/status sub-module 72E. This sub-module allows each user group to have different stages or statuses. Each of these individual user group phases is then mapped to a corporate phase to rollup information to the organization level.

The sixth and seventh sub-modules of the core module 72 of FIG. 2E are internal contacts 72F and external contacts 72G. These sub-modules allow for a multiple number of user-defined internal and external contacts to be tracked on each deal.

The eighth sub-module of the core module 72 is the cash flow management sub-module 72H. This sub-module tracks cash flow information related to a lending operation. Cash flow information can be multi-currency enabled and includes: loan cash flows, which is a pseudo-ledger that allows a user to track and manage cash flow (income, expenses and loan funding) at the loan level (this information can be rolled together to interface with the company's general ledger); treasury functions allow specified users to roll together cash flow information by various criteria, such as date, company, department or cost center; budgeting provides the ability to budget for loan production, fees and expenses. In the present systems and methods, reports may be adapted to provide an accurate account of where a user stands against the budget, because the system may be operating at or near real time.

The ninth sub-module of the core module 72 of FIG. 2E is security features 72I and provides security features using a multi-layered security model (not shown) set up by user administrators for each user group. A representative layering provides simple user system access where a user is part of one or more user groups. A user's password expires with frequency set at the organization level. The sub-module 72I further provides selectable deal, screen, and report access granted to individual users. Read/write access is granted to user groups by user group administrators where the user group is determined according to deal involvement. User group administrator level grants and manages all security and administration within a user group. System administrator level grants and manages all security and administration functions within the system. Workflow model automatically disables access to deals outside a user's workflow area, based upon the particular deal stage.

The tenth sub-module of the core module 72 of FIG. 2E is executive reporting 72J. This sub-module provides the ability to roll-up production, cash fundings/receipts, budgets and status information at multiple levels across the organization.

The eleventh sub-module of the core module 72 of FIG. 2E is user group reporting 72K. This reporting is controlled at the user level. All of the reports, in one embodiment of the present system and method can be exported to Microsoft® EXCEL. In one embodiment, the reporting features of the sub-module include: multiple pre-defined pipeline reports; contact/deal management reports; multiple cash flow reports; screen reports; and custom reporting as defined by user.

The second module of the PAAS database 16 of FIG. 2E is the underwriting module 74. This module 74 performs automated underwriting functions as are known and understood in the art. The PAAS underwriting module 74, in one embodiment, is built around a standard underwriting system that has been designed to handle the requirements of typical lending programs known and understood by those skilled in the art. Specific lending program screens and fields are assigned based upon user groups. The standard underwriting structure may include: deal level information; approvals; executive summary; capital structure (sources, uses, payment priority); loan level information (loan write-up, risks/mitigants, exceptions, rates/terms, prepayments, amortization, borrower/guarantor information including financials and credit reports, legal issues, investor file contents); and other like information. Property information contained in the underwriting module may include: location/general information; attributes; amenities; checklists; management company information; insurance; tenant improvements/leasing commissions; tenant rent roll; cash flows; appraisals; rent and sales compensation; environmental reports; engineering reports; and other like information.

The underwriting module 74 of FIG. 2E may contain an underwriting reporting sub-module that is controlled by a user. In one embodiment of the present system and method, the underwriting reporting features of the system include: pre-defined pipeline reports; pre-defined underwriting packages; cash flow reports; contact/deal management reporting; screen reports; custom reporting; ability to export all report information to commercial spreadsheet software, e.g., Microsoft® EXCEL; and other like features.

The third module of the PAAS database 16 of FIG. 2E is the securitization module 76. This module allows specified users to select and group loans for securitization. The securitization module, in one embodiment, contains a securitization reporting sub-module that is controlled at the user level in one embodiment. Reporting features of this sub-module include rating agency tapes/reports and downloads for loading data in industry-standard securitization structuring systems.

The fourth module of the PAAS database 16 of FIG. 2E is the asset management module 78. The asset management module, in one embodiment, is designed to work with a financial institution's loan servicing system to manage the day-to-day loan maintenance activities, allowing the sub-servicer to focus effort and personnel on revenue generating activities. This module 78, in one embodiment, manages the many-to-many relationships necessary for proper life-of-the-loan servicing. The information managed by this module 78 includes loan level information and collateral property level information. Loan level information comprises: borrower/guarantor financial statements, loan covenant tracking, and prepayment penalty information. Collateral property level information can include: rent rolls, operating statements disbursements of escrows for taxes and buildout costs and third party report tracking.

The fifth module of the PAAS database 16 of FIG. 2E is the contractor module 80. This module 80, in one embodiment, contains sub-modules that allow third parties to input property information related to assets, loans, or collateral properties in the PAAS database 16. The PAAS Contactor Module 80 comprises the appraisal module; environmental module; and engineering module. The PAAS contractor module 80, in one embodiment, operates outside of the PAAS core module 72 and utilizes a different security system than the PAAS core module 72. This security system ensures that third-party contractors are only able to edit records for which they have input, as well as ensuring their limited system access and rights.

Referring to FIG. 3, a time line 82 of a typical loan life cycle related to a commercial mortgage is shown. The first phase in the loan life cycle is a loan origination phase 84. In the loan origination phase 84, the potential borrower contacts the lender or originator (e.g., mortgage bank), or a broker working with a lender or originator, by phone or electronic mail, to request a loan. The loan then enters a servicing phase 86 where the lender tracks and updates information relating to the loan.

With further reference to FIG. 3, the loan may then enter a third phase, known as a loan wholesaling phase 88. Once a lender has made the loan, it may offer to sell the loan to a mortgage banker. Alternatively, a loan may be transferred within a company to a different department that handles wholesaling of loans. Lenders may "flow" loans to mortgage bankers (i.e., pass a single loan at a time), or "bulk" loans to mortgage bankers (i.e., pass several loans referred to as a "pool" of loans).

Once an investor purchases or otherwise acquires a pool of loans, the loans may enter a fourth phase, referred to as a securitization phase 94. In the securitization phase 94, investors sell their pools of loans together into a trust that is used collectively as collateral to back securities (i.e., commercial mortgage-backed securities such as bonds). These securities can then be offered for sale to buyers on the secondary market.

The originators or aggregators service the loans, either themselves or through a separate servicing firm (master servicer), and create mortgage-backed securities based upon the cash flow of the assets (i.e., future income stream) in the trust. The mortgage-backed securities have an assigned interest rates based upon a number of factors including risk, loan term and cash flow. The mortgage-backed securities are then generally sold, either directly or through brokerage companies, to buyers in the open market.

The loan also follows a separate track with the borrower, concurrently with the first track described above. As shown in FIG. 3, once the loan is approved and the money is sent to the borrower, the loan enters the servicing phase 86 as noted above. The servicing phase 86 includes a servicing company invoicing or arranging the payment schedule with the borrower, which invoicing indicates when monthly payments are due, and the amount of the payment. If the borrower is late on a payment, the servicer will contact the borrower to discuss the missed or late payment. The servicing mentioned above is labor-intensive and costly to a lender if, done manually per traditional banking methods.

If the borrower becomes insolvent or delinquent in their payments, the loan enters the next phase, referred to as a special servicing phase 92. In the special servicing phase 92 the servicing company may enter a claim against the borrower in a bankruptcy proceeding, or file a lawsuit in court to foreclose on the mortgaged property or secure an order for receivership.

On both tracks, the loan then enters a final phase, referred to as a loan termination phase 96. Generally the loan enters the loan termination phase when the fixed term of the loan expires (e.g., a 10-year fixed loan) and/or the loan has been fully paid (i.e., prepayment).

Throughout the life of a loan or mortgage, several factors must be tracked and recorded. These include information relating to collateral property (appraisals, rent rolls, inspections, income stream from the property, etc), information relating to the loan itself (interest rate, principal, interest, payoff information, delinquency, etc), information relating to a pool that the loan belongs to, information relating to a commercial mortgage backed security that the loan forms a basis of, and the like. The present methods and systems provide a central clearing house for information relating to the various phases of a loan life cycle such that all interested parties have a centralized point of reference for information regarding the commercial mortgage.

Referring to FIG. 4, a representative diagram of the master/sub servicer relationship of the present system and method via an application service provider 100 is shown. A master servicer 101 maintains loan servicing functions 70 including payment processing, loan administration and investor reporting. This master servicing provided by the present system and method may be enabled, for example, via an SQL server (not shown) containing all pertinent loan information and maintained by the master servicer in the loan/asset database 68. The sub-servicer 102 maintains the original borrower relationship with the commercial mortgagor 103 providing traditional customer service functions.

Figure 5:
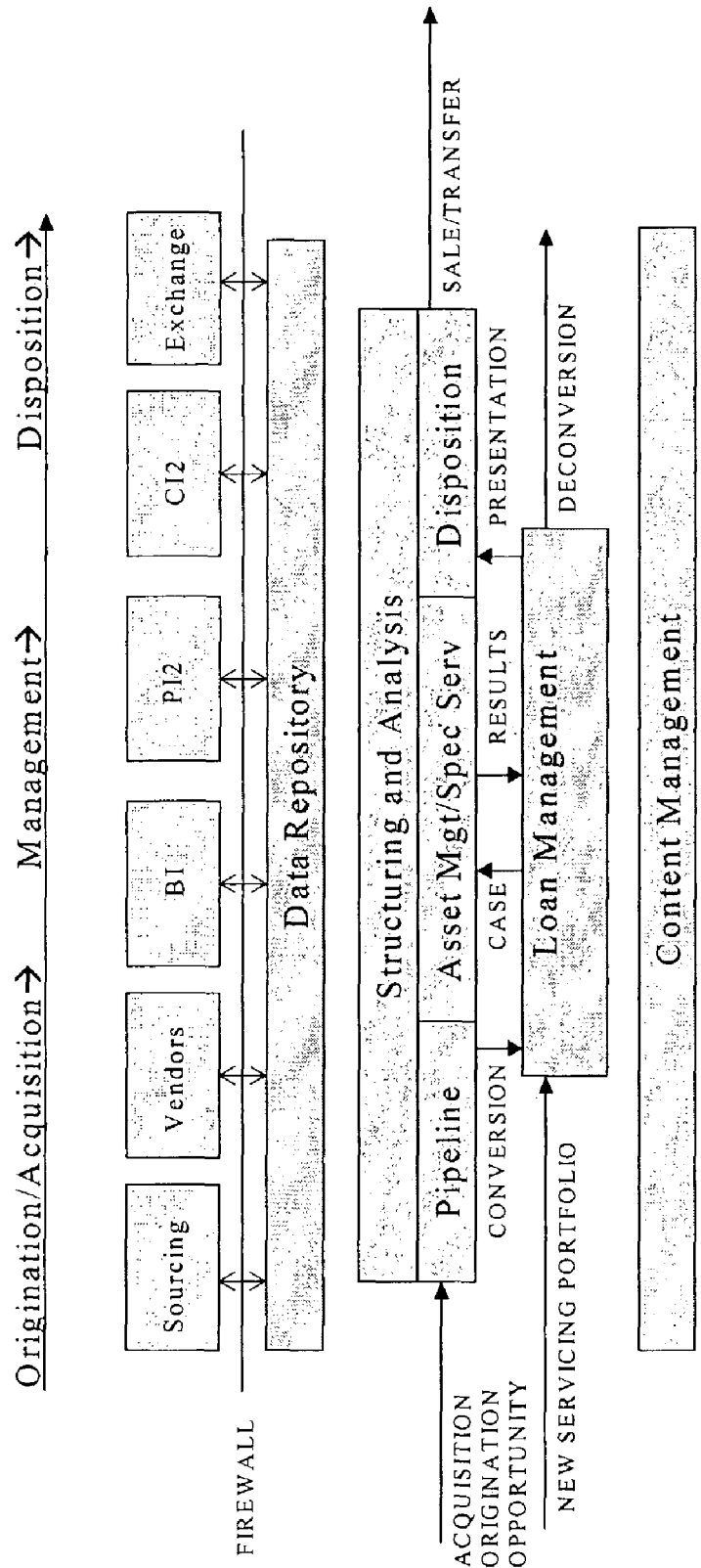
FIG. 5 depicts an investment life cycle model that underlies at least one embodiment of the present systems and methods.

Referring now to FIG. 5, a representative investment life cycle model is shown. In the origination and acquisition phase, a commercial mortgagee identifies new commercial mortgage lending or acquisition opportunities. The commercial mortgagee then evaluates and underwrites the opportunity and finally purchases the asset or closes the loan. The commercial mortgage is then transferred to the present system for servicing. The originator maintains access to the loan information as well as the ability to change/analyze loan information via the system shown in FIG. 1.

Upon transfer to the present system for servicing, routine servicing processes can be identified and the loan management system structured accordingly. The preprogrammed flexible business rules allow sub-servicers to tailor the program to suit their individual needs with respect to loans that are loaded into the present system. As situations arise that require analytical work, data is moved to structuring and analysis for analysis and scenario testing. Results obtained from the structuring and analysis are then returned to the servicing system to develop and execute disposition strategies.

The loan disposition phase shown in FIG. 5 includes securitization, whole loan sale, Real Estate Owned (REO) sale, auction, and participations as are known in the art. Disposition further includes aggregation, processing and presentation of data in formats useful for due diligence by purchasers. The present systems and methods further provide capability for investors to obtain data and for pools and deals. In the embodiments in which the system operates via an application service provider model, remote access can be granted to any remote user with Internet access and a Web browser.

FIG. 5A depicts one example of how the present systems and methods handle business rules. In one embodiment of the present system, a representative business rule 106 is broken into discrete components, with each component type stored in a separate table. Rule names and descriptions are in one table 110. Rule operands are in another table 112. The rule operators are in a third table 114. The operand object types are stored in a fourth table 116.

In one embodiment of the present system and method, business rules are precompiled before being stored in the various component tables. Precompiling the rules requires that they be broken into their lowest level elements and operands. The high-level rule name is stored in the rule name and description table 110. The individual definitions are stored in the rule operands table 112. The precompiled mathematical sequence of operands (+, −, *, /) in the rule is stored in the rule calculation step table 114. The rule operand object type table 116 stores the object type for both parameter fields and where to get each. Each step in the present system and method rule computation requires two parameters. Once the rules are pre-compiled, the complicated rule is broken into its component parts or objects, and its objects are then system-defined and compiled with source code as is known in the art.

This precompiling and compiling of business rules permits easy scalability tailoring of the program to meet the unique needs of commercial lenders or sub-servicers.

Figures 6, 7:
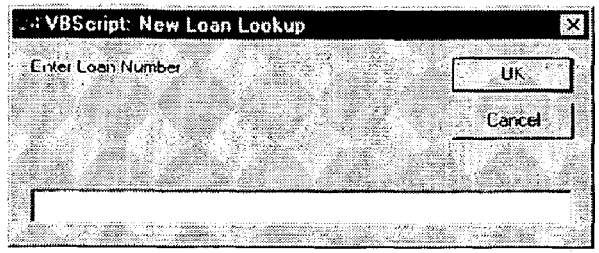
FIG. 6 depicts a dialog box configured for use in accordance with at least one embodiment of the present methods and systems that can be employed for retrieving loan information by loan number.
FIG. 7 is an example of a graphical user interface, provided in accordance with at least one embodiment of the present methods and systems, used in the entry of various loan search criteria.
Figure 113:
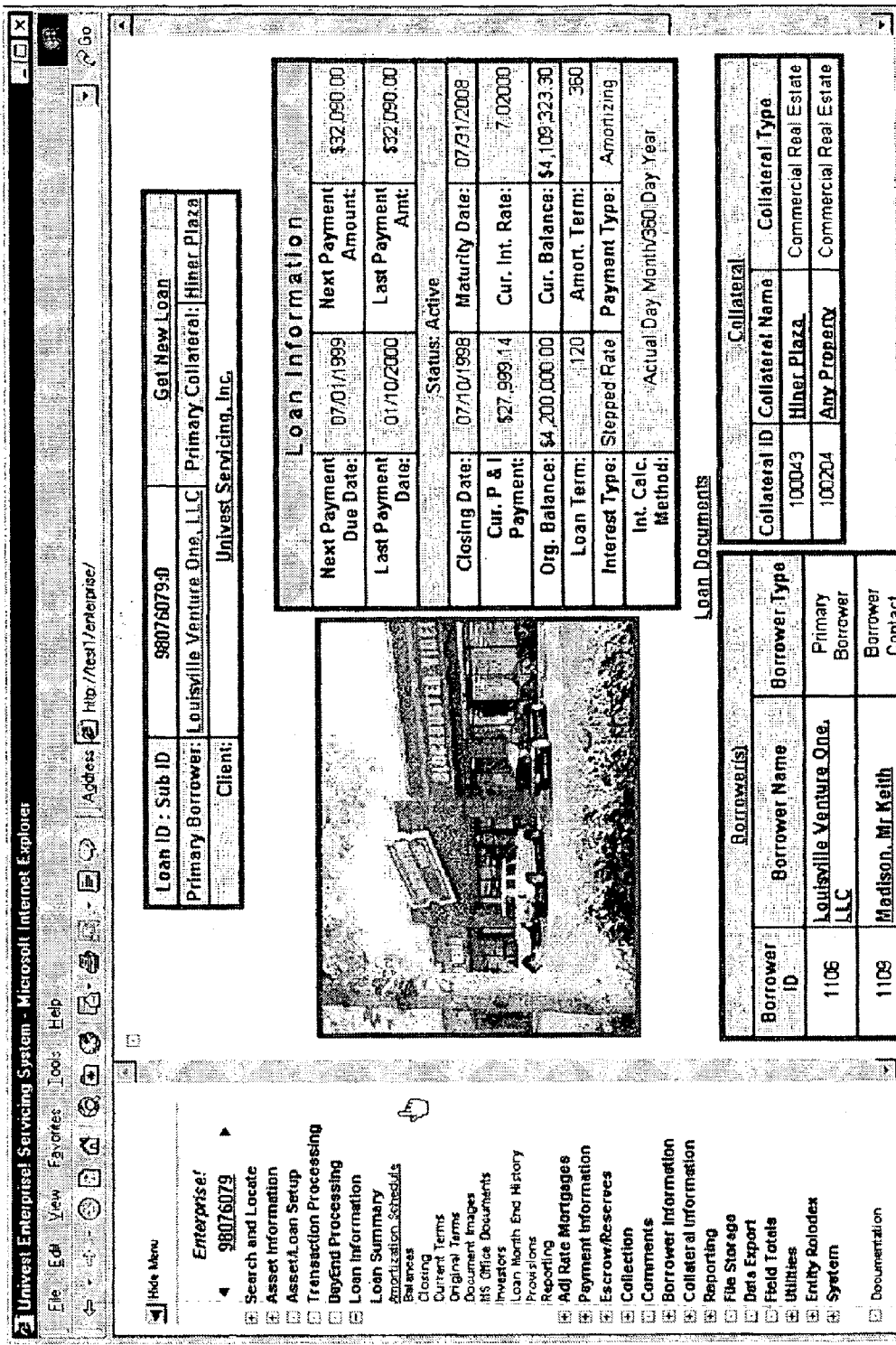
FIG. 113 is an example of a graphical user interface, provided in accordance with at least one embodiment of the present methods and systems, for viewing snapshot information related to a particular loan including an image of the collateral securing the loan, borrower information, loan information, and loan documents.

FIGS. 6 through 113 demonstrate the user interface tier 40 and 50 described in FIGS. 2A and 2B.

FIG. 6 depicts a dialog box of the present method and system for retrieving loan information by loan number;

FIG. 7 is an example of a graphical user interface used in the entry of various loan search criteria wherein a user enters a loan number and the system retrieves information relating to that loan. A menu 130 of user selectable hyperlinks is provided that facilitates navigation through the present system.

Figure 8:
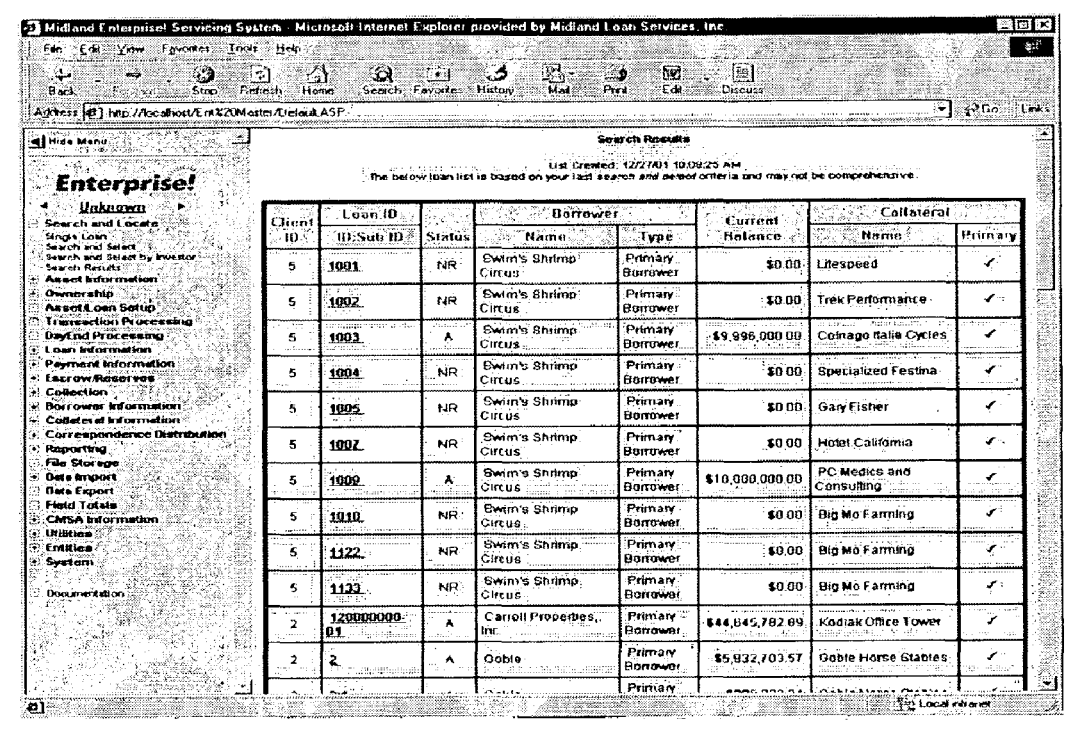

FIG. 8 is an example of a graphical user interface, provided in accordance with at least one embodiment of the present methods and systems, depicts loan search results where the results include loan numbers that are selectable hyperlinks by a user. Collateral property associated with the various loans is also displayed.

Figures 9, 10:
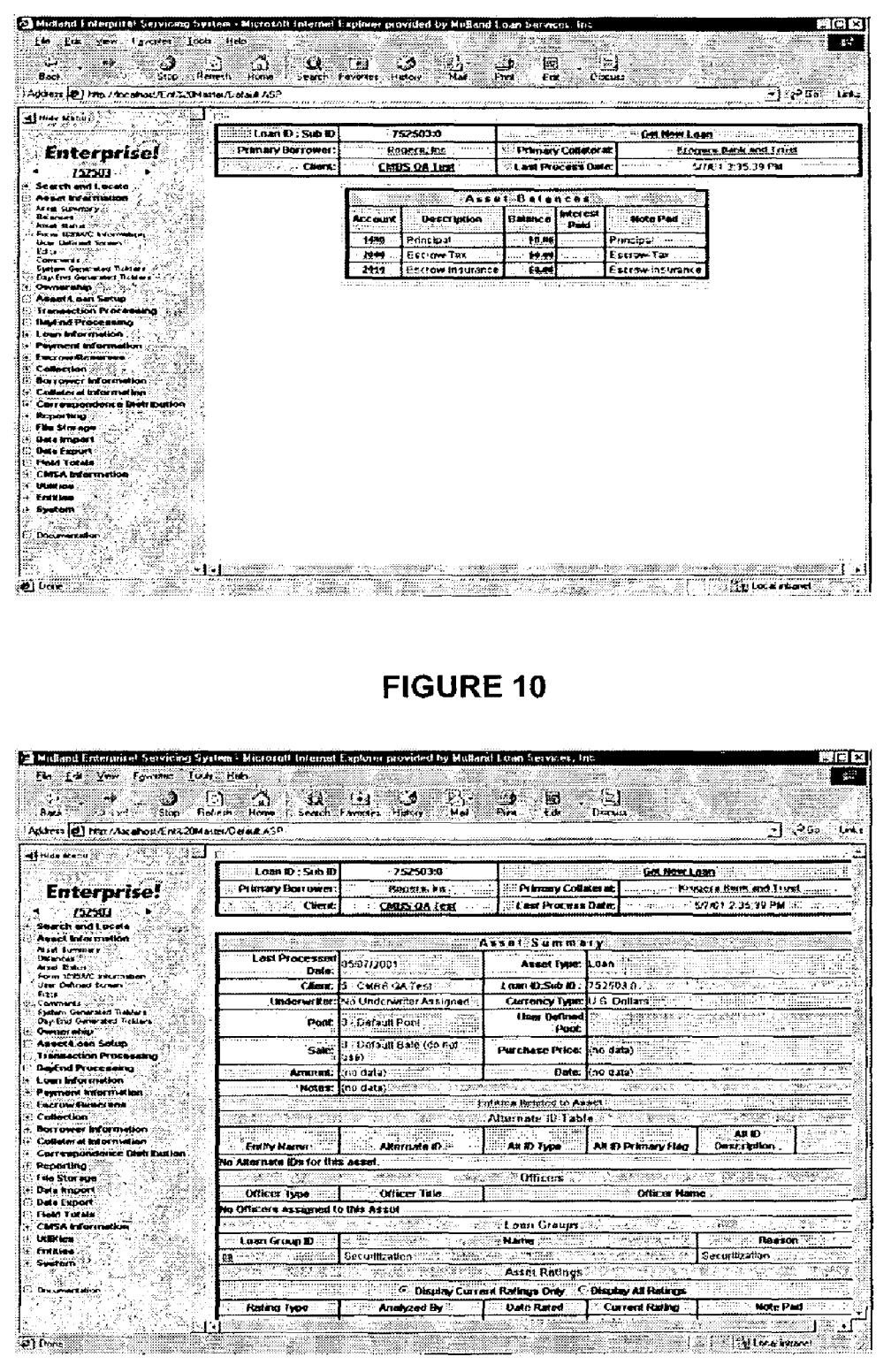

FIG. 9 is an example of a graphical user interface, provided in accordance with at least one embodiment of the present methods and systems, depicting asset information and, in particular, balance information related to a particular asset/loan including principal, interest and escrowed tax and insurance.

FIG. 10 is an example of a graphical user interface, provided in accordance with at least one embodiment of the present methods and systems, depicting detailed asset summary information. The GUI also depicts entities related to a particular asset.

Figure 11:
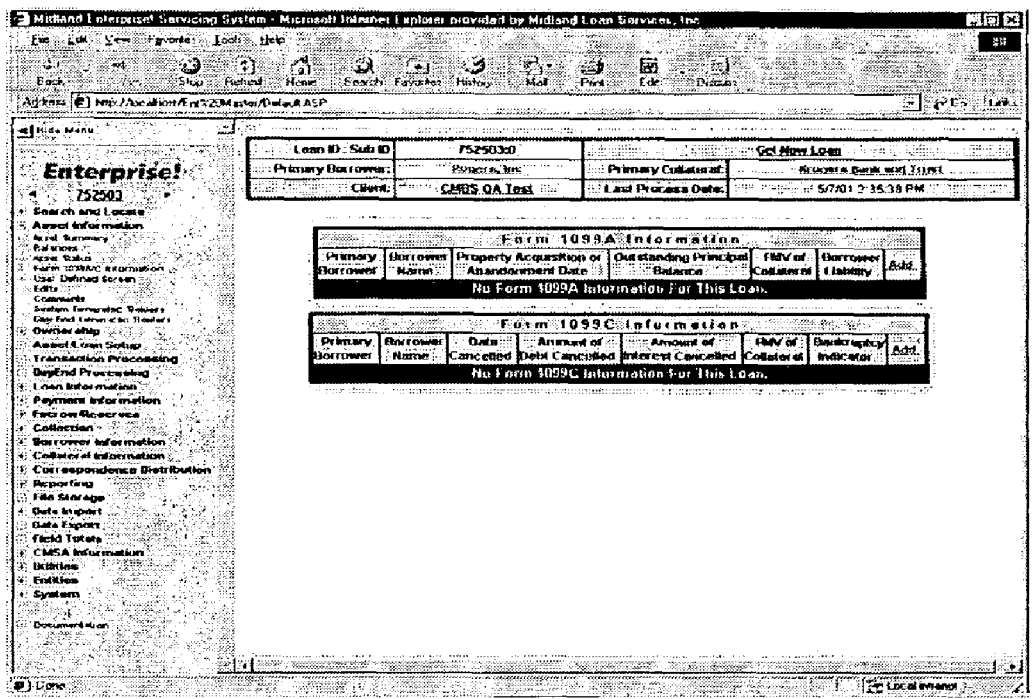
FIG. 11 is an example of a graphical user interface, provided in accordance with at least one embodiment of the present methods and systems, depicting Form 1099A information related to a particular asset.

FIG. 11 is an example of a graphical user interface, provided in accordance with at least one embodiment of the present methods and systems, depicting Form 1099A information related to a particular asset. This information is required for reporting information relating to acquisition of secured property to the Internal Revenue Service (IRS).

Figure 12:
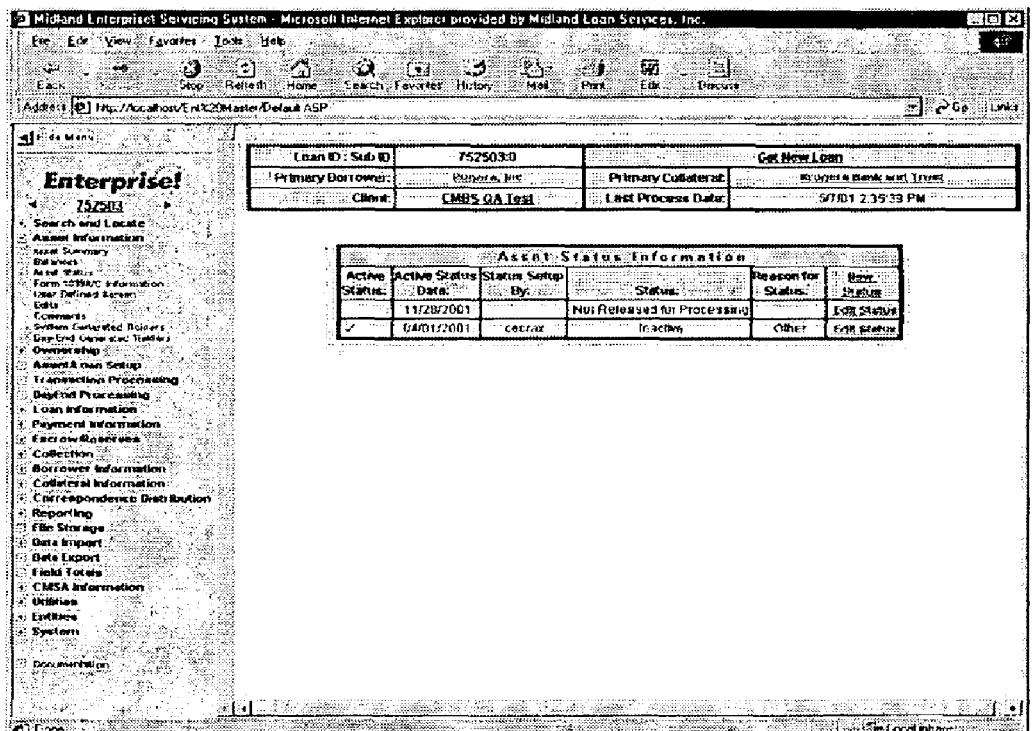
FIG. 12 is an example of a graphical user interface, provided in accordance with at least one embodiment of the present methods and systems, depicting asset status information for a selected loan asset.

FIG. 12 is an example of a graphical user interface, provided in accordance with at least one embodiment of the present methods and systems, depicting asset status information for a selected loan asset.

Figures 13, 14:
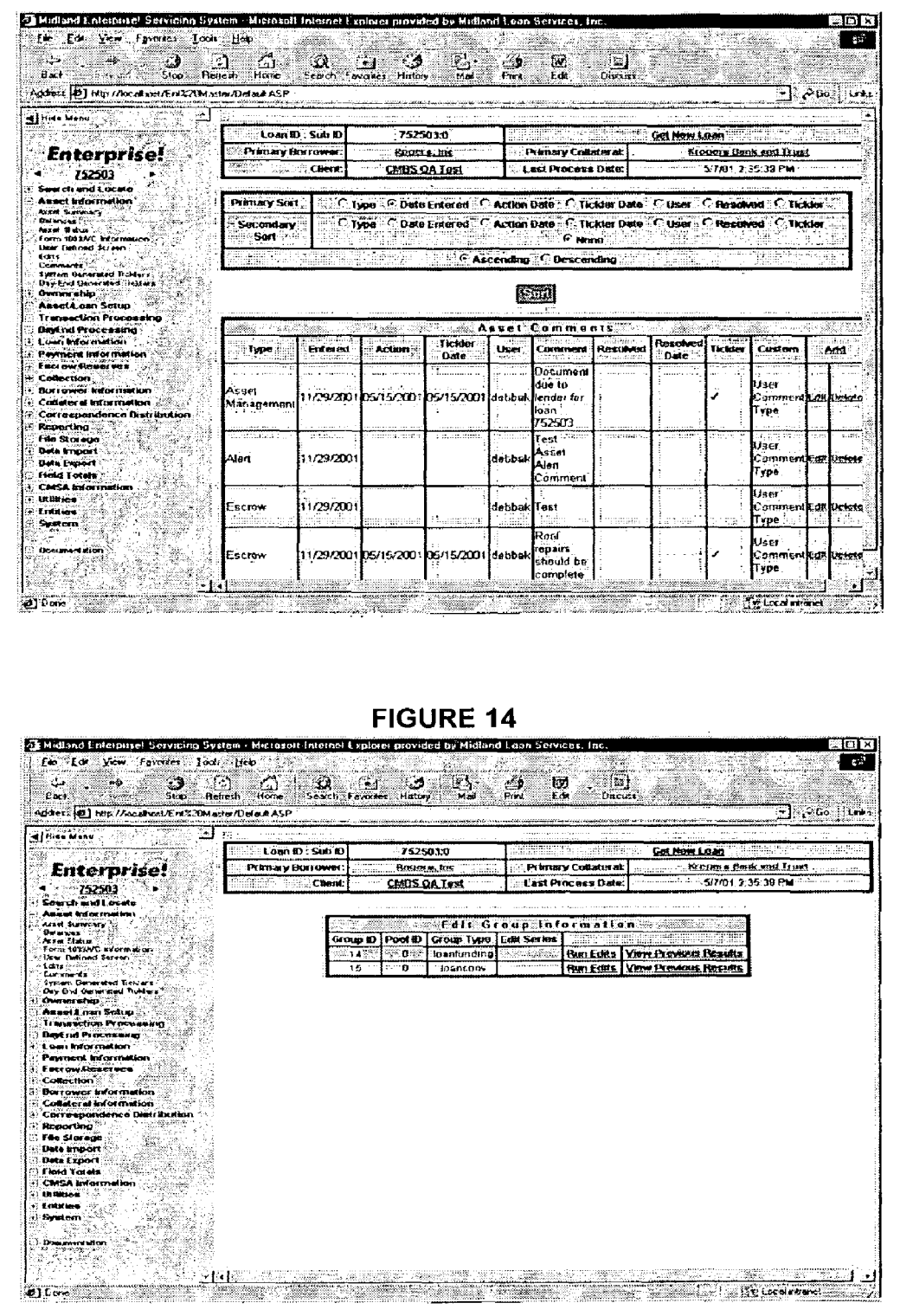

FIG. 13 is an example of a graphical user interface, provided in accordance with at least one embodiment of the present methods and systems, depicting user-entered comments related to an asset where a user viewing a summary of the comments has the ability to sort the comments by selectable sort criteria.

FIG. 14 is an example of a graphical user interface, provided in accordance with at least one embodiment of the present methods and systems, depicting edit group information where the edit group is a group of edits to be run against a loan for a certain purpose. Edits are a collection of tests, in one embodiment, used to determine whether a particular loan can be funded.

Figure 15:
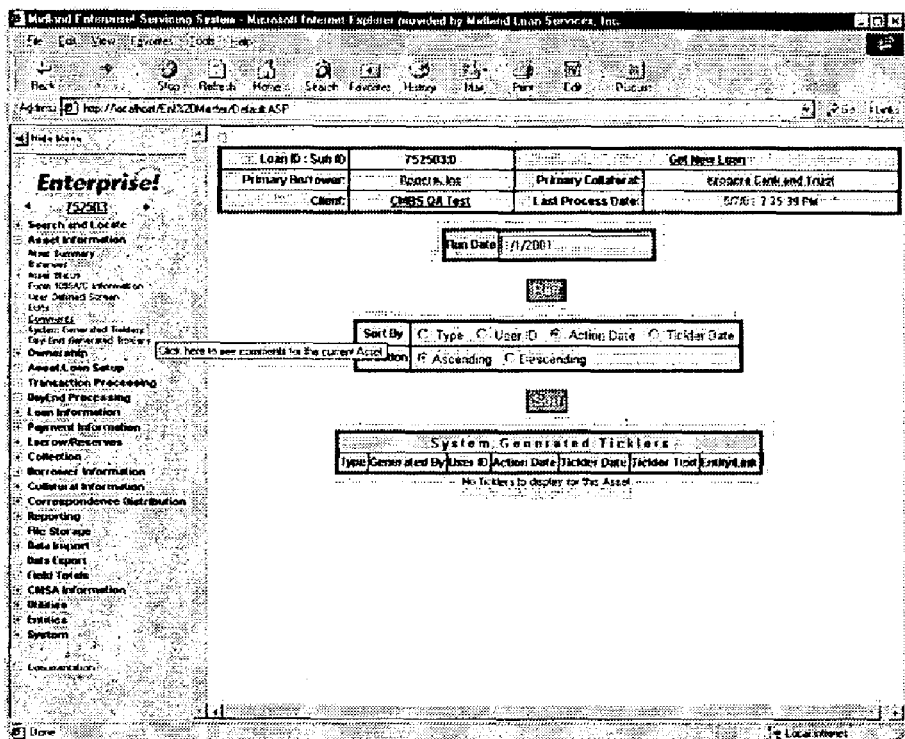
FIG. 15 is an example of a graphical user interface, provided in accordance with at least one embodiment of the present methods and systems, depicting the entry of tickler sort criteria.

FIG. 15 is an example of a graphical user interface, provided in accordance with at least one embodiment of the present methods and systems, depicting the entry of tickler sort criteria. The information displayed relates to tickler information generated by the present system.

Figure 16:
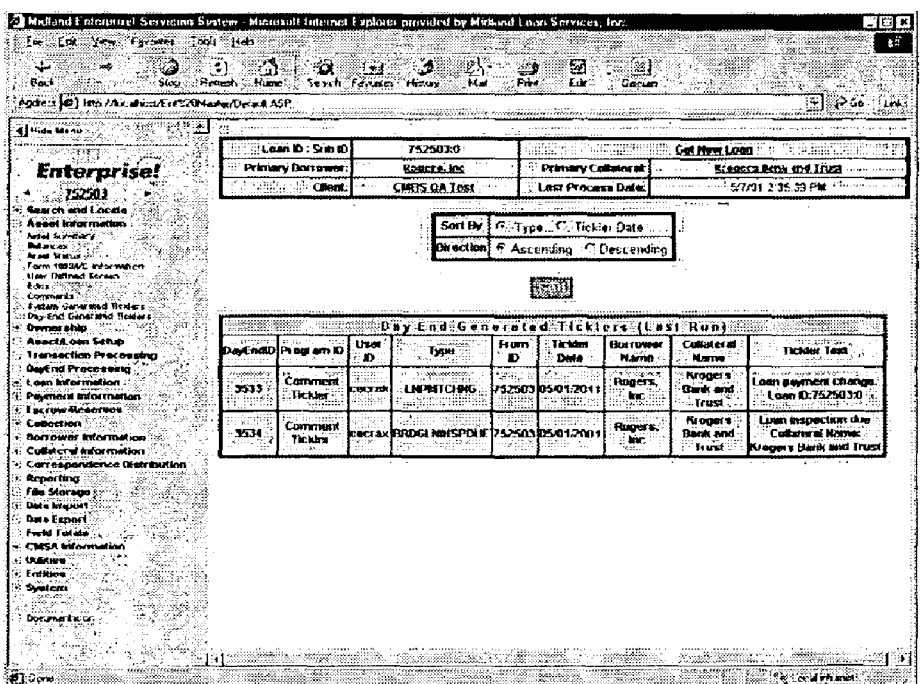
FIG. 16 is an example of a graphical user interface, provided in accordance with at least one embodiment of the present methods and systems, depicting sort results based on user input information in FIG. 15.

FIG. 16 is an example of a graphical user interface, provided in accordance with at least one embodiment of the present methods and systems, depicting sort results based on user input information in FIG. 15.

Figure 17:
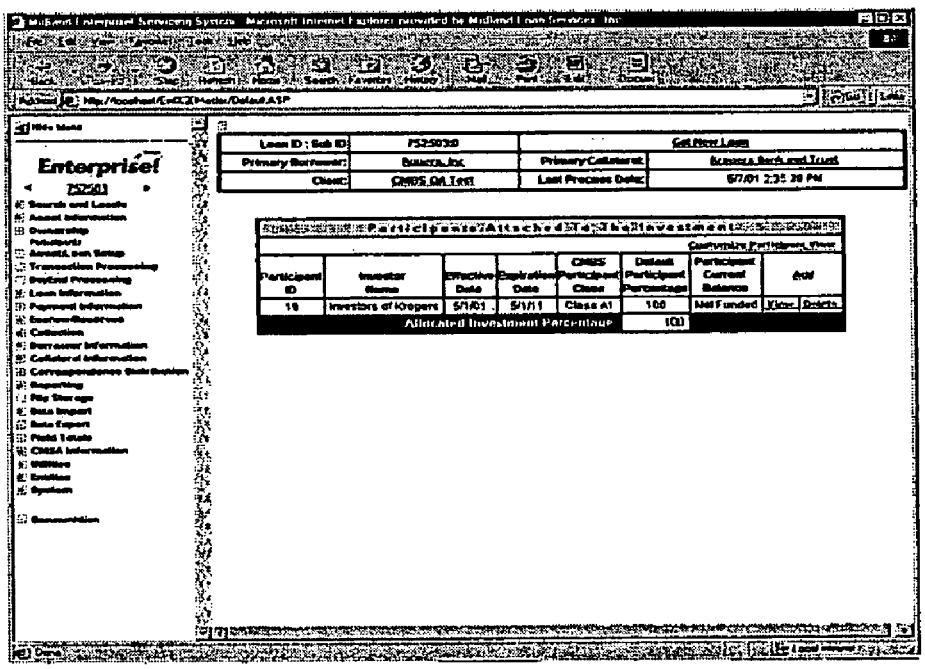
FIG. 17 is an example of a graphical user interface, provided in accordance with at least one embodiment of the present methods and systems, depicting asset ownership participants.

FIG. 17 is an example of a graphical user interface, provided in accordance with at least one embodiment of the present methods and systems, depicting asset ownership participants.

Figure 18:
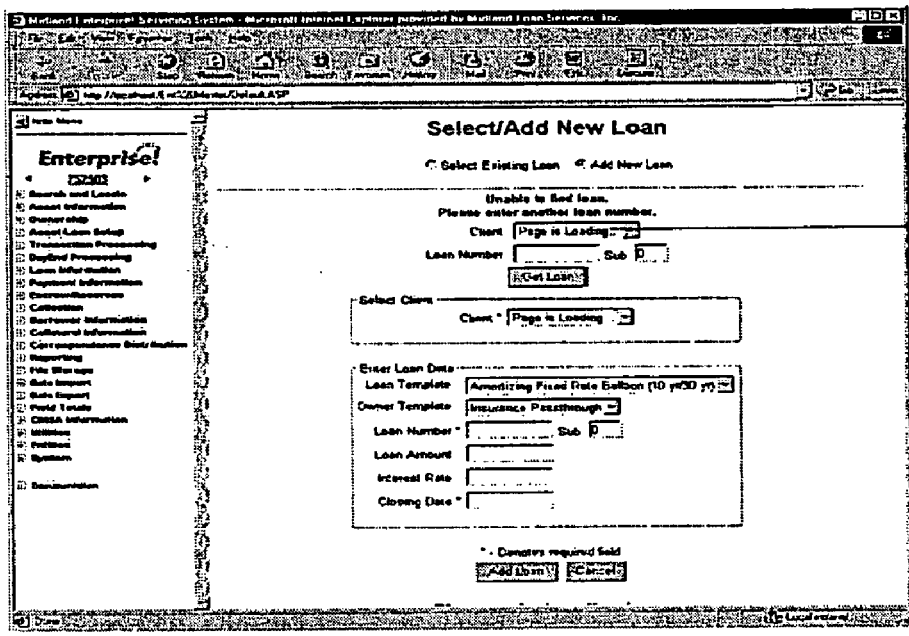
FIG. 18 is an example of a graphical user interface, provided in accordance with at least one embodiment of the present methods and systems, for adding or selecting a new loan.

FIG. 18 is an example of a graphical user interface, provided in accordance with at least one embodiment of the present methods and systems, for adding or selecting a new loan. This new loan is entered for an existing client selected from the "Client" pull down menu 150.

Figure 19:
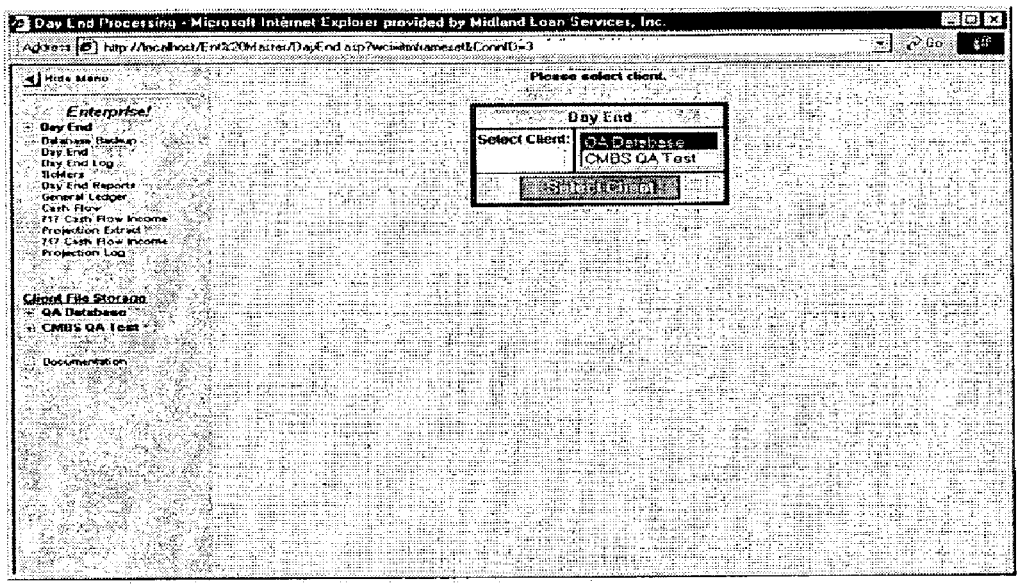
FIG. 19 is an example of a graphical user interface, provided in accordance with at least one embodiment of the present methods and systems, depicting selection of a client database.

FIG. 19 is an example of a graphical user interface, provided in accordance with at least one embodiment of the present methods and systems, depicting selection of a client database. This selection is used in generating various "Day End" reports and day end information.

Figure 20:
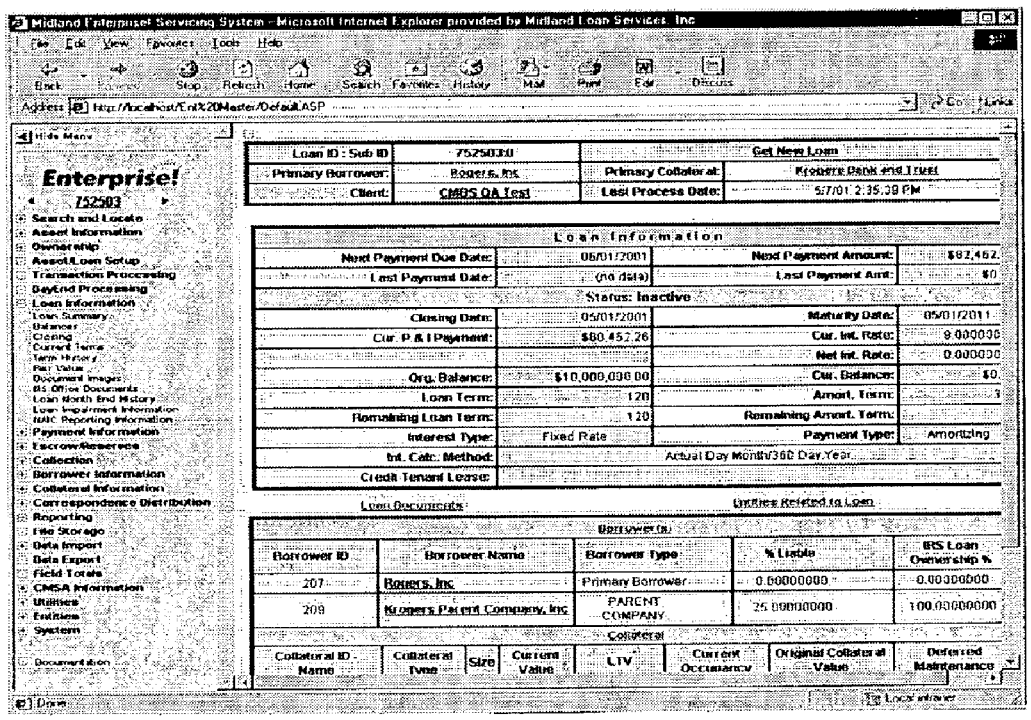
FIG. 20 is an example of a graphical user interface, provided in accordance with at least one embodiment of the present methods and systems, depicting loan information related to a borrower.

FIG. 20 is an example of a graphical user interface, provided in accordance with at least one embodiment of the present methods and systems, depicting loan information related to a borrower. The loan information includes payment due dates, closing dates, payment information, balance information, borrower information and collateral property information.

Figure 21:
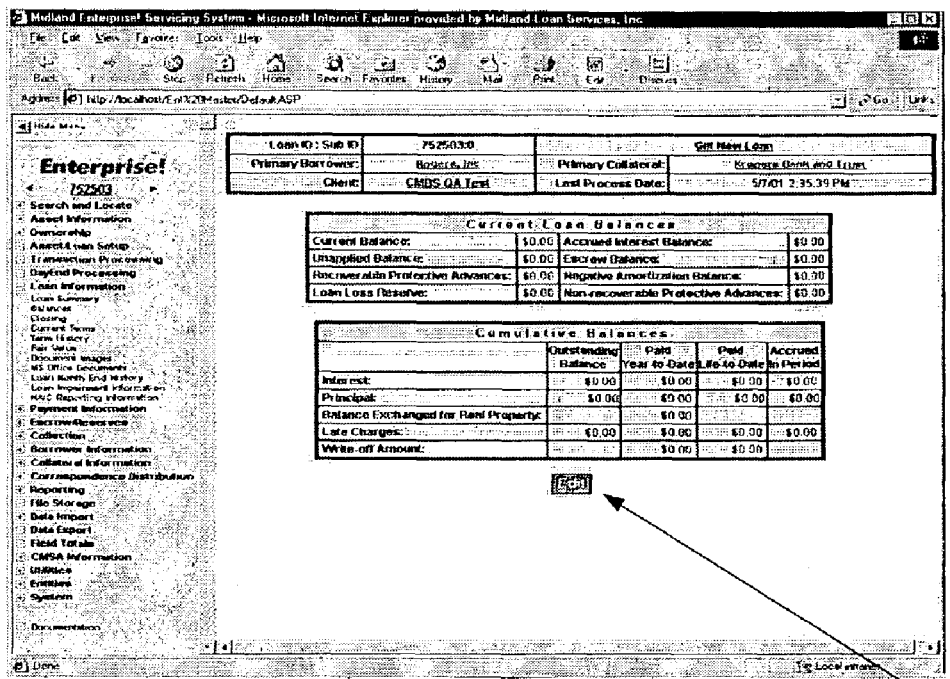
FIG. 21 is an example of a graphical user interface, provided in accordance with at least one embodiment of the present methods and systems, depicting current loan balance and cumulative loan balance for a particular user-selected loan.

FIG. 21 is an example of a graphical user interface, provided in accordance with at least one embodiment of the present methods and systems, depicting current loan balance and cumulative loan balance for a particular user-selected loan. A user with appropriate access may edit the loan balance information via the Edit 160 function.

Figure 22:
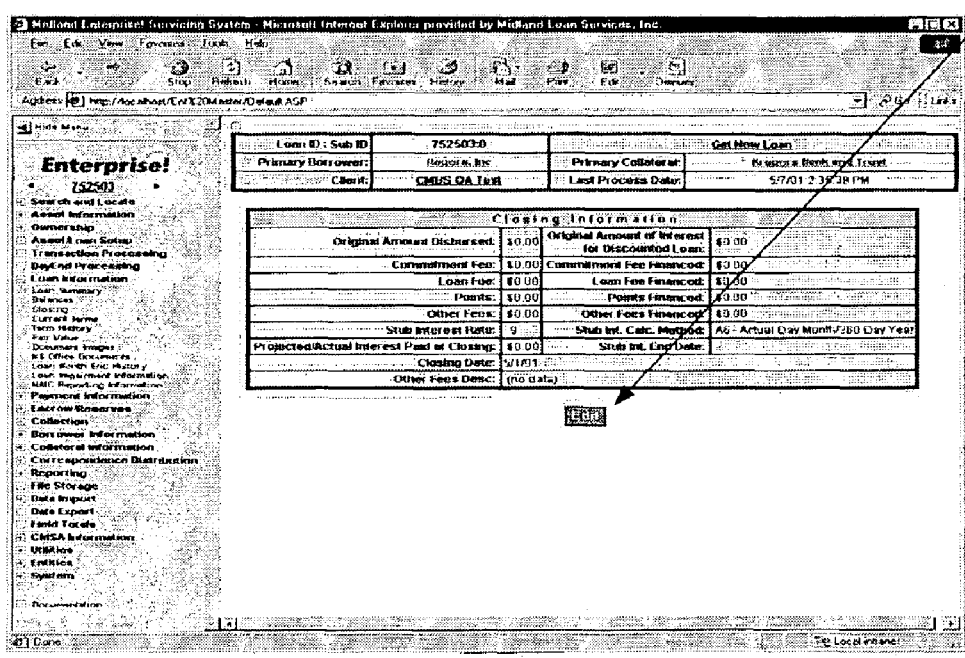
FIG. 22 is an example of a graphical user interface, provided in accordance with at least one embodiment of the present methods and systems, depicting closing information related to a particular loan.

FIG. 22 is an example of a graphical user interface, provided in accordance with at least one embodiment of the present methods and systems, depicting closing information related to a particular loan. A system user with appropriate access may edit the closing information via the Edit function.

Figures 23, 24:
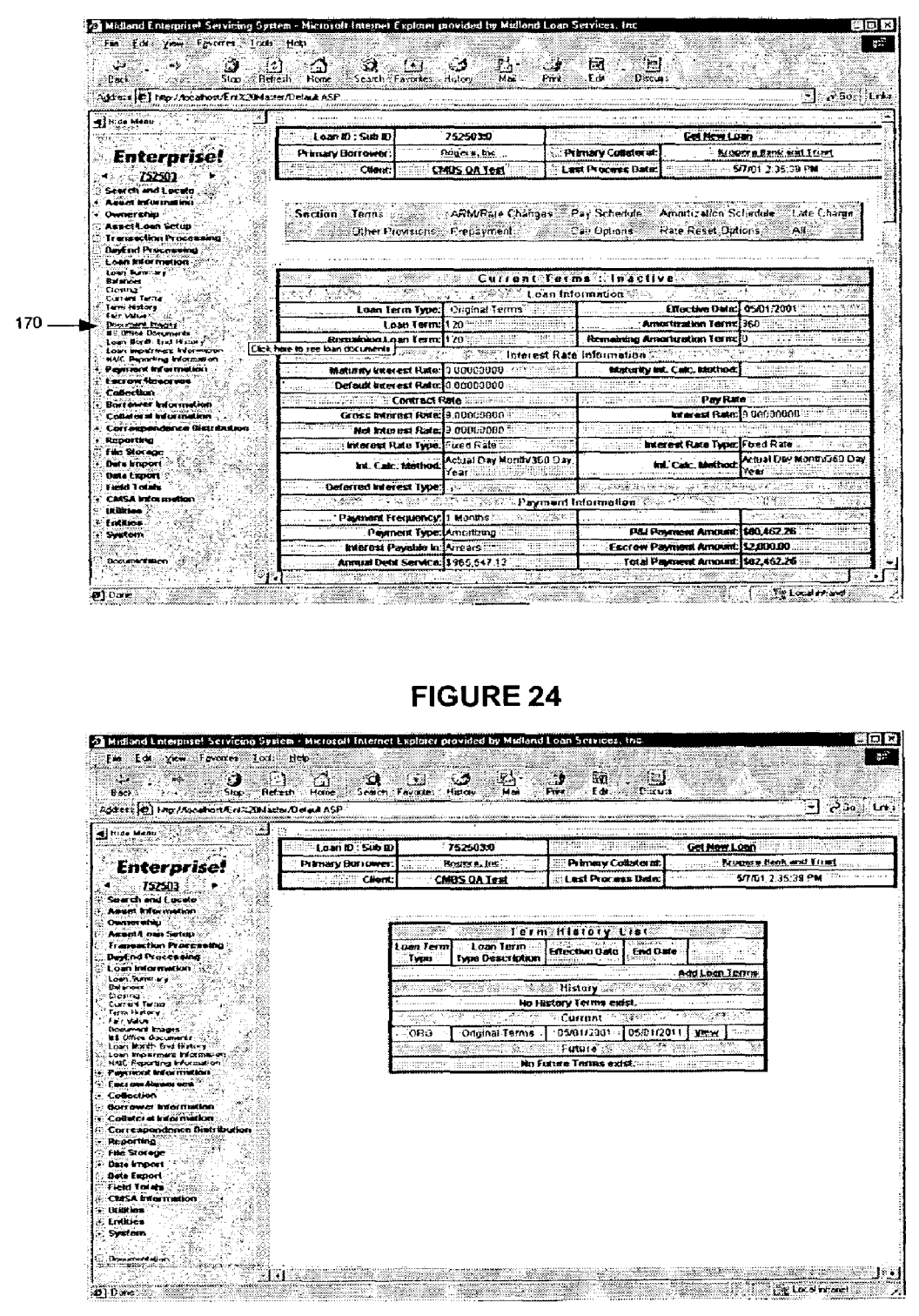

FIG. 23 is an example of a graphical user interface, provided in accordance with at least one embodiment of the present methods and systems, depicting loan terms. Under the menu bar, a hyperlink 170 is provided so that a user may view the actual loan documents.

FIG. 24 is an example of a graphical user interface, provided in accordance with at least one embodiment of the present methods and systems, depicting a dialog box for displaying loan term history. This dialog box displays any historical changes in the terms of the selected loan.

Figure 25:
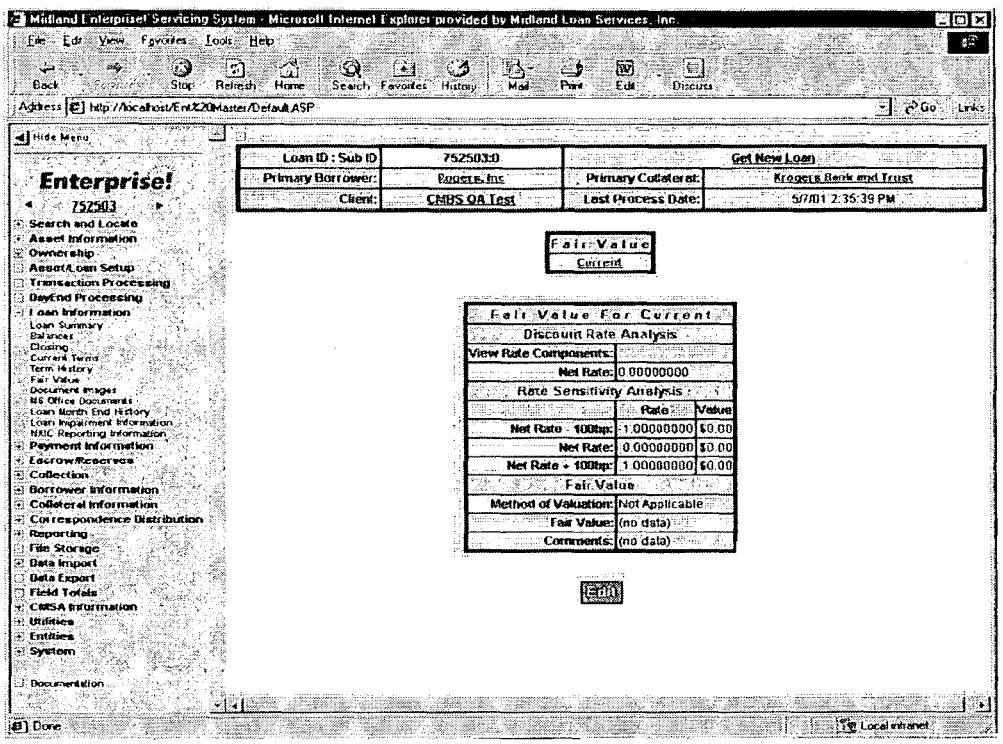
FIG. 25 is an example of a graphical user interface, provided in accordance with at least one embodiment of the present methods and systems, depicting current fair market value of the user selected loan.

FIG. 25 is an example of a graphical user interface, provided in accordance with at least one embodiment of the present methods and systems, depicting current fair market value of the loan.

Figure 26:
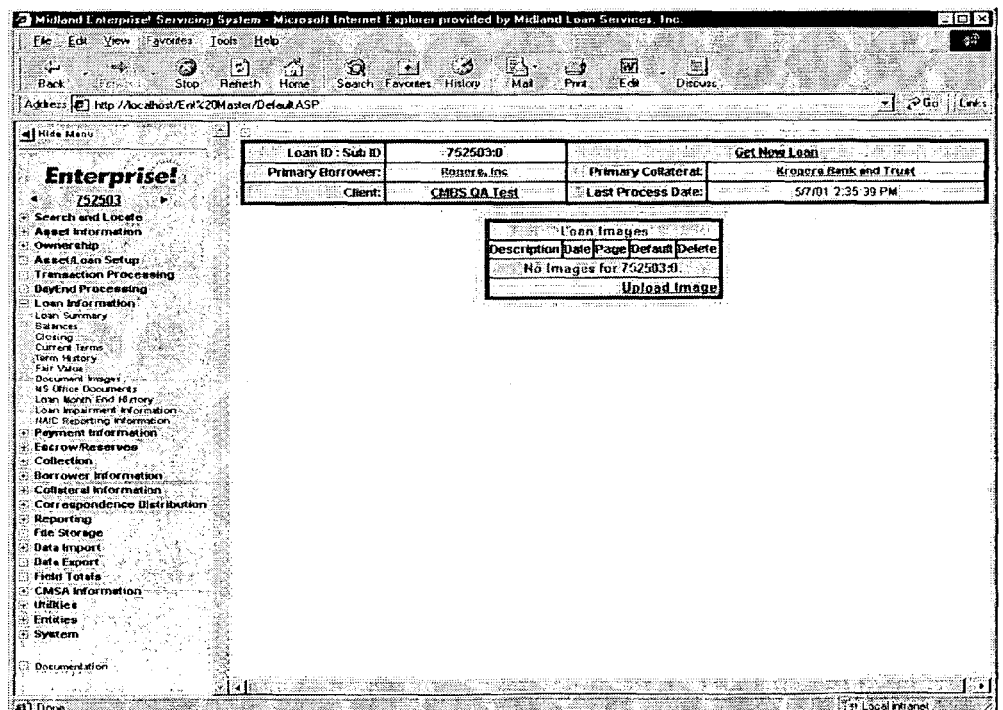
FIG. 26 is an example of a graphical user interface, provided in accordance with at least one embodiment of the present methods and systems, used for entering and viewing documents related to the loan.

FIG. 26 is an example of a graphical user interface, provided in accordance with at least one embodiment of the present methods and systems, used for entering and viewing documents related to the loan. The documents can be scanned and converted into a JPG, GIF, or PDF format, for example, for upload and storage in the loan management database 16.

Figure 27:
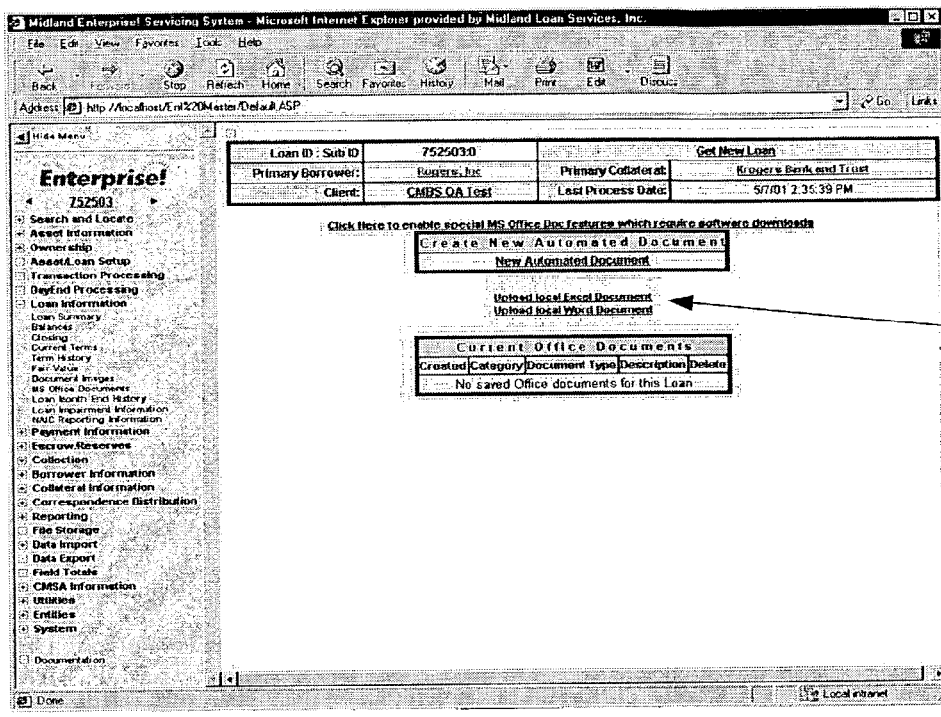
FIG. 27 is an example of a graphical user interface, provided in accordance with at least one embodiment of the present methods and systems, for creating new documents related to a particular loan. In one embodiment, hyperlinks are provided to the user for uploading Microsoft® Word® and Excel® documents.

FIG. 27 is an example of a graphical user interface, provided in accordance with at least one embodiment of the present methods and systems, for creating new documents related to a particular loan. In one embodiment, hyperlinks 180 are provided to the user for uploading Microsoft® Word® and Excel® documents related to a particular loan.

Figure 28:
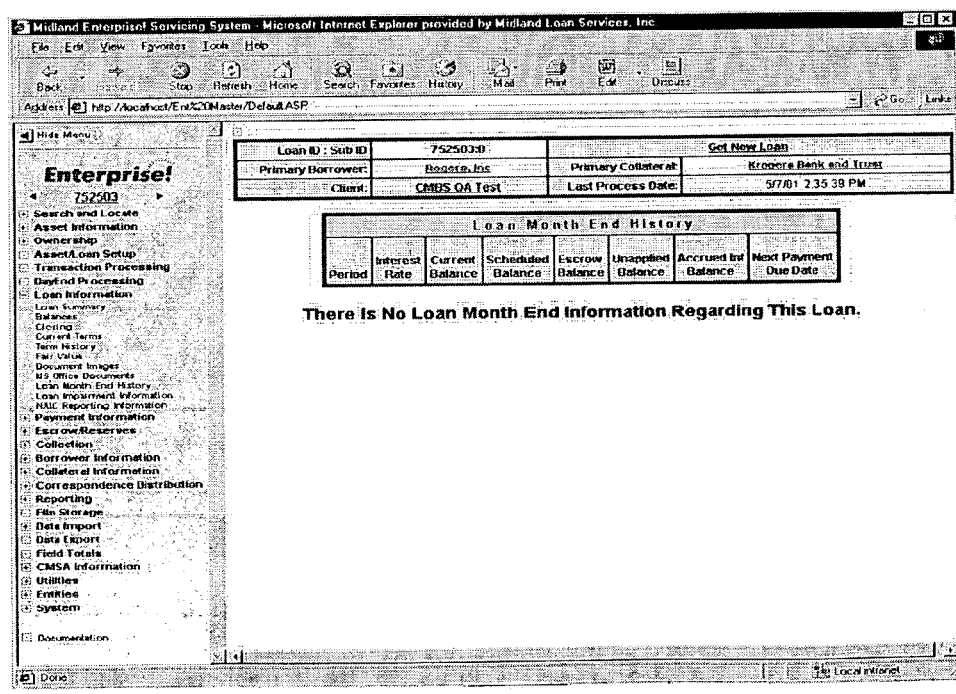
FIG. 28 is an example of a graphical user interface, provided in accordance with at least one embodiment of the present methods and systems, depicting month end information related to a loan.

FIG. 28 is an example of a graphical user interface, provided in accordance with at least one embodiment of the present methods and systems, depicting month end information related to a loan. This information can include the loan period, interest rate, loan balance, escrow balance, and/or payment due date.

Figure 29:
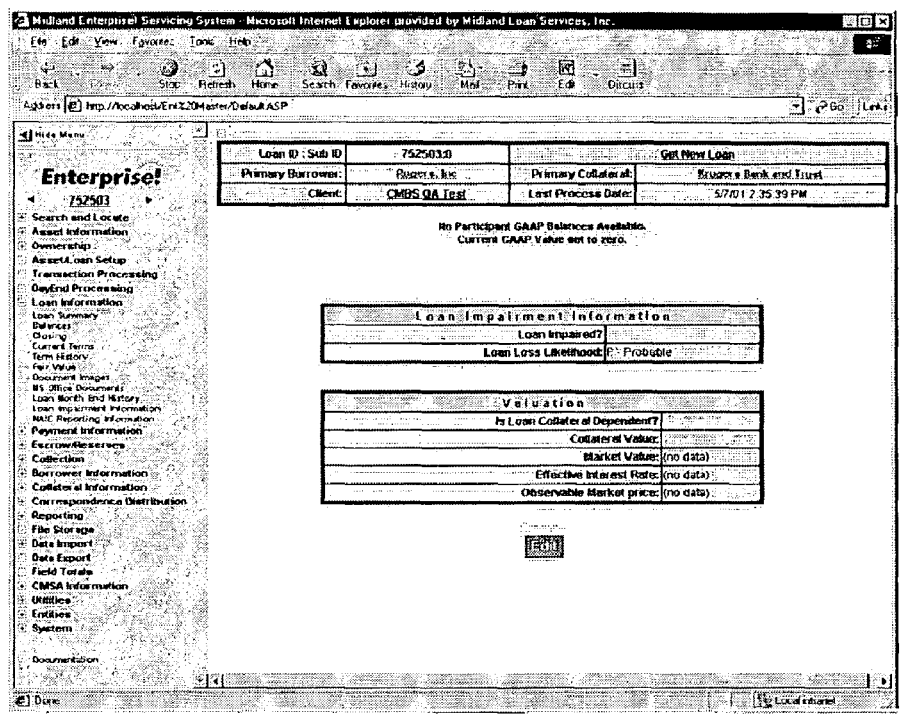
FIG. 29 is an example of a graphical user interface, provided in accordance with at least one embodiment of the present methods and systems, depicting loan impairment information.

FIG. 29 is an example of a graphical user interface, provided in accordance with at least one embodiment of the present methods and systems, depicting loan impairment information. If the collateral property is damaged, a loan is typically impaired to the extent that insurance does not cover the damage. This GUI tracks the extent of any impairment.

Figure 30:
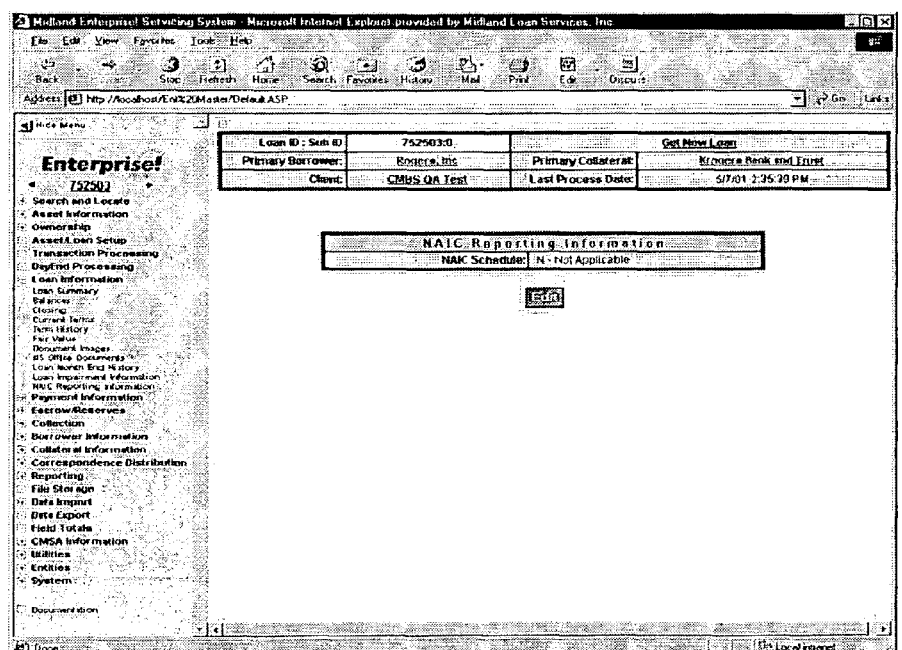
FIG. 30 is an example of a graphical user interface, provided in accordance with at least one embodiment of the present methods and systems, depicting National Association of Insurance Commissioners (NAIC) reporting information.

FIG. 30 is an example of a graphical user interface, provided in accordance with at least one embodiment of the present methods and systems, depicting National Association of Insurance Commissioners (NAIC) reporting information. This information is relevant as it may form the basis of an impairment calculation. NAIC, among other things, creates rules for insurance company reporting. In one embodiment of the present methods and systems, an insurance company lends money to a commercial borrower creating a mortgagor-mortgagee relationship. As the NAIC reporting requirements differ from conventional lending institution reporting requirements, the present methods and systems can be flexibly adapted, via robust business rules, to accommodate the different reporting requirements.

Figure 31:
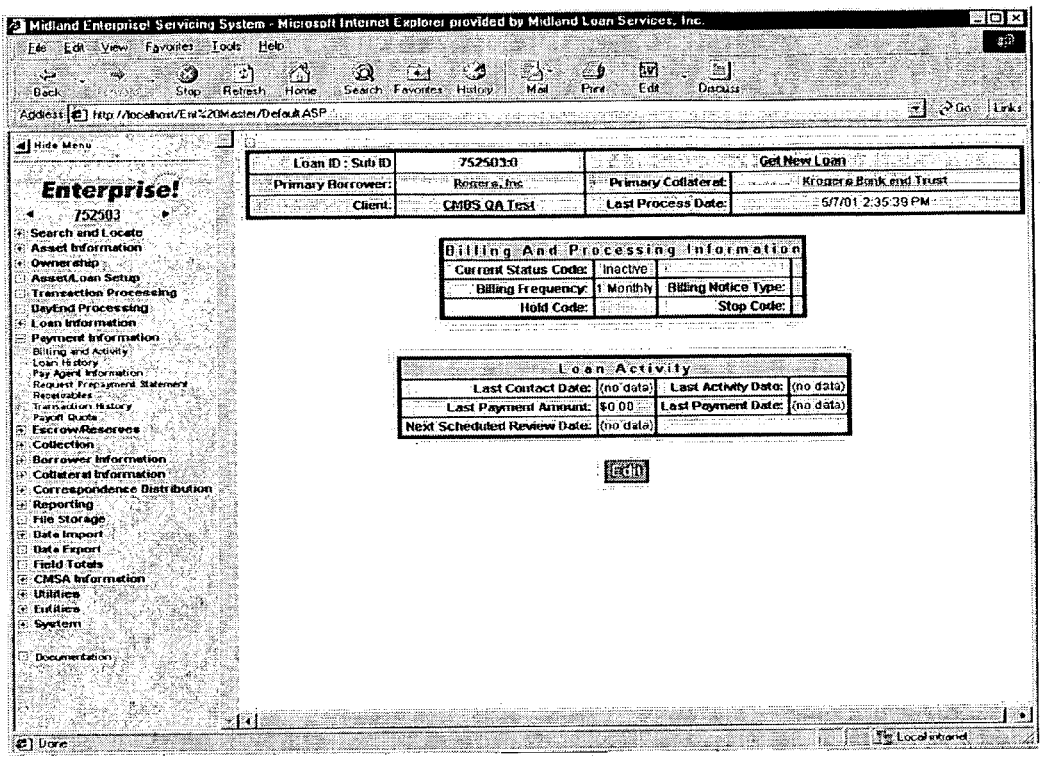
FIG. 31 is an example of a graphical user interface, provided in accordance with at least one embodiment of the present methods and systems, depicting dialog boxes showing billing and processing information and activity between the loan servicer and client.

FIG. 31 is an example of a graphical user interface, provided in accordance with at least one embodiment of the present methods and systems, depicting dialog boxes showing billing and processing information and activity between the loan servicer and client. As described above, a loan servicer communicates with the borrower and tracks the billing and processing information for a particular loan through this GUI.

Figure 32:
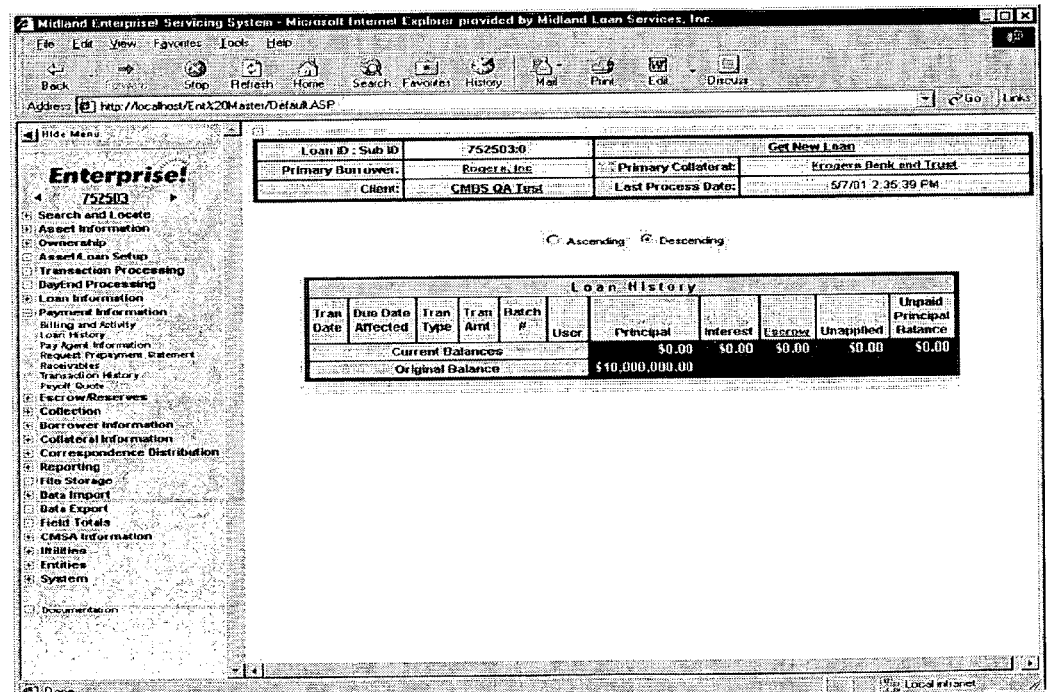
FIG. 32 is an example of a graphical user interface, provided in accordance with at least one embodiment of the present methods and systems, depicting loan history information.

FIG. 32 is an example of a graphical user interface, provided in accordance with at least one embodiment of the present methods and systems, depicting loan history information relating to borrower payment.

Figure 33:
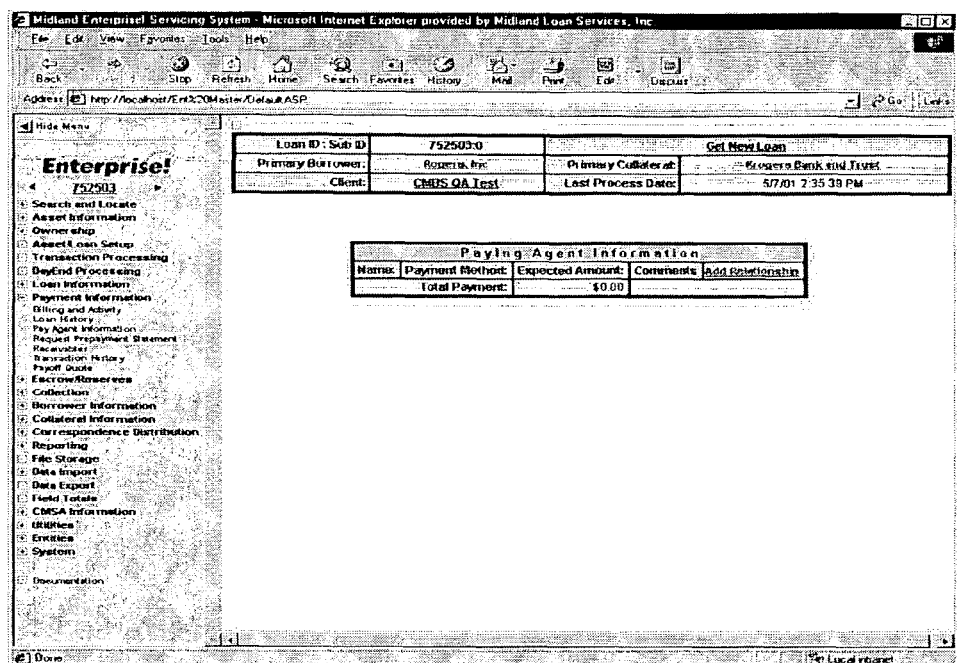
FIG. 33 is an example of a graphical user interface, provided in accordance with at least one embodiment of the present methods and systems, depicting loan payment information.

FIG. 33 is an example of a graphical user interface, provided in accordance with at least one embodiment of the present methods and systems, depicting loan payment agent information. This GUI tracks and displays the paying agent for a particular loan and the relationship of the agent to the lender and borrower.

Figure 34:
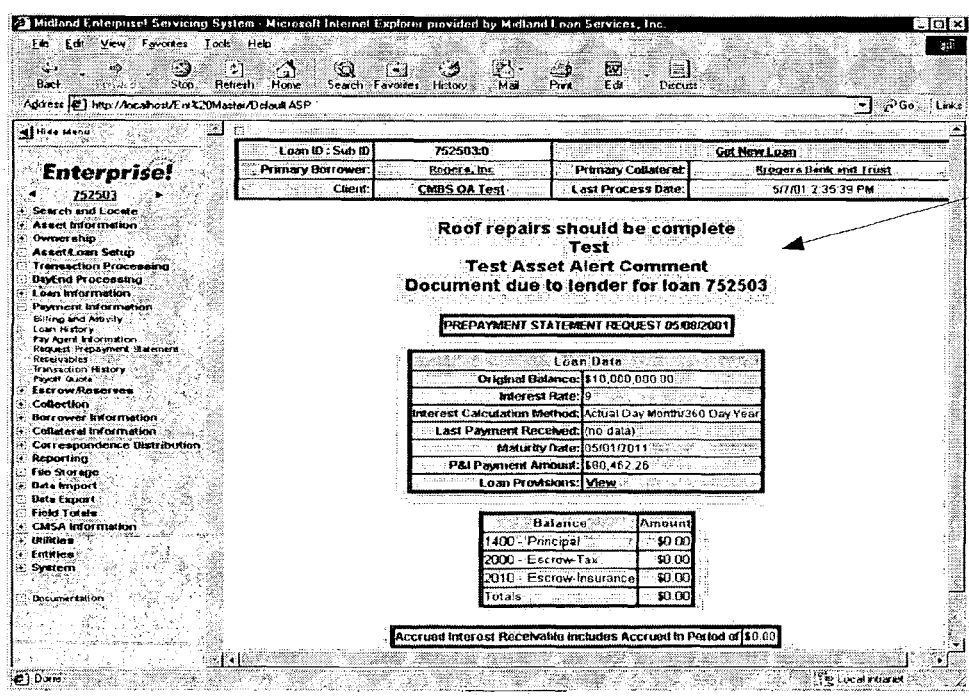
FIG. 34 is an example of a graphical user interface, provided in accordance with at least one embodiment of the present methods and systems, depicting prepayment statement information as well as alert comments.

FIG. 34 is an example of a graphical user interface, provided in accordance with at least one embodiment of the present methods and systems, depicting prepayment statement information and alert comments 200.

Figure 35:
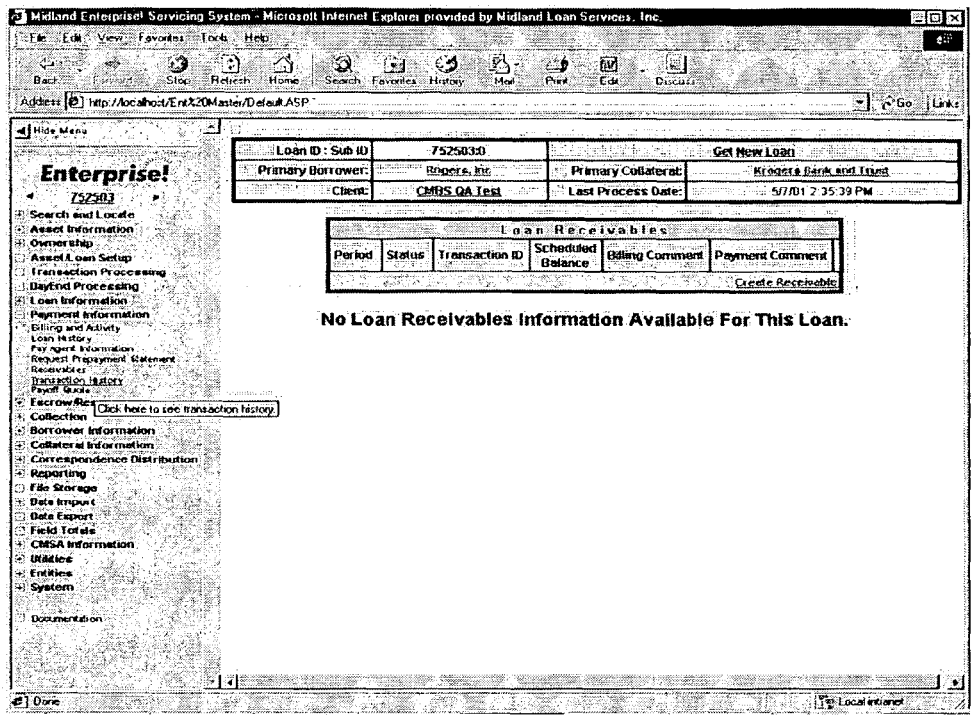
FIG. 35 is an example of a graphical user interface, provided in accordance with at least one embodiment of the present methods and systems, depicting loan receivables.

FIG. 35 is an example of a graphical user interface, provided in accordance with at least one embodiment of the present methods and systems, depicting loan receivables. The loan receivables GUI includes period, balance, billing and payment comments.

Figure 36:
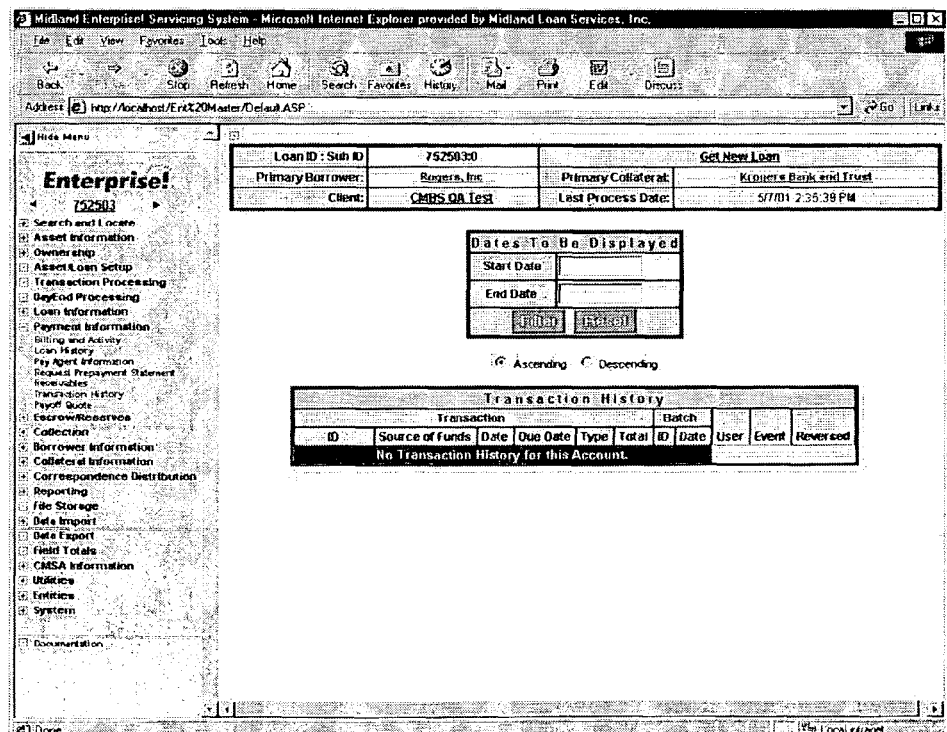
FIG. 36 is an example of a graphical user interface, provided in accordance with at least one embodiment of the present methods and systems, depicting loan transaction history.

FIG. 36 is an example of a graphical user interface, provided in accordance with at least one embodiment of the present methods and systems, depicting loan transaction history. The transaction history is displayed chronologically based on one or more user input date criteria.

Figure 37:
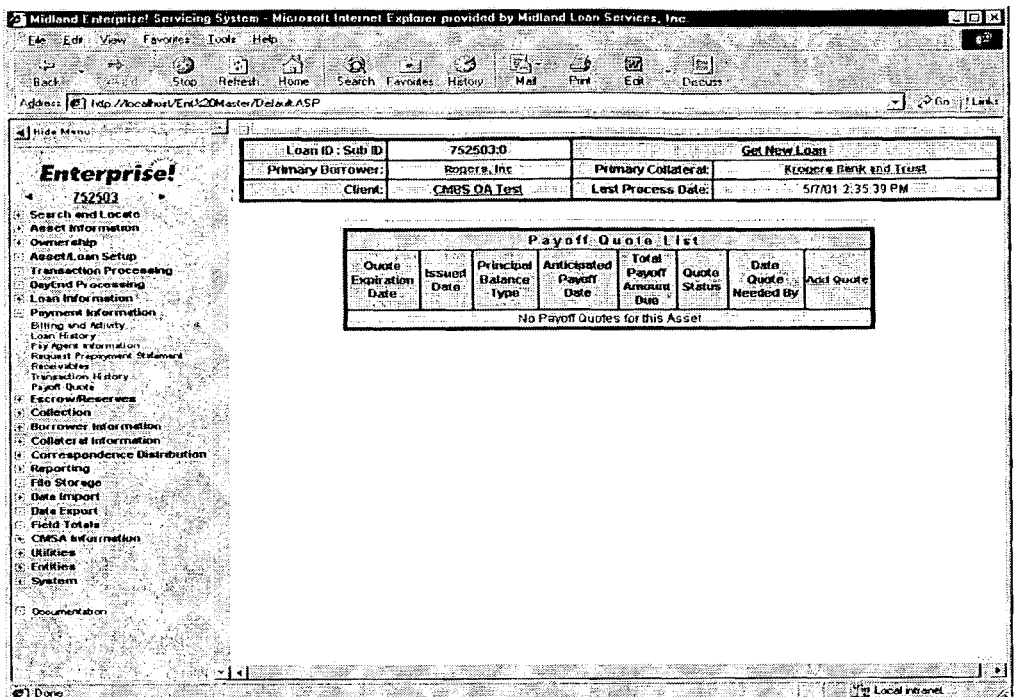
FIG. 37 is an example of a graphical user interface, provided in accordance with at least one embodiment of the present methods and systems, depicting payoff quotes given for a particular loan.

FIG. 37 is an example of a graphical user interface, provided in accordance with at least one embodiment of the present methods and systems, depicting payoff quotes generated and provided to a borrower for a particular loan.

Figure 38:
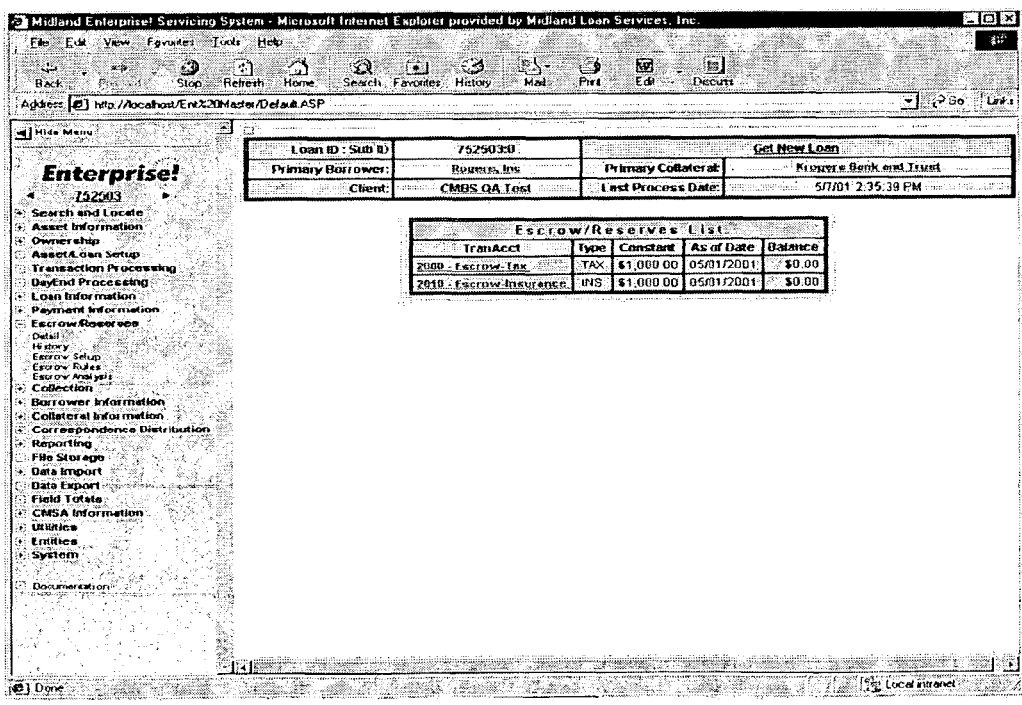
FIG. 38 is an example of a graphical user interface, provided in accordance with at least one embodiment of the present methods and systems, depicting escrow/reserves information relating to a particular loan.

FIG. 38 is an example of a graphical user interface, provided in accordance with at least one embodiment of the present methods and systems, depicting escrow/reserves information relating to a particular loan.

Figures 39, 40:
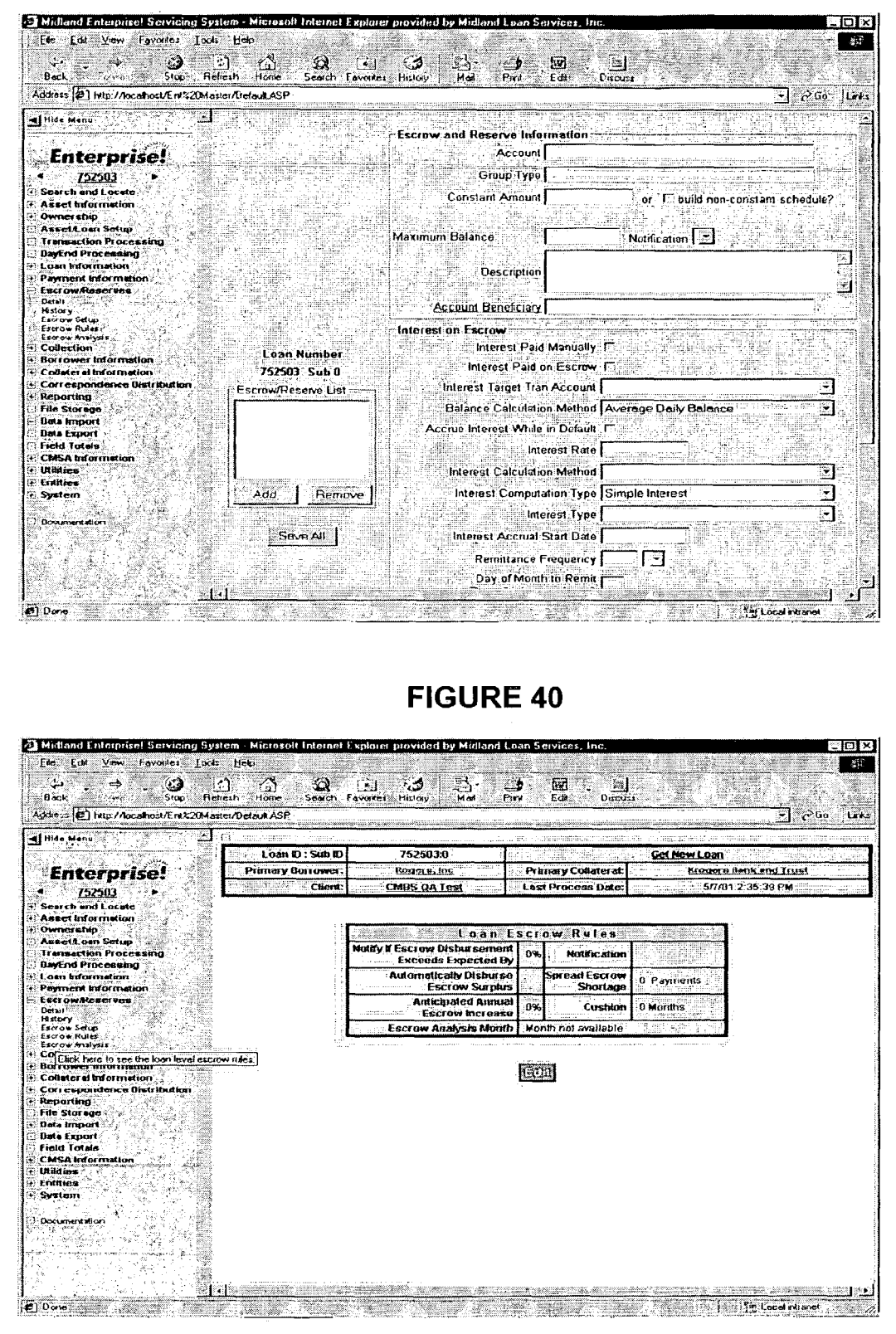

FIG. 39 is an example of a graphical user interface, provided in accordance with at least one embodiment of the present methods and systems, depicting detailed information relating to escrow and reserve information. The present methods and systems enable a user to calculate interest on any balance associated with a loan or collateral. This is accomplished, in one embodiment of the present methods and systems, through user defined business rules.

FIG. 40 is an example of a graphical user interface, provided in accordance with at least one embodiment of the present methods and systems, depicting loan escrow rules. The rules form part of the business objects and compiled rules. The rules are stored in the transaction server 60.

Figure 41:
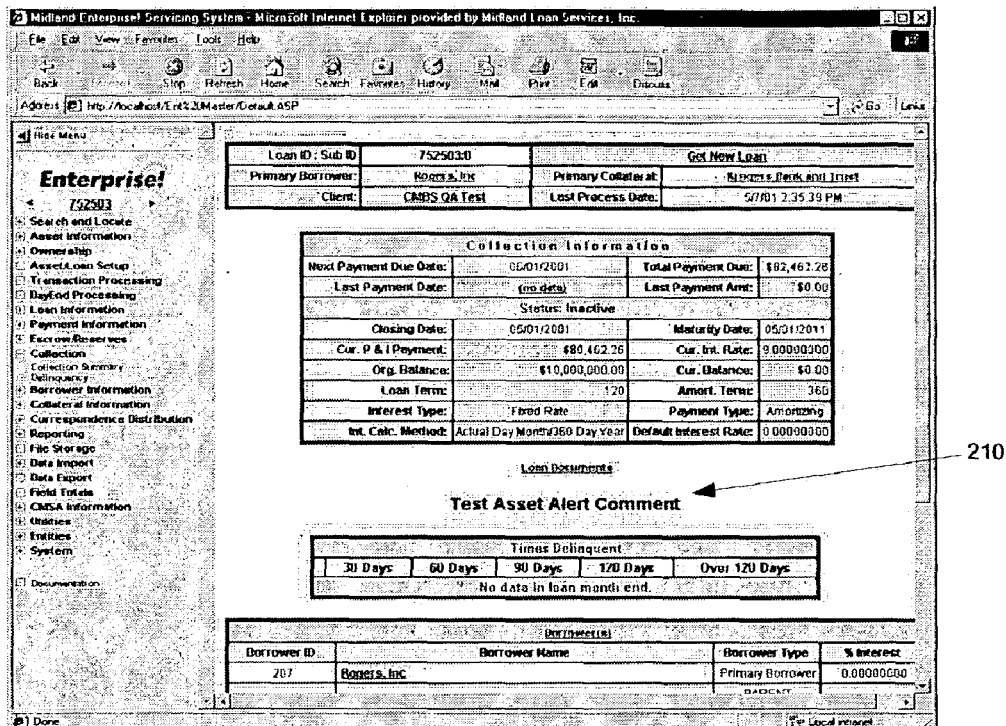
FIG. 41 is an example of a graphical user interface, provided in accordance with at least one embodiment of the present methods and systems, depicting loan collection information.

FIG. 41 is an example of a graphical user interface, provided in accordance with at least one embodiment of the present methods and systems, depicting loan collection information. The collection information includes original loan balance information, payment period, payment principal and interest, amortization terms, interest type, and interest calculation message. An alert comment field 210 is provided to convey loan collection information that may be considered important.

Figure 42:
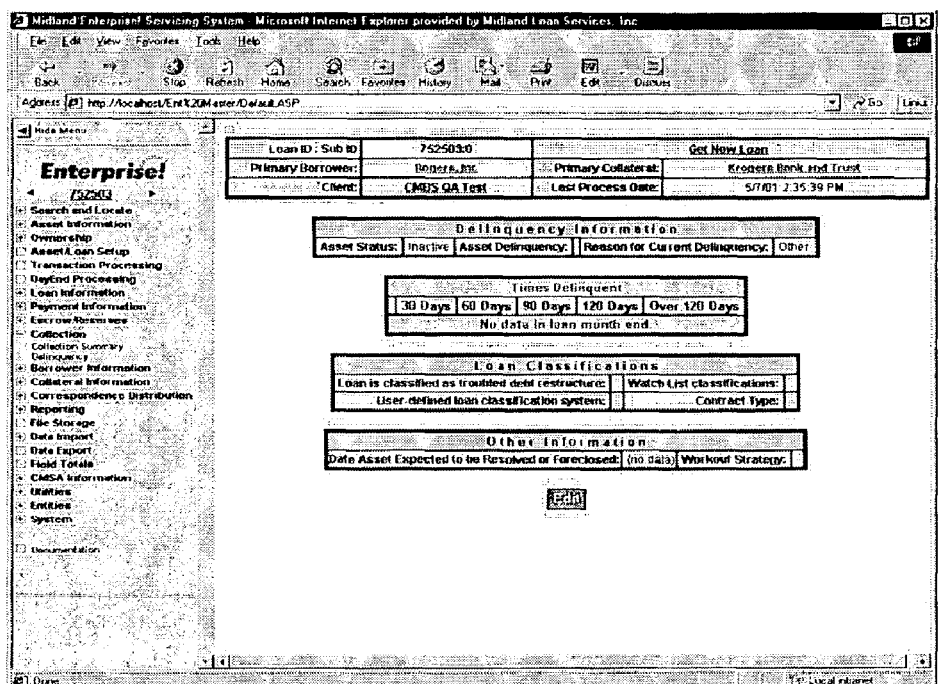
FIG. 42 is an example of a graphical user interface, provided in accordance with at least one embodiment of the present methods and systems, depicting loan payment delinquency information.

FIG. 42 is an example of a graphical user interface, provided in accordance with at least one embodiment of the present methods and systems, depicting loan payment delinquency information. The information includes the number of delinquent payments and the number of days/months delinquent, loan classifications, and other information regarding loan foreclosure or resolution.

Figure 43:
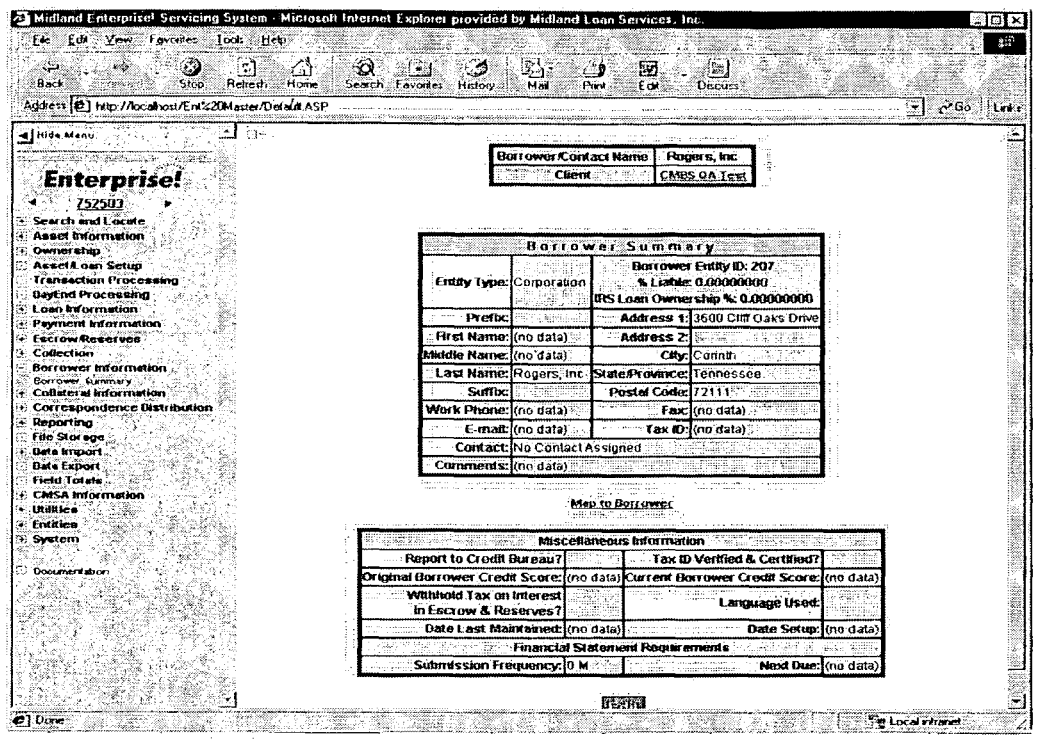
FIG. 43 is an example of a graphical user interface, provided in accordance with at least one embodiment of the present methods and systems, depicting a summary of information relating to a loan borrower.

FIG. 43 is an example of a graphical user interface, provided in accordance with at least one embodiment of the present methods and systems, depicting a summary of information relating to a loan borrower. Miscellaneous information is also displayed that includes credit score, and tax identification if the borrower is a corporation.

Figure 44:
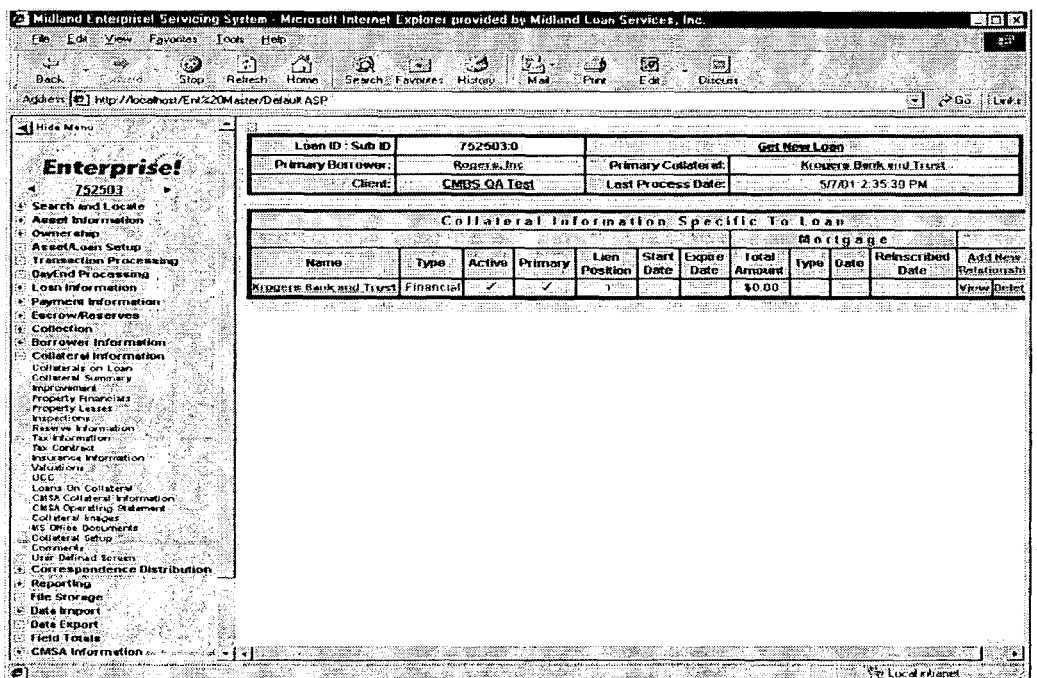
FIG. 44 is an example of a graphical user interface, provided in accordance with at least one embodiment of the present methods and systems, depicting collateral information specific to a loan.

FIG. 44 is an example of a graphical user interface, provided in accordance with at least one embodiment of the present methods and systems, depicting collateral information specific to a loan.

Figure 45:
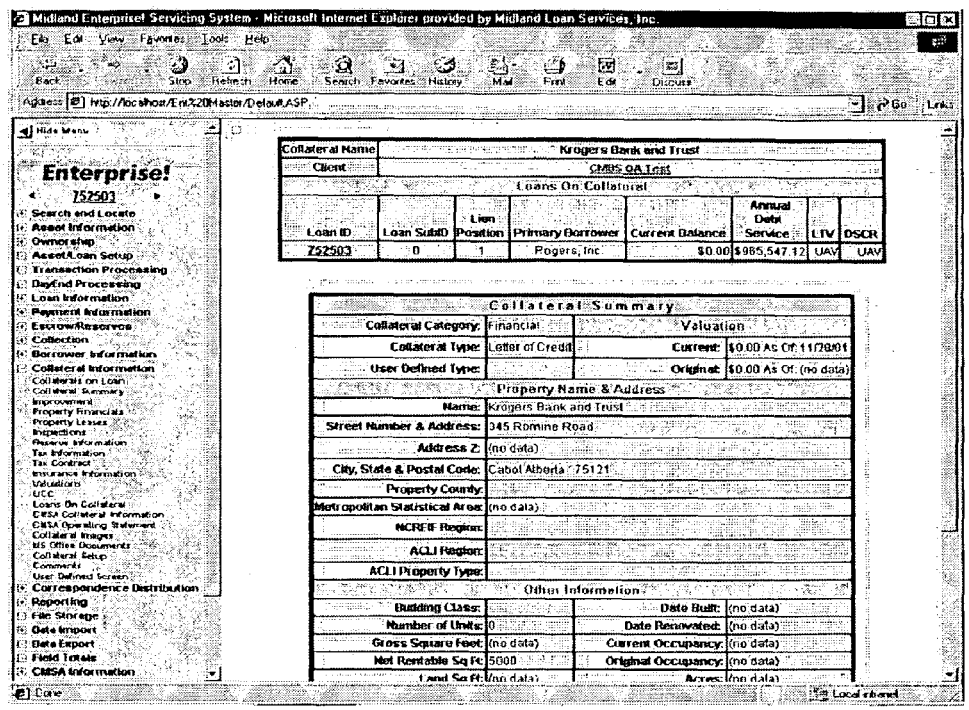
FIG. 45 is an example of a graphical user interface, provided in accordance with at least one embodiment of the present methods and systems, depicting a summary of information relating to loan collateral.

FIG. 45 is an example of a graphical user interface, provided in accordance with at least one embodiment of the present methods and systems, depicting a summary of information relating to loan collateral.

Figure 46:
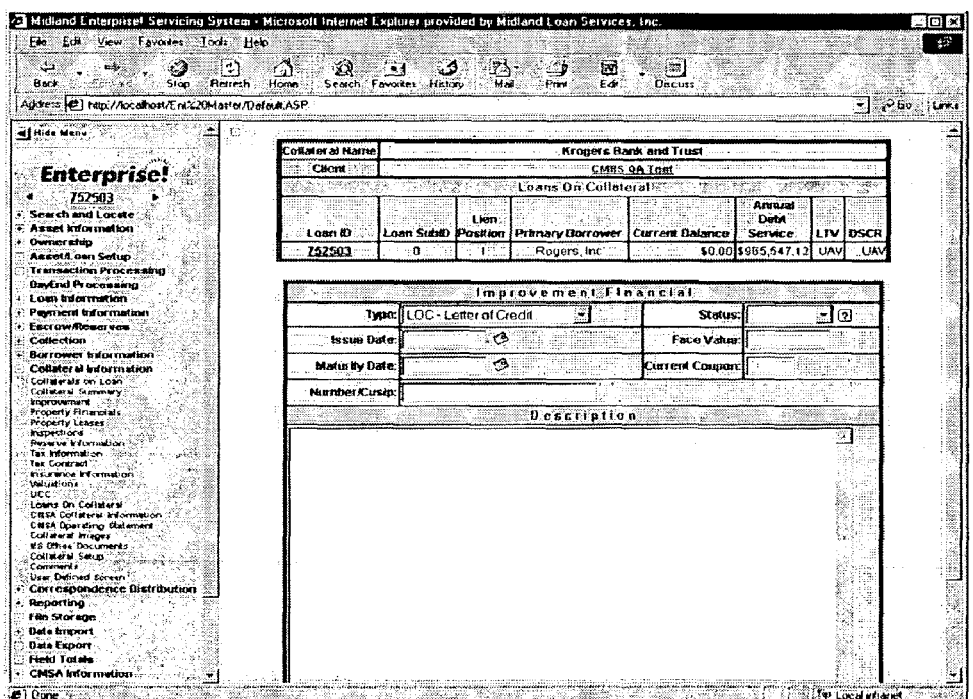
FIG. 46 is an example of a graphical user interface, provided in accordance with at least one embodiment of the present methods and systems, depicting financial information relating to collateral.

FIG. 46 is an example of a graphical user interface, provided in accordance with at least one embodiment of the present methods and systems, depicting financial information relating to collateral.

Figure 47:
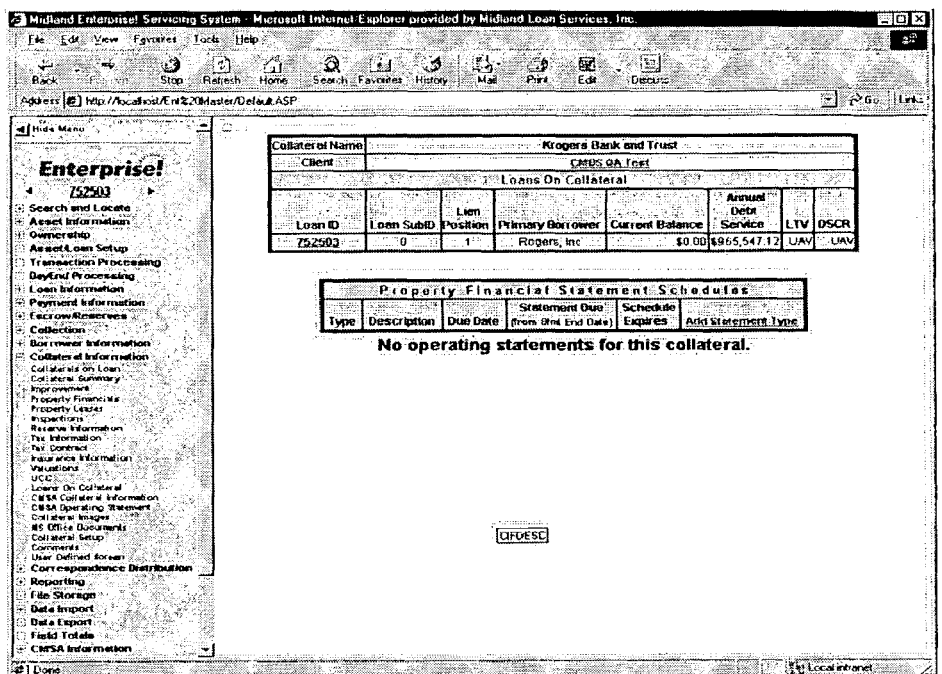
FIG. 47 is an example of a graphical user interface, provided in accordance with at least one embodiment of the present methods and systems, depicting financial statement schedules relating to collateral property.

FIG. 47 is an example of a graphical user interface, provided in accordance with at least one embodiment of the present methods and systems, depicting financial statement schedules relating to collateral property. This information is collected from the loan management database 12 and filtered through the business rules stored in the production and administration database 16.

Figure 48:
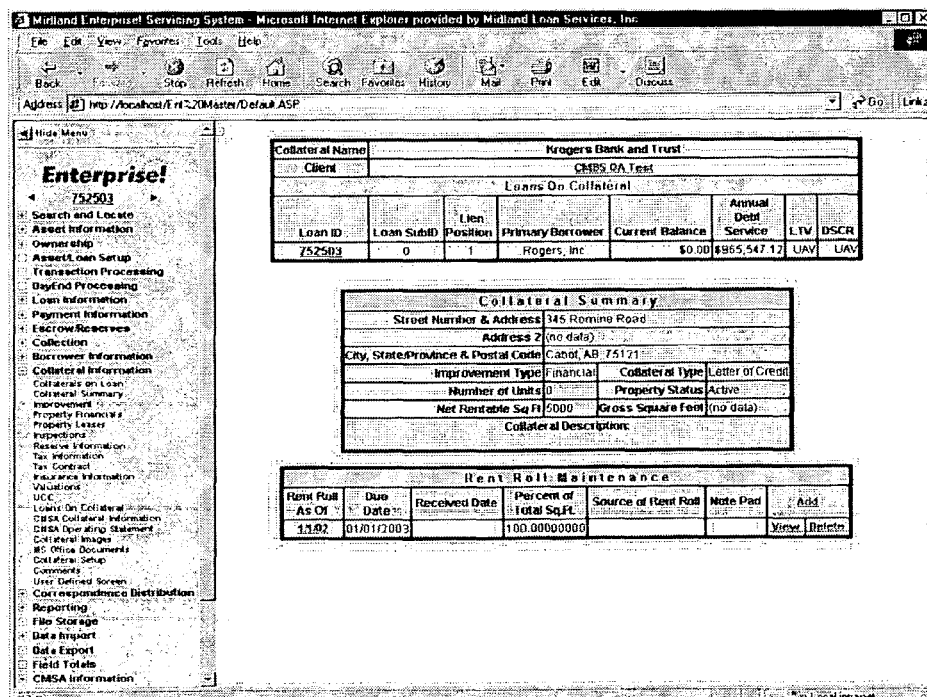
FIG. 48 is an example of a graphical user interface, provided in accordance with at least one embodiment of the present methods and systems, depicting summary information relating to collateral property and also rent roll maintenance.

FIG. 48 is an example of a graphical user interface, provided in accordance with at least one embodiment of the present methods and systems, depicting summary information relating to collateral property and also rent roll maintenance.

Figure 49:
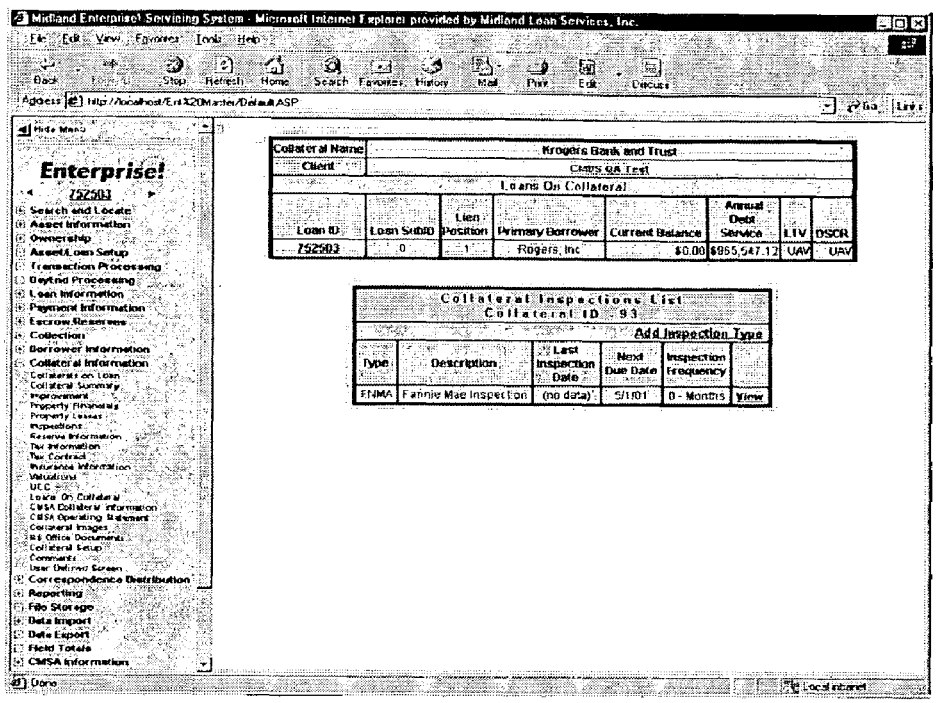
FIG. 49 is an example of a graphical user interface, provided in accordance with at least one embodiment of the present methods and systems, depicting collateral inspections list.

FIG. 49 is an example of a graphical user interface, provided in accordance with at least one embodiment of the present methods and systems, depicting collateral inspections list. This information is entered and stored, in one embodiment, in the contractor module 80.

Figure 50:
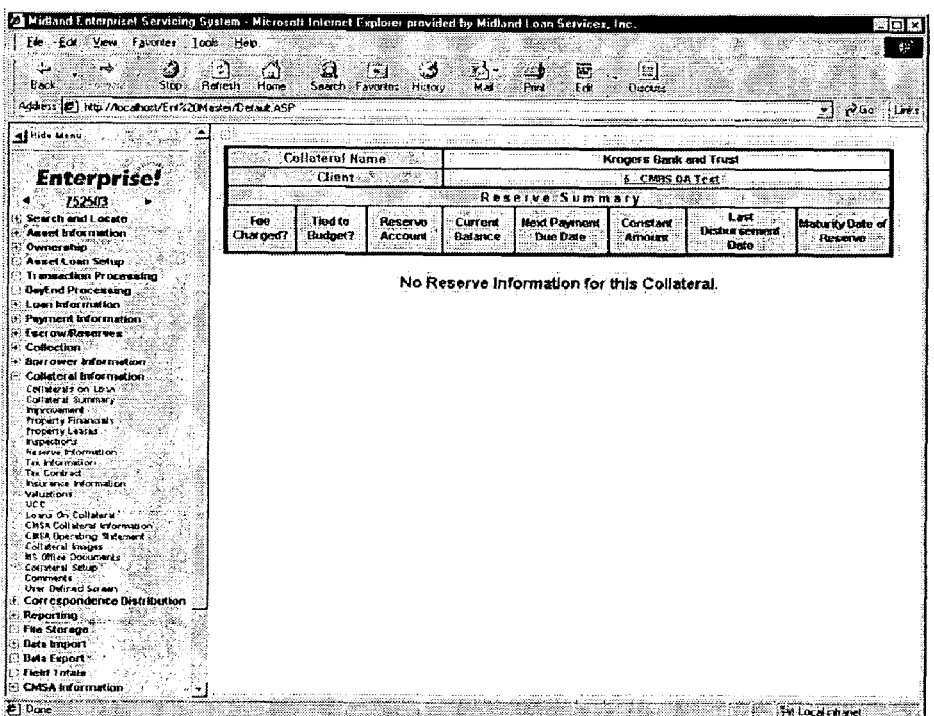
FIG. 50 is an example of a graphical user interface, provided in accordance with at least one embodiment of the present methods and systems, depicting summary reserve information related to collateral property.

FIG. 50 is an example of a graphical user interface, provided in accordance with at least one embodiment of the present methods and systems, depicting summary reserve information related to collateral property.

Figure 51:
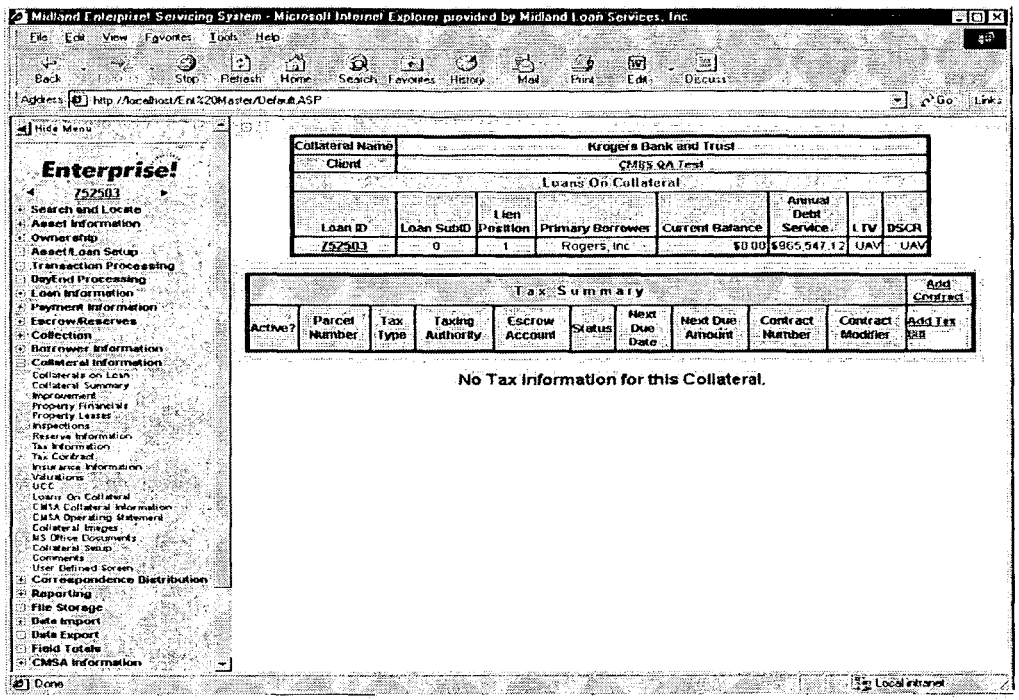
FIG. 51 is an example of a graphical user interface, provided in accordance with at least one embodiment of the present methods and systems, depicting summary tax information related to collateral property.

FIG. 51 is an example of a graphical user interface, provided in accordance with at least one embodiment of the present methods and systems, depicting summary tax information related to collateral property.

Figure 52:
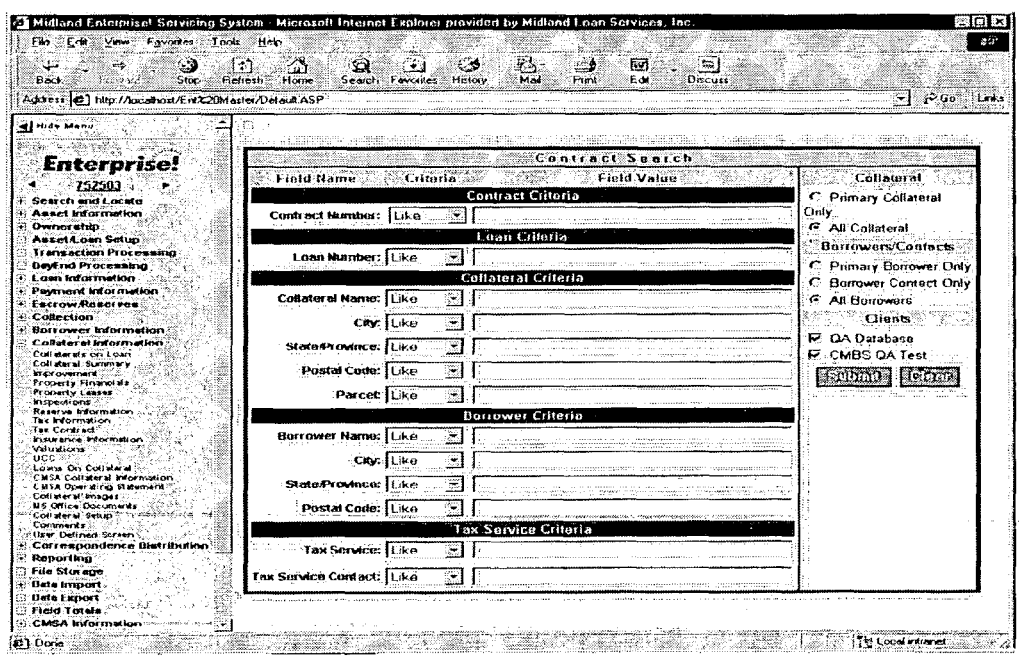
FIG. 52 is an example of a graphical user interface, provided in accordance with at least one embodiment of the present methods and systems, for searching for information related to contracts for collateral property.

FIG. 52 is an example of a graphical user interface, provided in accordance with at least one embodiment of the present methods and systems, for searching for information related to contracts for collateral property.

Figure 53:
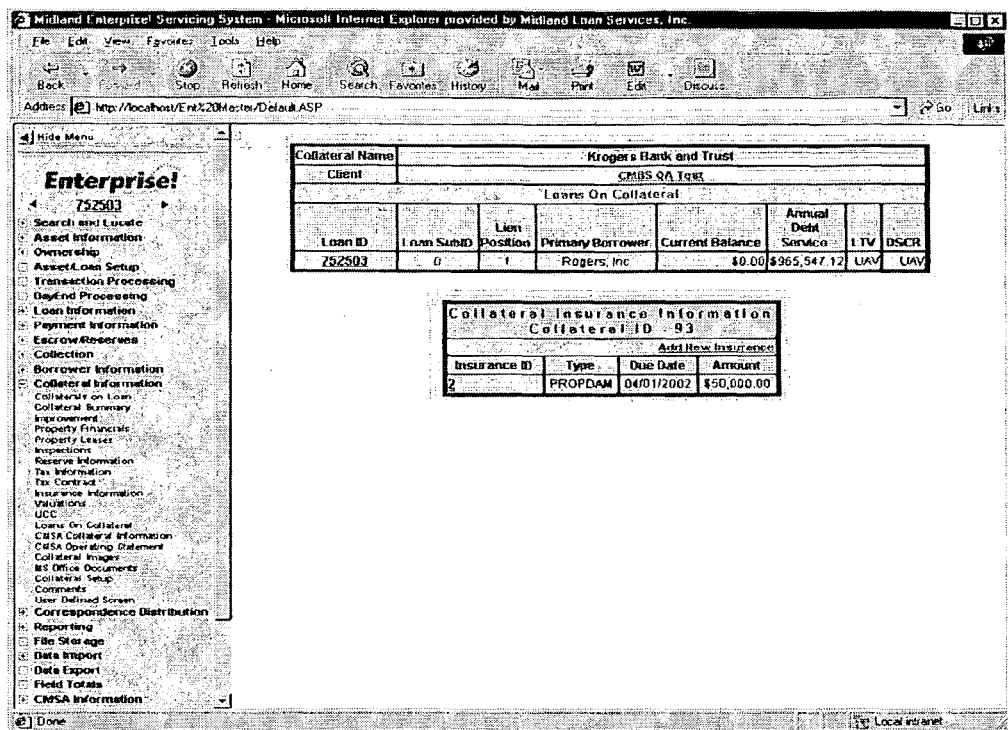
FIG. 53 is an example of a graphical user interface, provided in accordance with at least one embodiment of the present methods and systems, for entering and viewing collateral property insurance information.

FIG. 53 is an example of a graphical user interface, provided in accordance with at least one embodiment of the present methods and systems, for entering and viewing collateral property insurance information.

Figure 54:
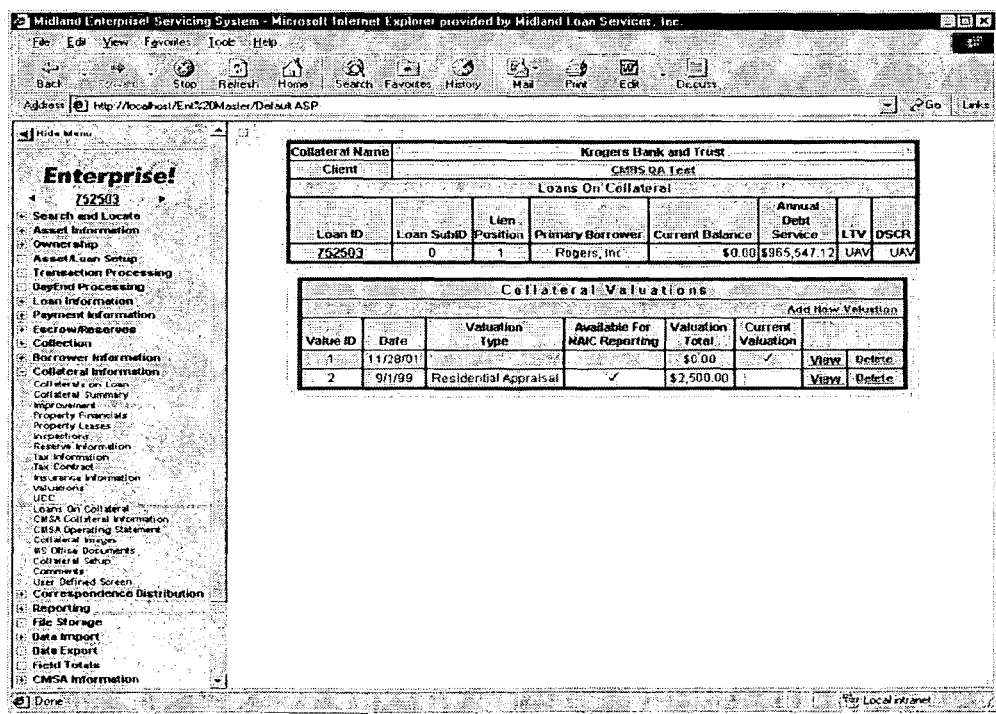
FIG. 54 is an example of a graphical user interface, provided in accordance with at least one embodiment of the present methods and systems, for entering and viewing collateral property valuations.

FIG. 54 is an example of a graphical user interface, provided in accordance with at least one embodiment of the present methods and systems, for entering and viewing collateral property valuations. This information is entered, in one embodiment via the contractor module 80.

Figure 55:
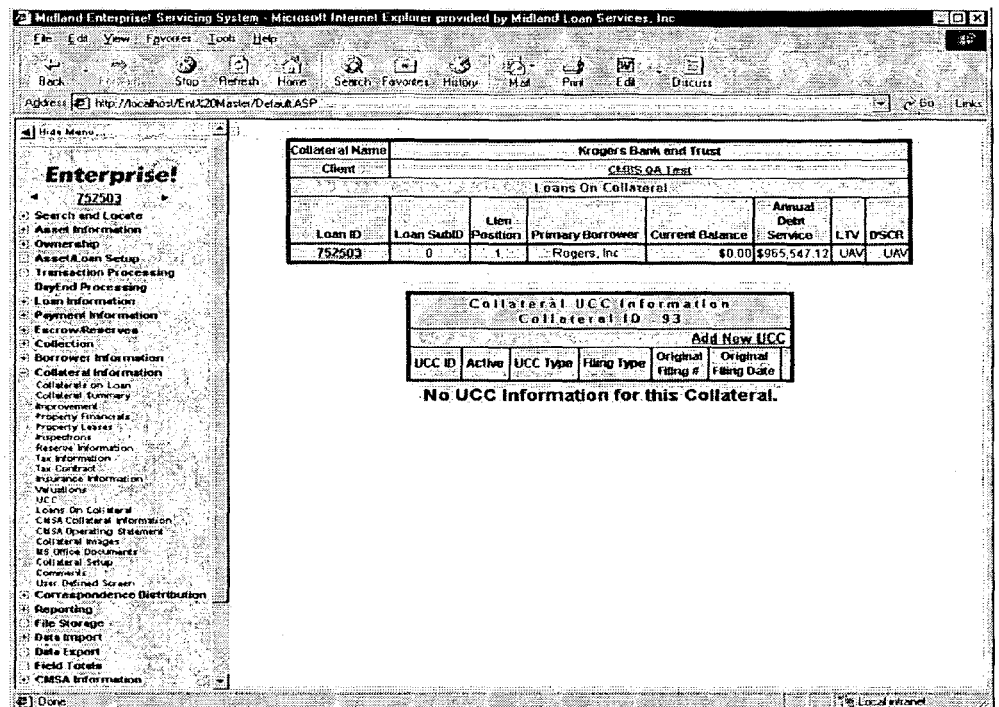
FIG. 55 is an example of a graphical user interface, provided in accordance with at least one embodiment of the present methods and systems, for entering and viewing loans on collateral property and collateral property UCC information.

FIG. 55 is an example of a graphical user interface, provided in accordance with at least one embodiment of the present methods and systems, for entering and viewing loans on collateral property and collateral property UCC information.

Figure 56:
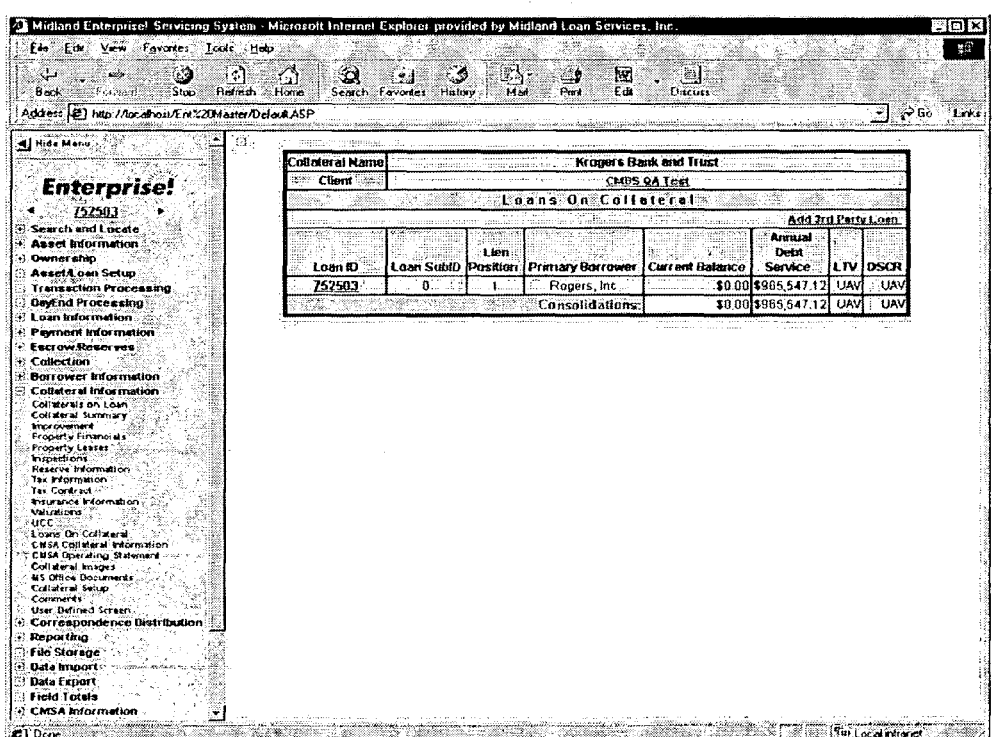
FIG. 56 is an example of a graphical user interface, provided in accordance with at least one embodiment of the present methods and systems, for entering and viewing loans on collateral property.

FIG. 56 is an example of a graphical user interface, provided in accordance with at least one embodiment of the present methods and systems, for entering and viewing loans on collateral property.

Figure 57:
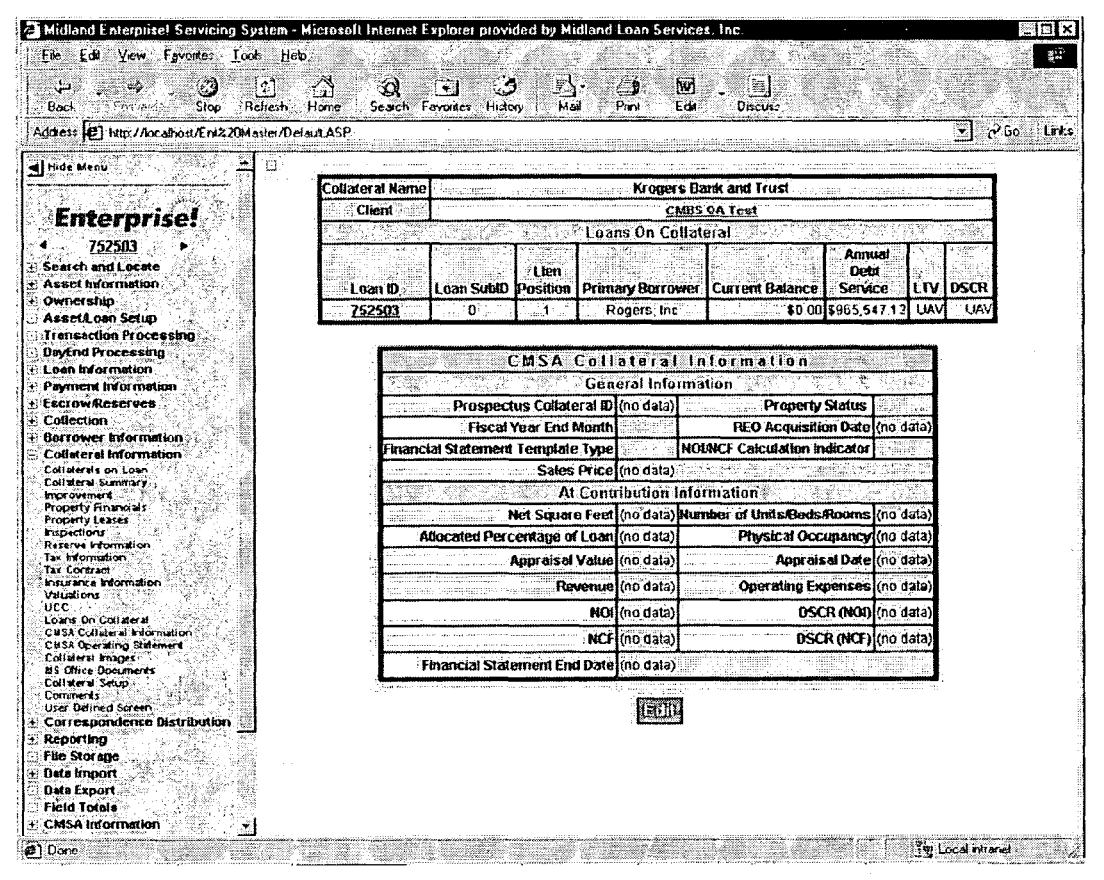

FIG. 57 is an example of a graphical user interface, provided in accordance with at least one embodiment of the present methods and systems, for editing and viewing Commercial Mortgage Securities Association (CMSA®) collateral property information.

Figure 58:
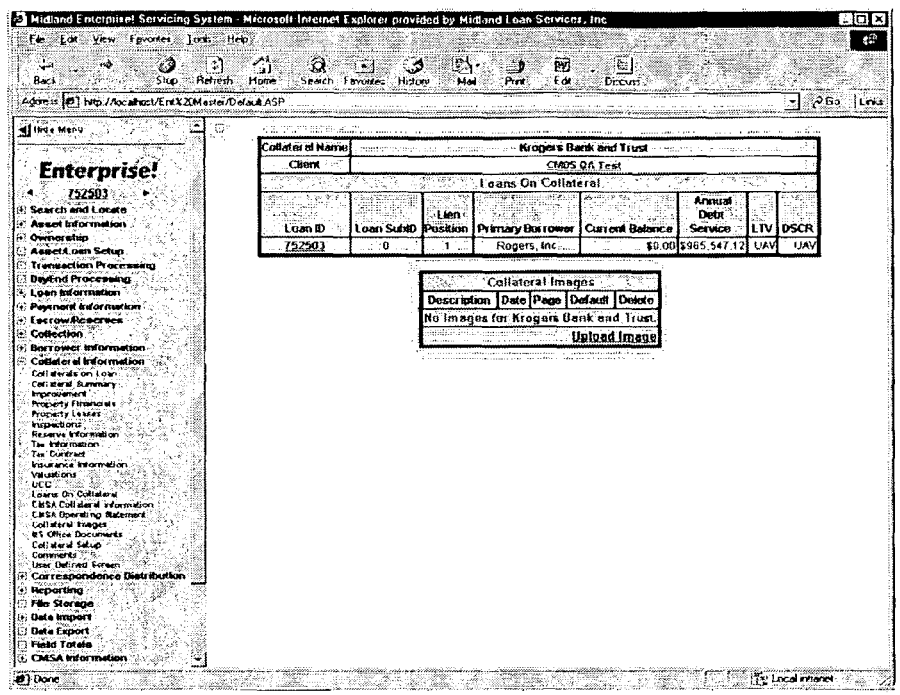
FIG. 58 is an example of a graphical user interface, provided in accordance with at least one embodiment of the present methods and systems, for entering and viewing collateral property image files.

FIG. 58 is an example of a graphical user interface, provided in accordance with at least one embodiment of the present methods and systems, for entering and viewing collateral property image files. Stored images in JPG and GIF, for example, may, in one embodiment, be uploaded and stored with associated collateral property information.

Figure 59:
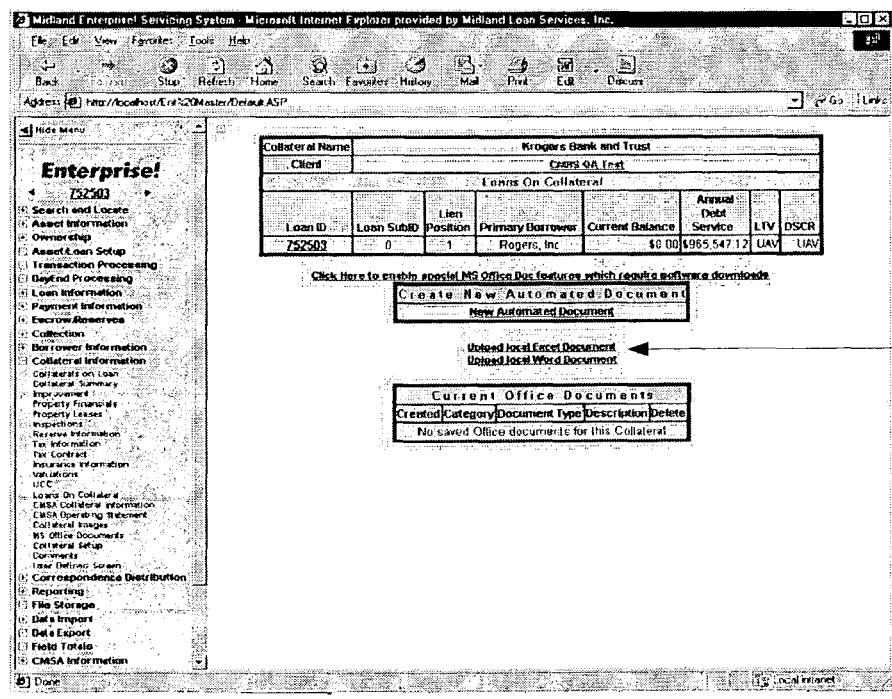
FIG. 59 is an example of a graphical user interface, provided in accordance with at least one embodiment of the present methods and systems, for creating new documents related to particular collateral.

FIG. 59 is an example of a graphical user interface, provided in accordance with at least one embodiment of the present methods and systems, for creating new documents related to particular collateral. In one embodiment, hyperlinks 230 are provided to the user for uploading Microsoft® Word® and Excel® documents.

Figure 60:
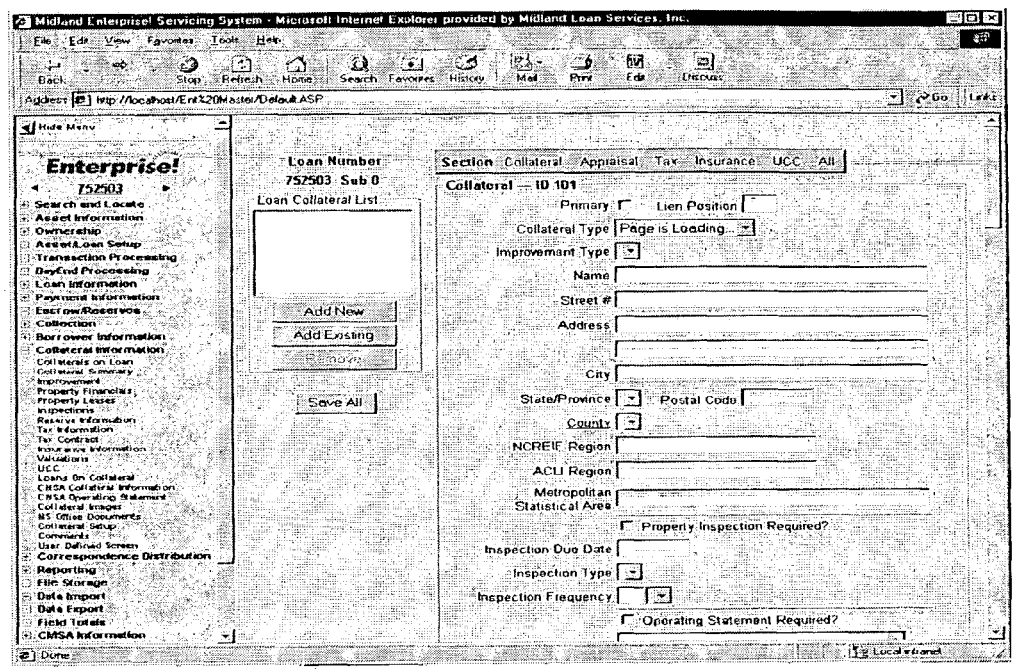
FIG. 60 is an example of a graphical user interface, provided in accordance with at least one embodiment of the present methods and systems, for entering and viewing new collateral property for a particular loan.

FIG. 60 is an example of a graphical user interface, provided in accordance with at least one embodiment of the present methods and systems, for entering and viewing new collateral property for a particular loan.

Figure 61:
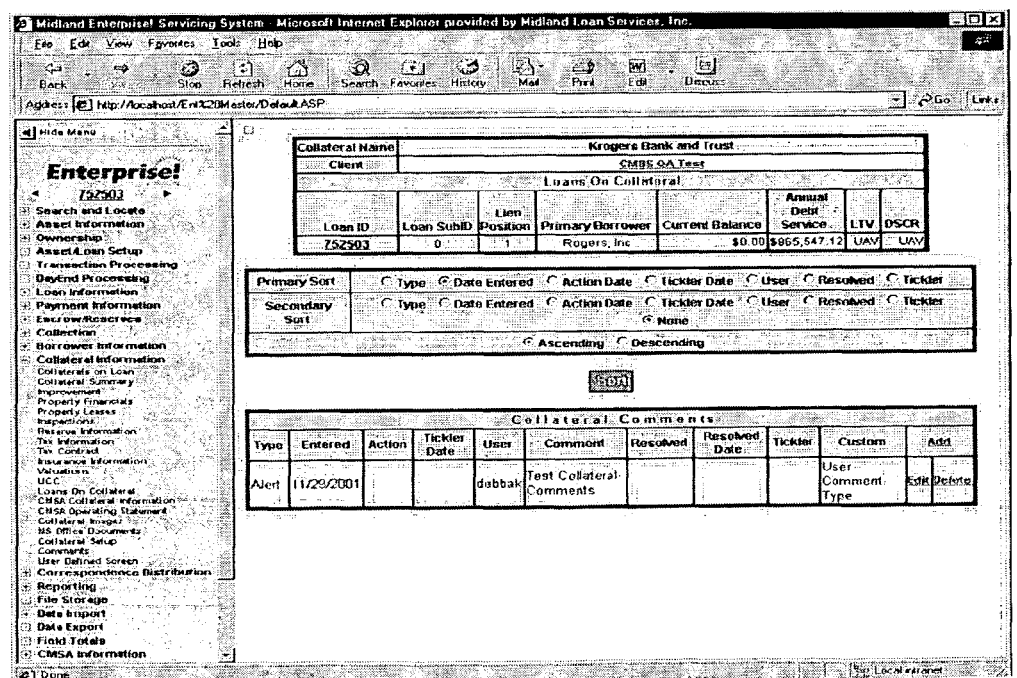
FIG. 61 is an example of a graphical user interface, provided in accordance with at least one embodiment of the present methods and systems, for entering, viewing and sorting user entered comments related to particular collateral property.

FIG. 61 is an example of a graphical user interface, provided in accordance with at least one embodiment of the present methods and systems, for entering, viewing and sorting user-entered comments related to particular collateral property.

Figure 62:
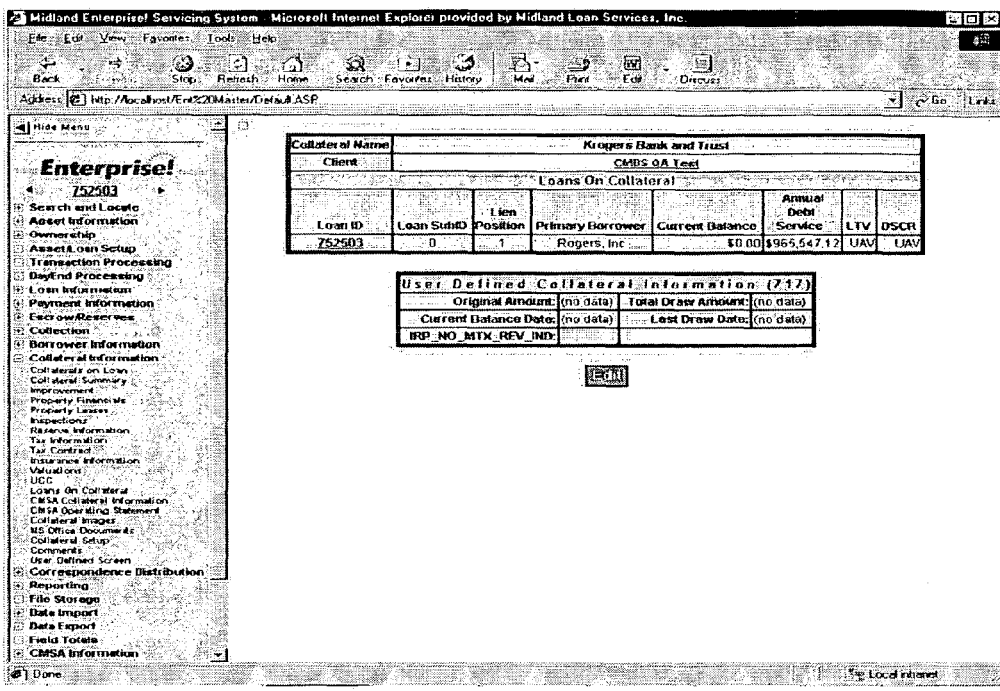
FIG. 62 is an example of a graphical user interface, provided in accordance with at least one embodiment of the present methods and systems, for editing and viewing user defined collateral property information.

FIG. 62 is an example of a graphical user interface, provided in accordance with at least one embodiment of the present methods and systems, for editing and viewing user defined collateral property information.

Figure 63:
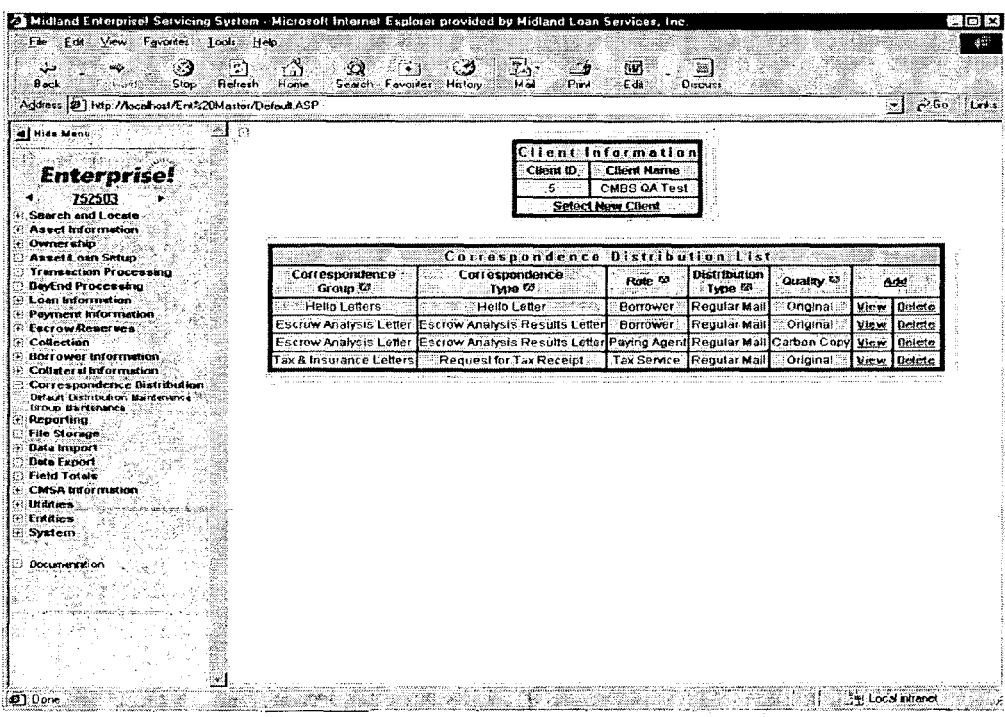
FIG. 63 is an example of a graphical user interface, provided in accordance with at least one embodiment of the present methods and systems, for entering and viewing client correspondence.

FIG. 63 is an example of a graphical user interface, provided in accordance with at least one embodiment of the present methods and systems, for entering and viewing client correspondence generated, in one example of one embodiment, by a loan servicer.

Figure 64:
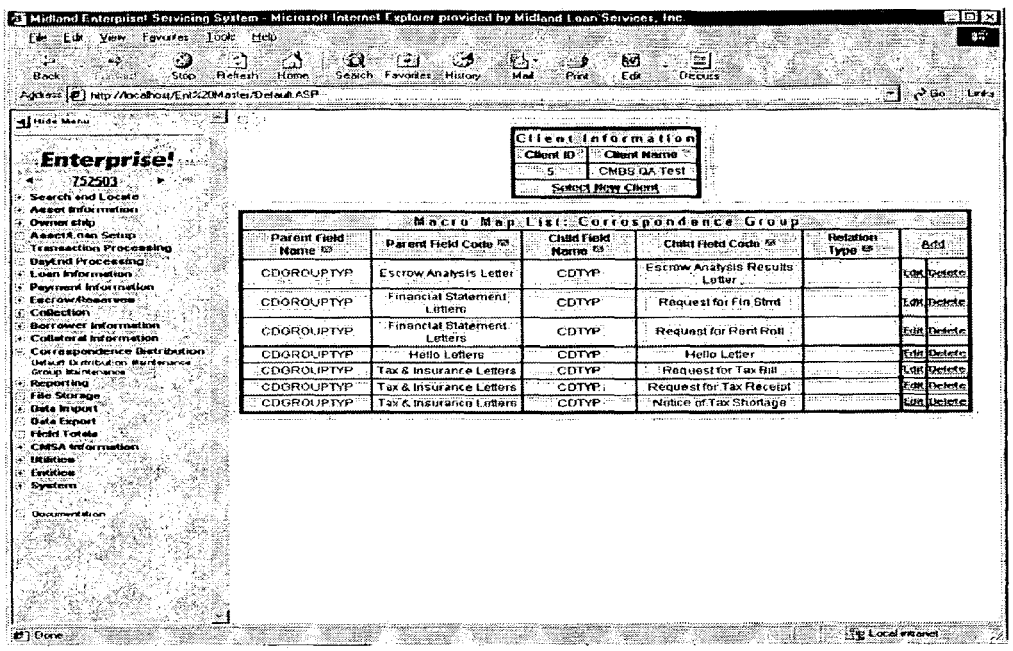
FIG. 64 is an example of a graphical user interface, provided in accordance with at least one embodiment of the present methods and systems, for entering and viewing correspondence group lists.

FIG. 64 is an example of a graphical user interface, provided in accordance with at least one embodiment of the present methods and systems, for entering and viewing correspondence group lists.

Figure 65:
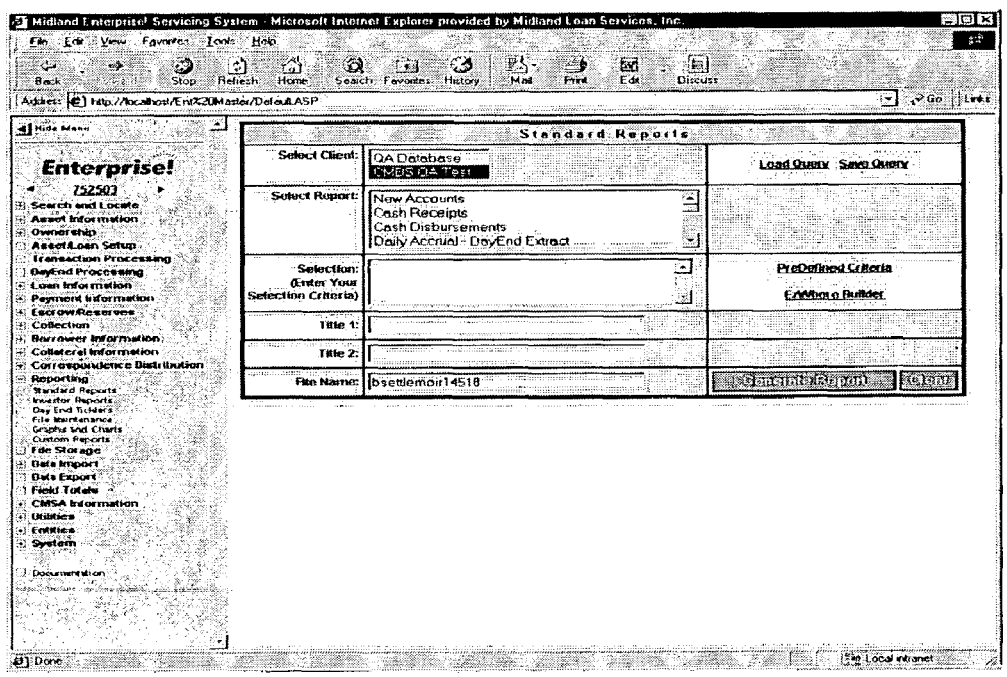
FIG. 65 is an example of a graphical user interface, provided in accordance with at least one embodiment of the present methods and systems, for generating reports.

FIG. 65 is an example of a graphical user interface, provided in accordance with at least one embodiment of the present methods and systems, for generating standard reports related to collateral property and loan reports.

Figure 66:
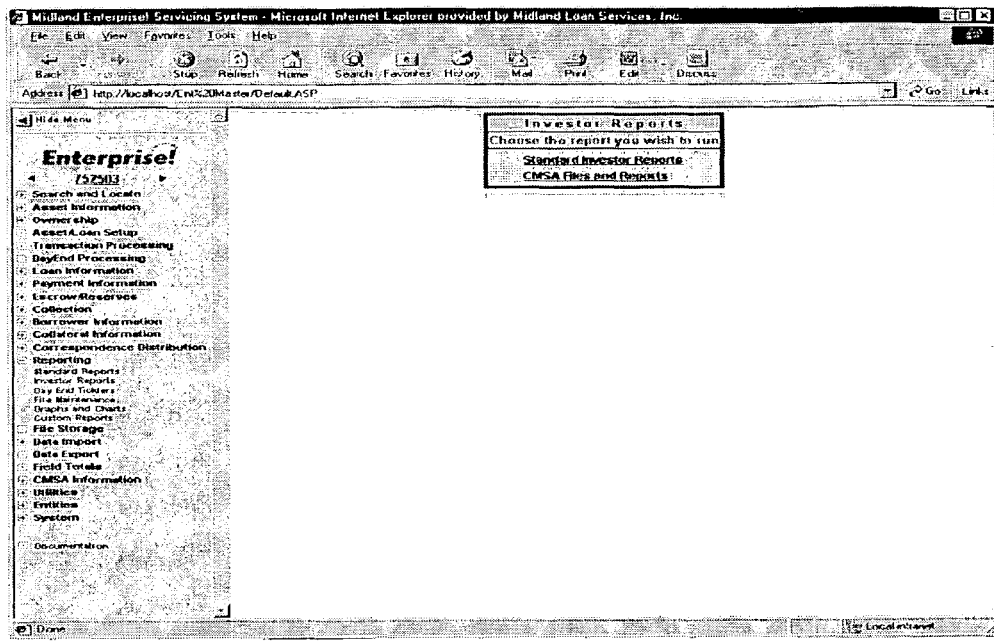
FIG. 66 is an example of a graphical user interface, provided in accordance with at least one embodiment of the present methods and systems, for generating investor reports.

FIG. 66 is an example of a graphical user interface, provided in accordance with at least one embodiment of the present methods and systems, for generating investor reports.

Figure 67:
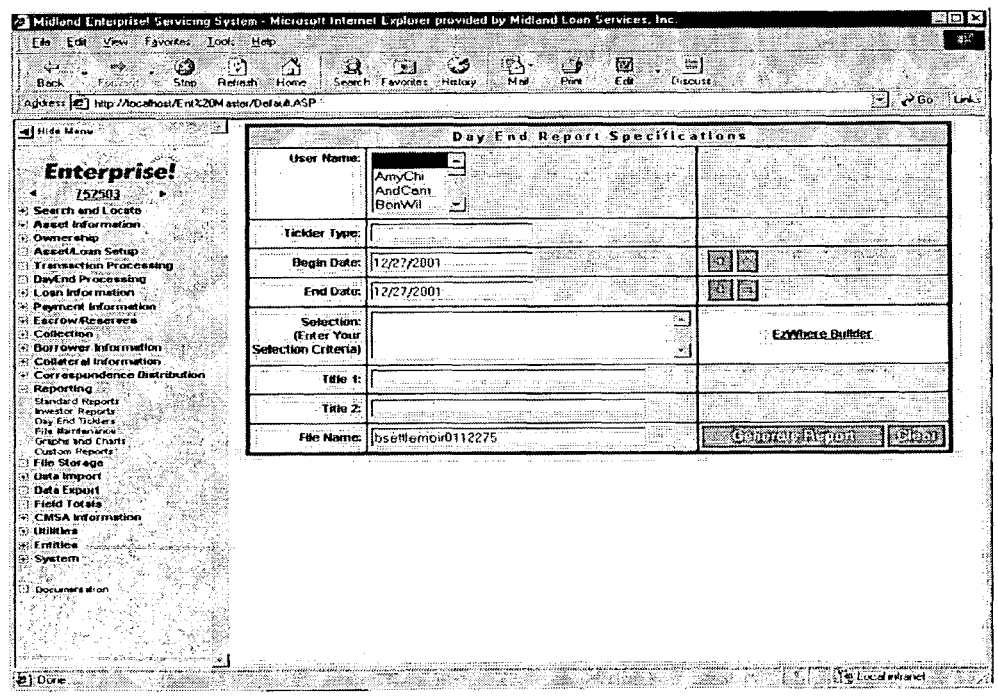
FIG. 67 is an example of a graphical user interface, provided in accordance with at least one embodiment of the present methods and systems, for generating day end tickler reports.

FIG. 67 is an example of a graphical user interface, provided in accordance with at least one embodiment of the present methods and systems, for generating day end tickler reports.

Figures 68, 69:
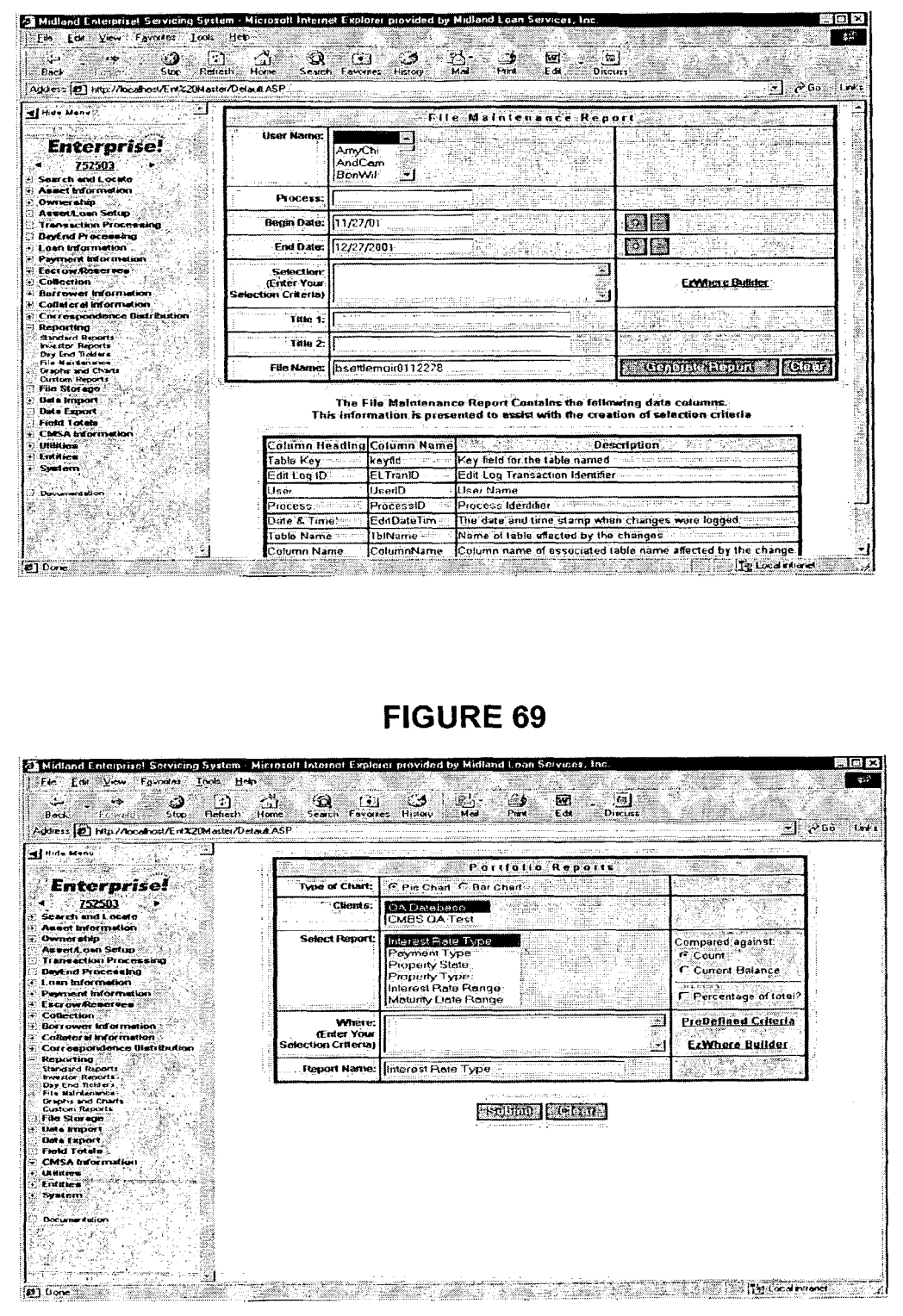

FIG. 68 is an example of a graphical user interface, provided in accordance with at least one embodiment of the present methods and systems, for entering and viewing information related to file maintenance.

FIG. 69 is an example of a graphical user interface, provided in accordance with at least one embodiment of the present methods and systems, for generating portfolio reports.

Figure 70:
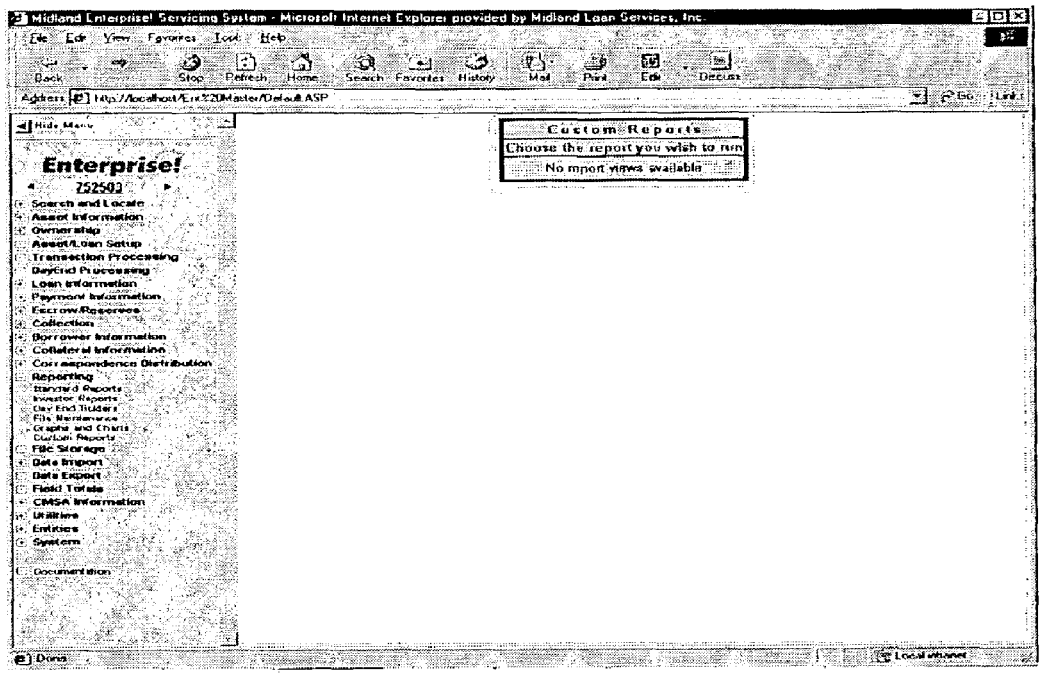
FIG. 70 is an example of a graphical user interface, provided in accordance with at least one embodiment of the present methods and systems, for generating custom reports.

FIG. 70 is an example of a graphical user interface, provided in accordance with at least one embodiment of the present methods and systems, for generating custom reports.

Figure 71:
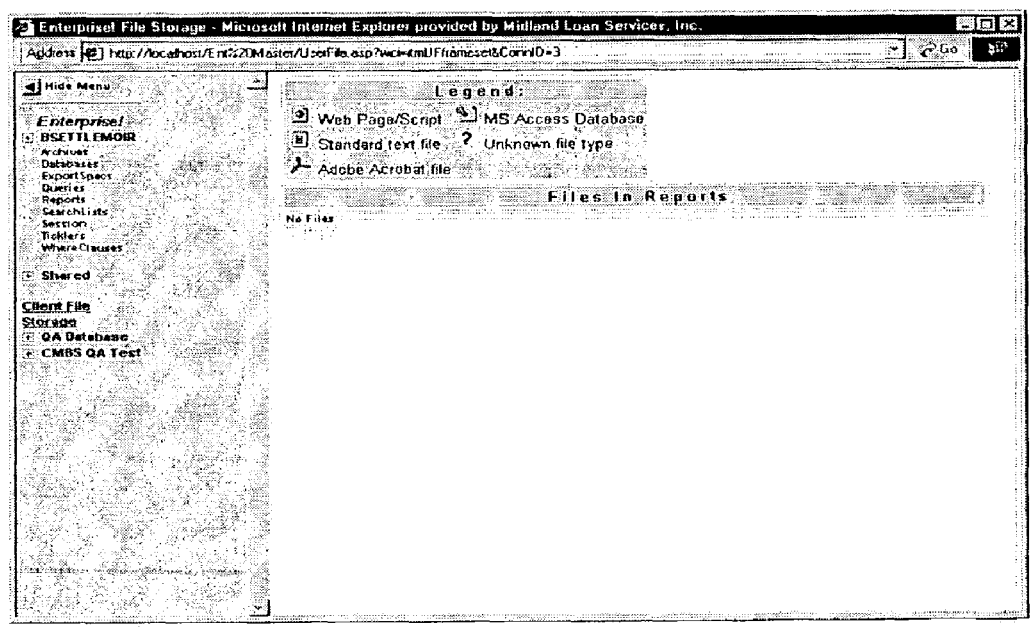
FIG. 71 is an example of a graphical user interface, provided in accordance with at least one embodiment of the present methods and systems, for storing generated reports as files in specified formats.

FIG. 71 is an example of a graphical user interface, provided in accordance with at least one embodiment of the present methods and systems, for storing generated reports as files in specified formats including Adobe® PDF, standard text file, HTML or MS® Access® database.

Figure 72:
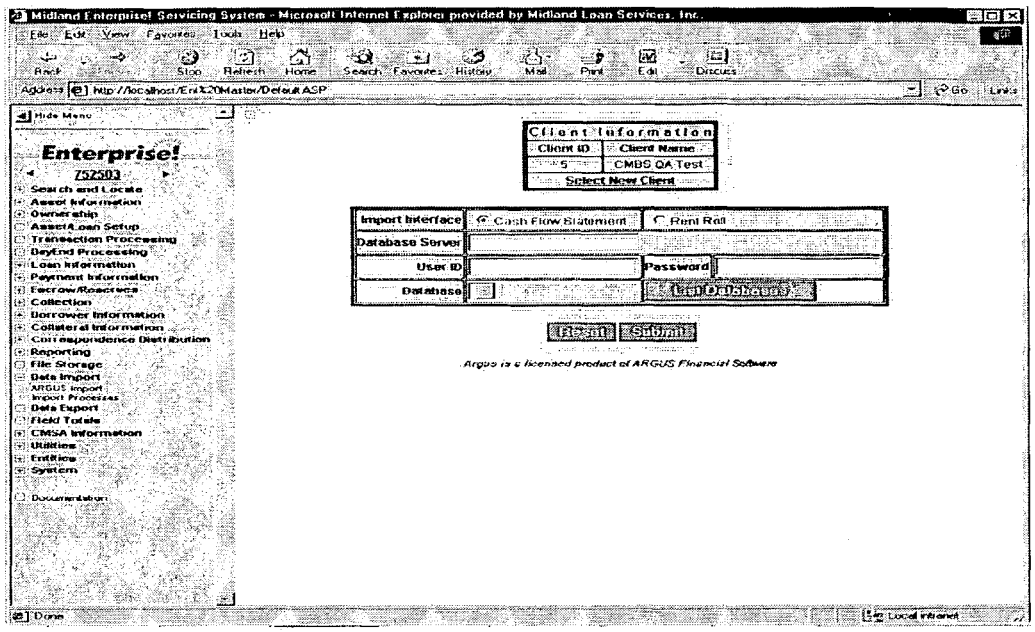
FIG. 72 is an example of a graphical user interface, provided in accordance with at least one embodiment of the present methods and systems, for importing data into the present system.

FIG. 72 is an example of a graphical user interface, provided in accordance with at least one embodiment of the present methods and systems, for importing data into the present system.

Figure 73:
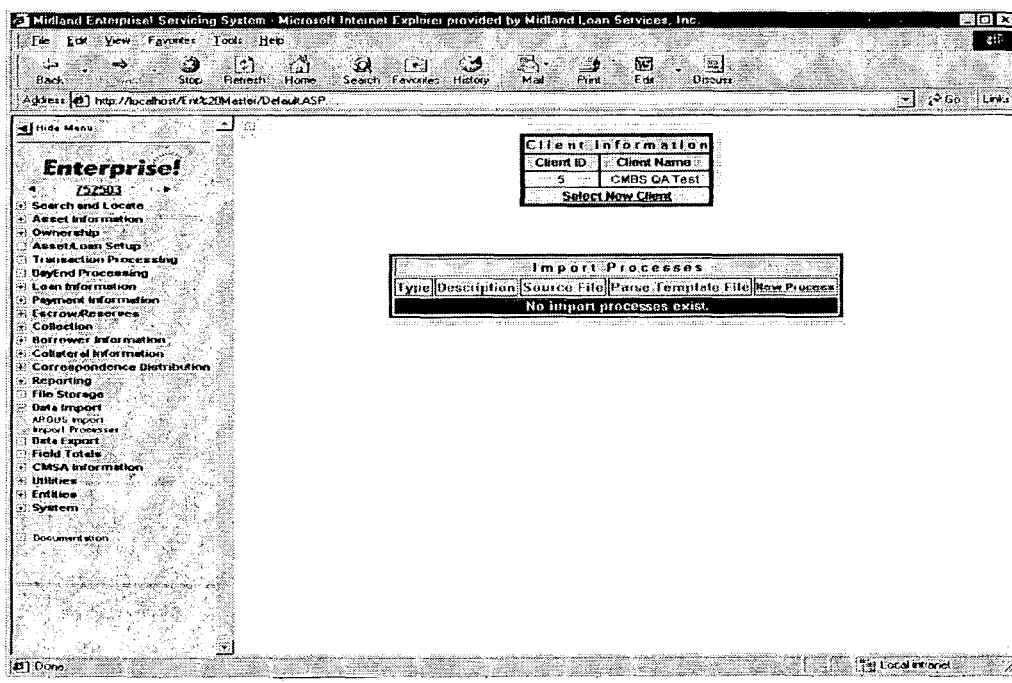
FIG. 73 is an example of a graphical user interface, provided in accordance with at least one embodiment of the present methods and systems, for initiating data import processes.

FIG. 73 is an example of a graphical user interface, provided in accordance with at least one embodiment of the present methods and systems, for initiating data import processes.

Figure 74:
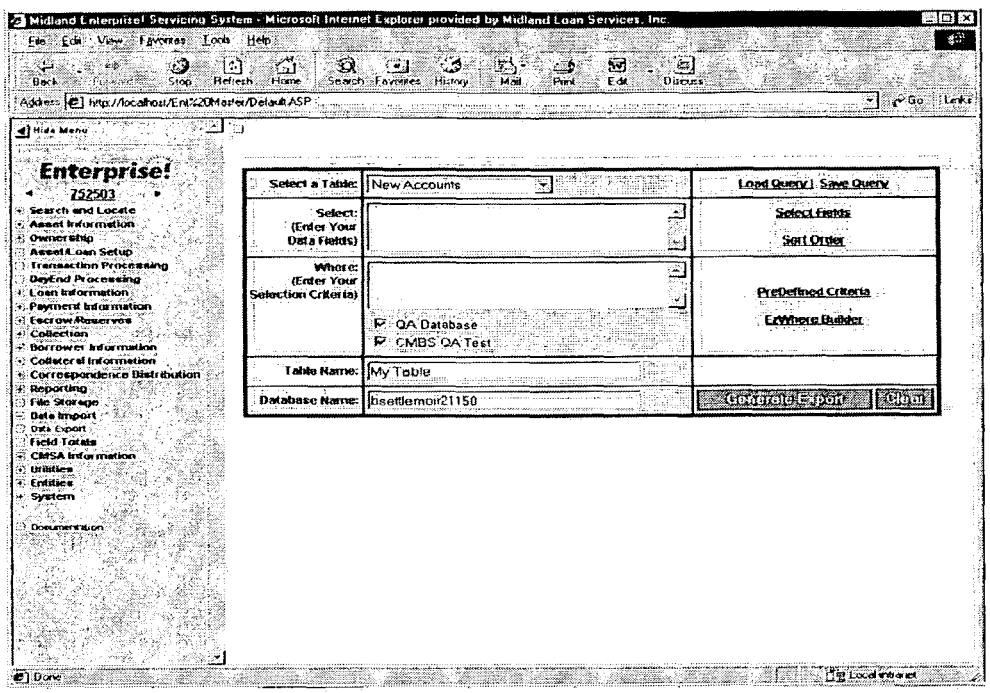
FIG. 74 is an example of a graphical user interface, provided in accordance with at least one embodiment of the present methods and systems, for exporting data from the present system.

FIG. 74 is an example of a graphical user interface, provided in accordance with at least one embodiment of the present methods and systems, for exporting data from the present system. In one embodiment of the present system, the data is exported into a database table.

Figure 75:
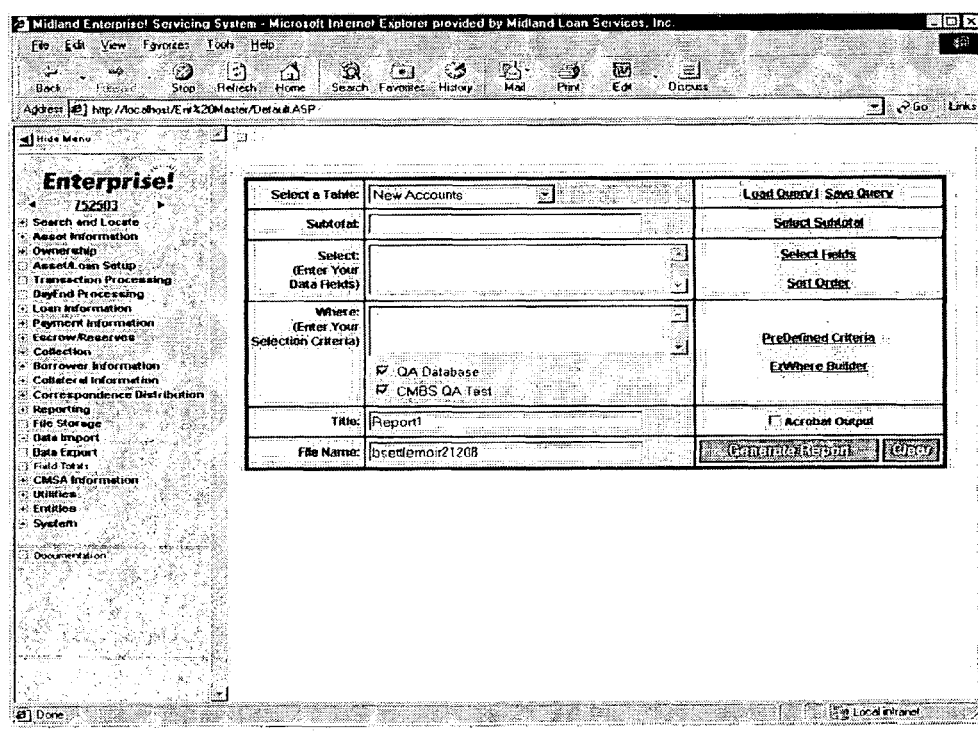
FIG. 75 is an example of a graphical user interface, provided in accordance with at least one embodiment of the present methods and systems, for providing an ad hoc system report.

FIG. 75 is an example of a graphical user interface, provided in accordance with at least one embodiment of the present methods and systems, for providing an ad hoc system report.

Figure 76:
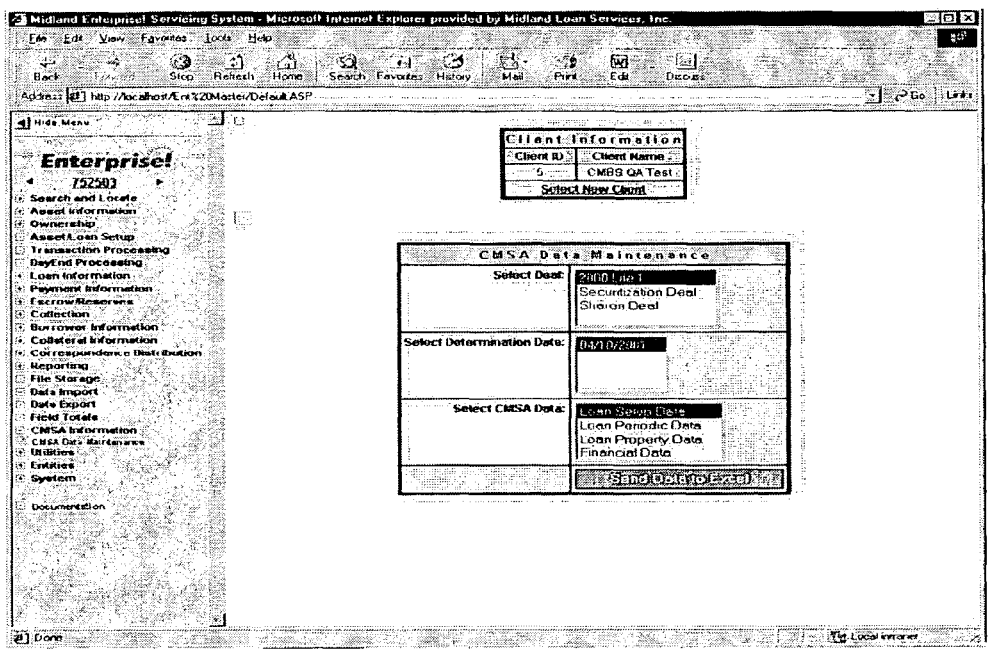
FIG. 76 is an example of a graphical user interface, provided in accordance with at least one embodiment of the present methods and systems, for generating CMSA® data.

FIG. 76 is an example of a graphical user interface, provided in accordance with at least one embodiment of the present methods and systems, for generating CMSA® data. In one embodiment of the present invention the CMSA® data is exported to an Excel® file.

Figure 77:
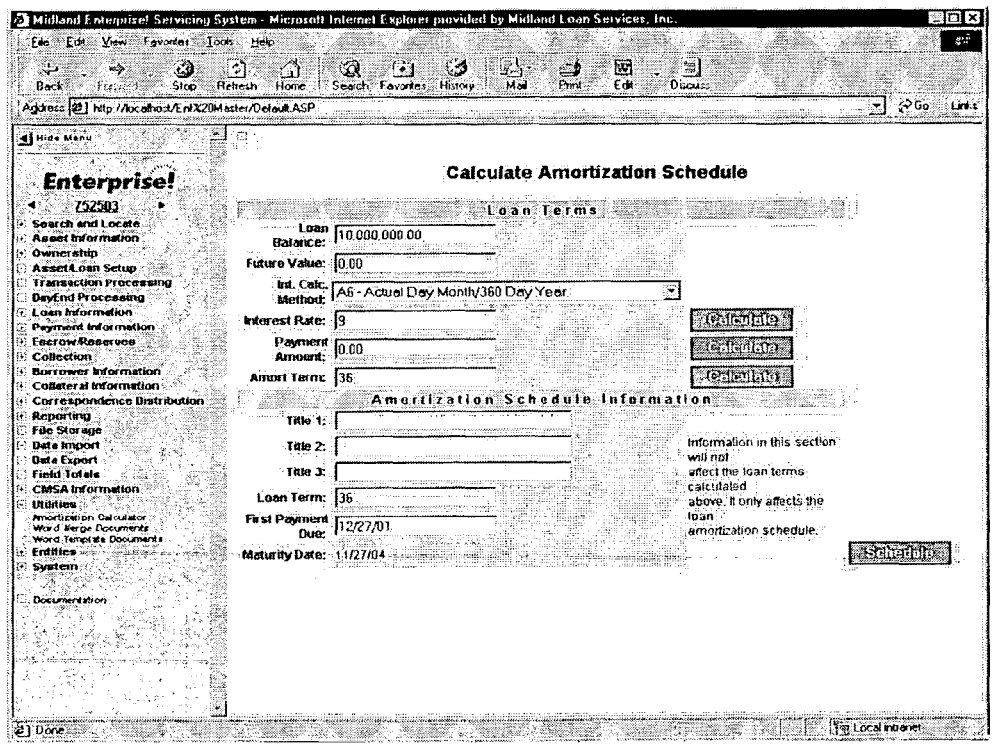
FIG. 77 is an example of a graphical user interface, provided in accordance with at least one embodiment of the present methods and systems, for calculating an amortization schedule for a specified loan.

FIG. 77 is an example of a graphical user interface, provided in accordance with at least one embodiment of the present methods and systems, for calculating an amortization schedule for a specified loan. The amortization formulae are stored, in one embodiment, in the PAAS database 16.

Figure 78:
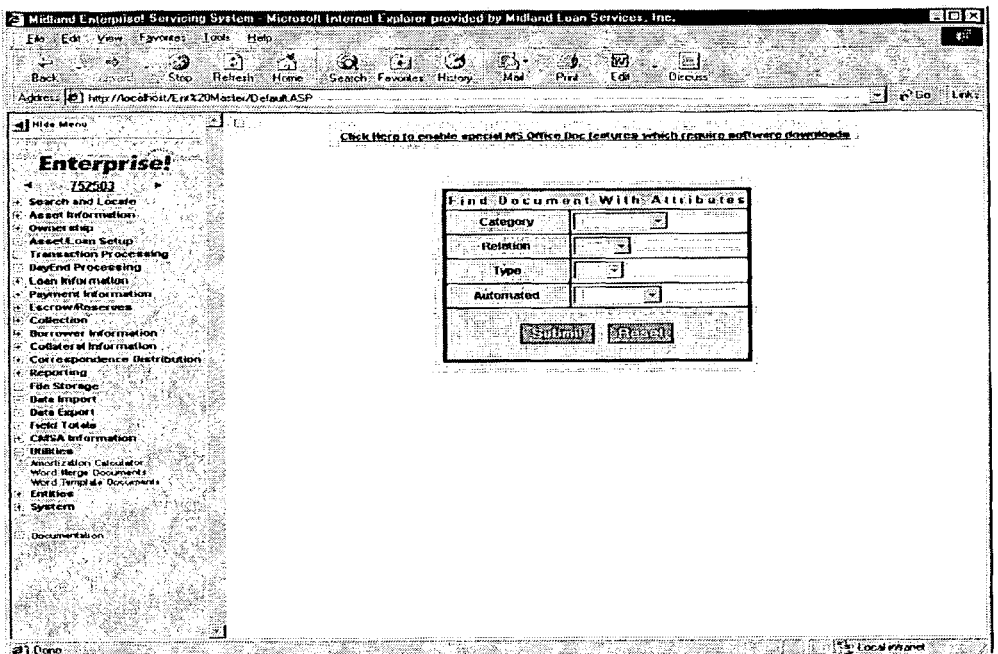
FIG. 78 is an example of a graphical user interface, provided in accordance with at least one embodiment of the present methods and systems, for retrieving a document stored in the present system with user defined attributes.

FIG. 78 is an example of a graphical user interface, provided in accordance with at least one embodiment of the present methods and systems, for retrieving a document stored in the present system with user-defined attributes.

Figure 79:
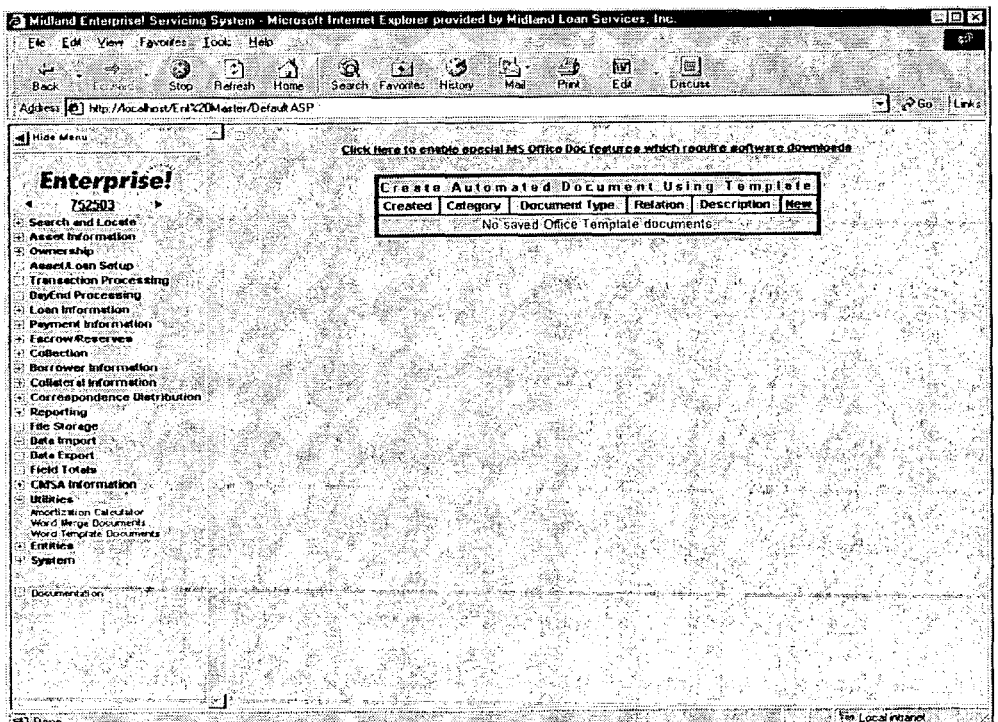
FIG. 79 is an example of a graphical user interface, provided in accordance with at least one embodiment of the present methods and systems, for creating new documents related to a particular loan.

FIG. 79 is an example of a graphical user interface, provided in accordance with at least one embodiment of the present methods and systems, for creating new documents related to a particular loan.

Figure 80:
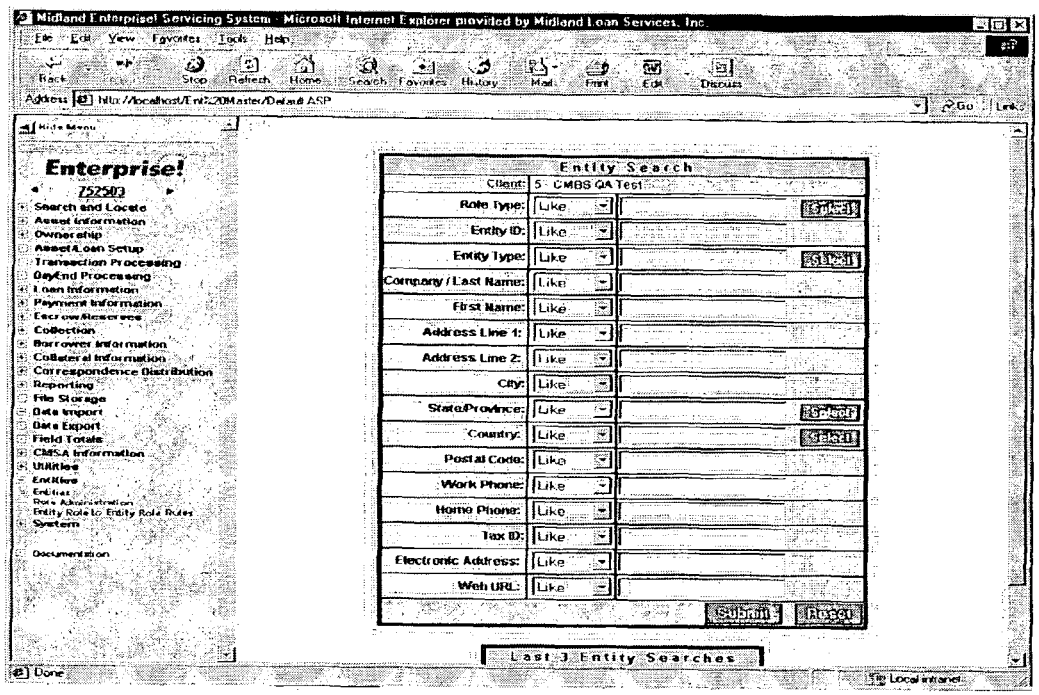
FIG. 80 is an example of a graphical user interface, provided in accordance with at least one embodiment of the present methods and systems, for searching for a particular entity conforming to user specified criteria.

FIG. 80 is an example of a graphical user interface, provided in accordance with at least one embodiment of the present methods and systems, for searching for a particular entity conforming to user specified criteria.

Figure 81:
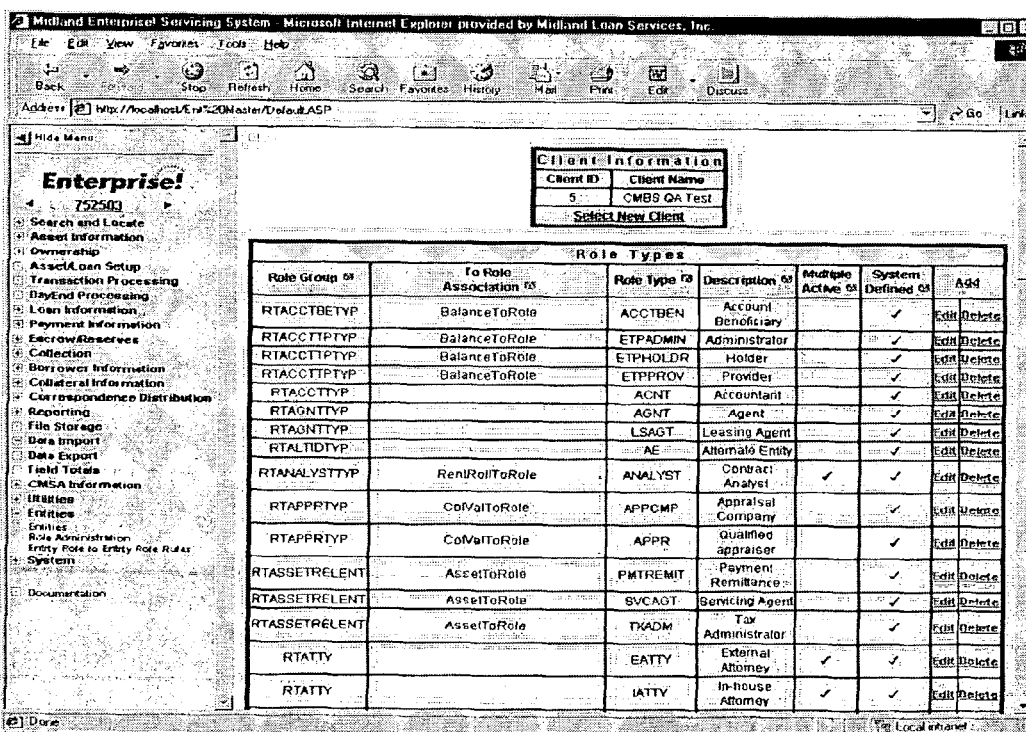
FIG. 81 is an example of a graphical user interface, provided in accordance with at least one embodiment of the present methods and systems, for entering and viewing roles associated with specified entities.

FIG. 81 is an example of a graphical user interface, provided in accordance with at least one embodiment of the present methods and systems, for entering and viewing roles associated with specified entities.

Figure 82:
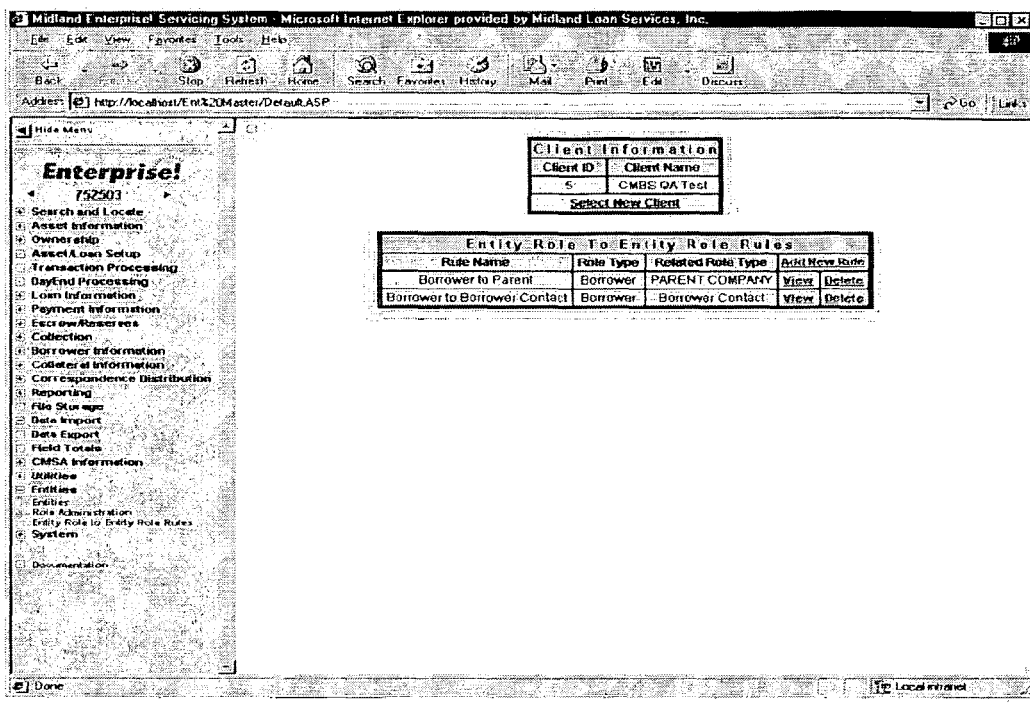
FIG. 82 is an example of a graphical user interface, provided in accordance with at least one embodiment of the present methods and systems, for entering and viewing entity and role information and the relationship between an specific entity and their role and the rules related to that role.

FIG. 82 is an example of a graphical user interface, provided in accordance with at least one embodiment of the present methods and systems, for entering and viewing entity and role information and the relationship between a specific entity and rules related to that entity.

Figure 83:
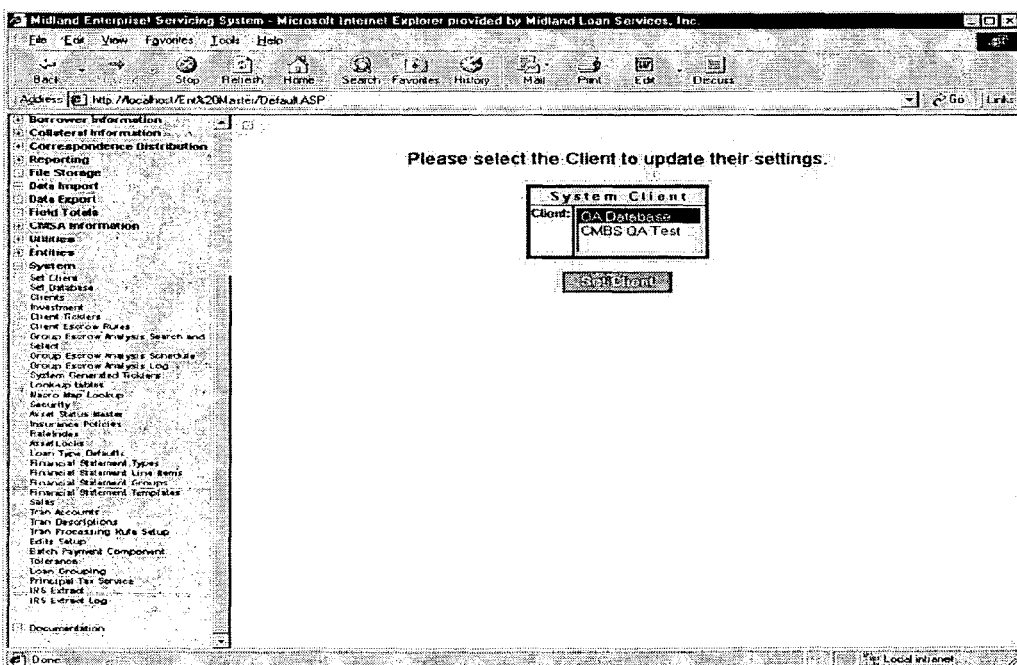
FIG. 83 is an example of a graphical user interface, provided in accordance with at least one embodiment of the present methods and systems, for selecting a system client.

FIG. 83 is an example of a graphical user interface, provided in accordance with at least one embodiment of the present methods and systems, for selecting a system client.

Figure 84:
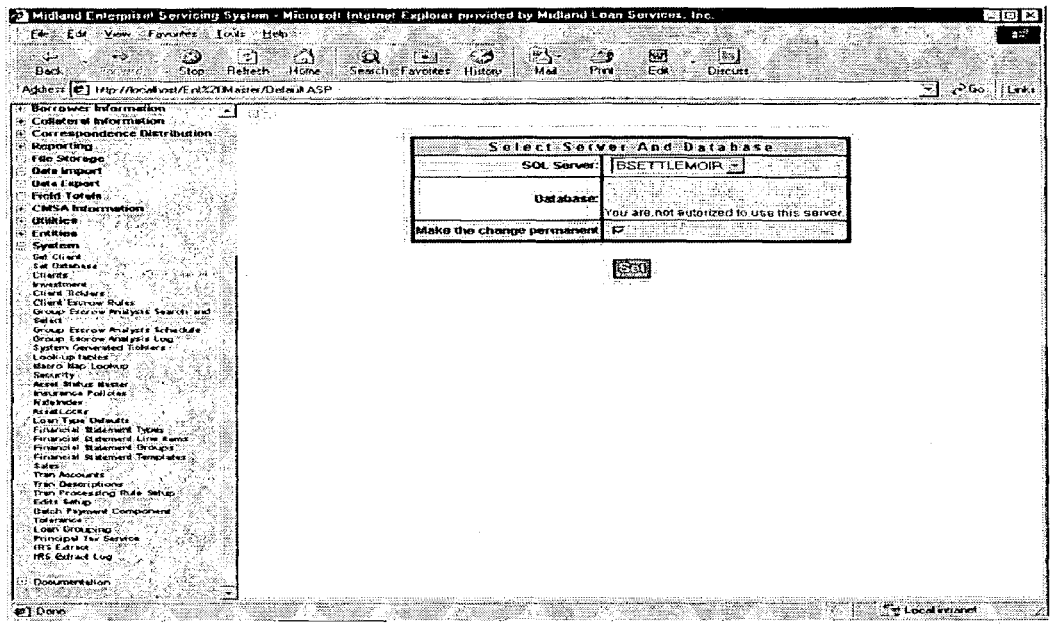
FIG. 84 is an example of a graphical user interface, provided in accordance with at least one embodiment of the present methods and systems, for selecting a server and a database to utilize.

FIG. 84 is an example of a graphical user interface, provided in accordance with at least one embodiment of the present methods and systems, for selecting a server and a database to utilize for retrieving and storing information relating to a loan or collateral property.

Figure 85:
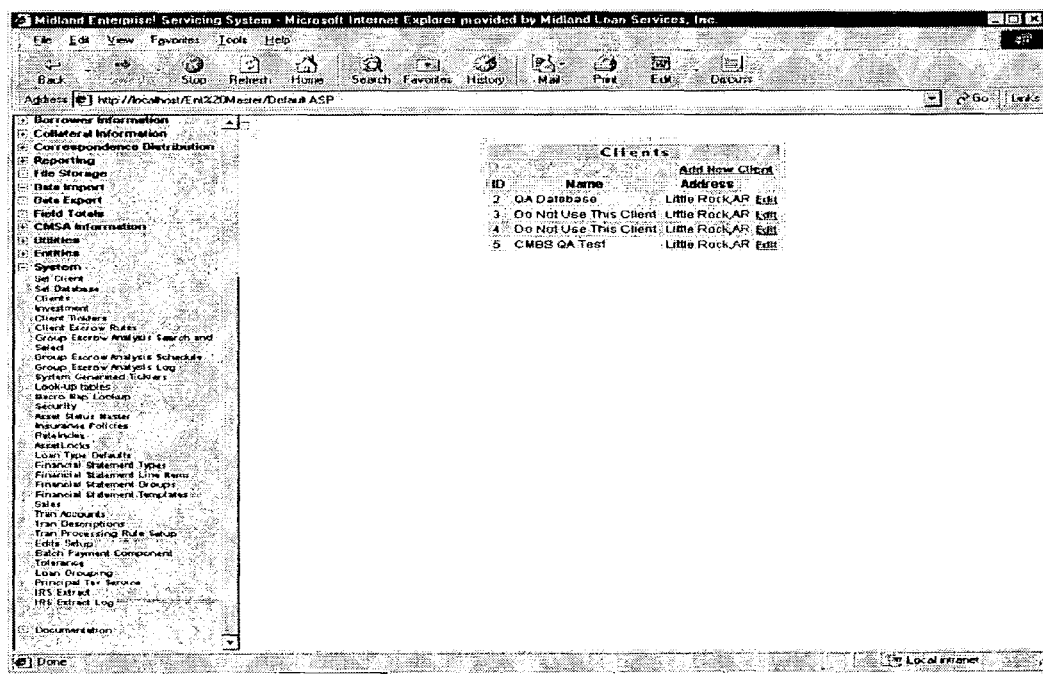
FIG. 85 is an example of a graphical user interface, provided in accordance with at least one embodiment of the present methods and systems, for selecting client specific information that resides on a particular server.

FIG. 85 is an example of a graphical user interface, provided in accordance with at least one embodiment of the present methods and systems, for selecting client specific information that resides on a particular server.

Figure 86:
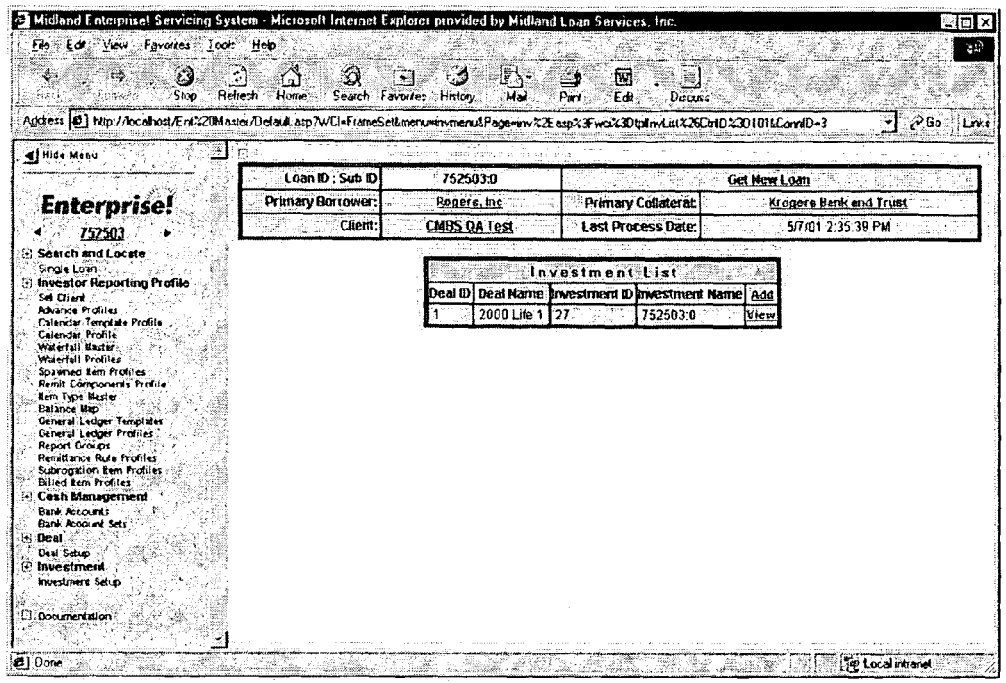
FIG. 86 is an example of a graphical user interface, provided in accordance with at least one embodiment of the present methods and systems, for viewing investment list information.

FIG. 86 is an example of a graphical user interface, provided in accordance with at least one embodiment of the present methods and systems, for viewing investment list information.

Figure 87:
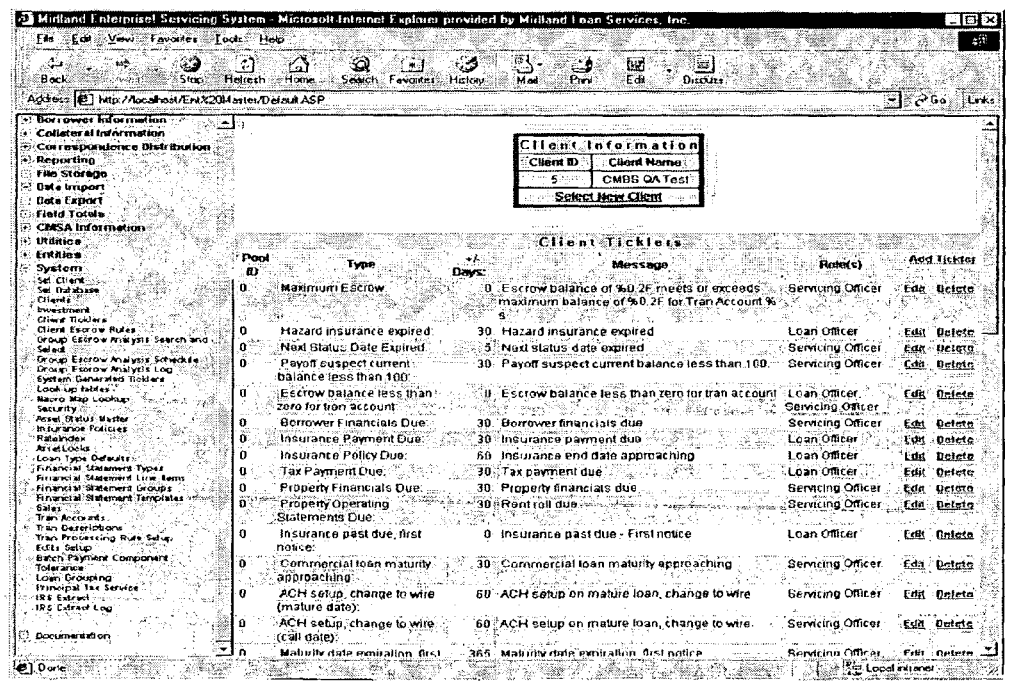
FIG. 87 is an example of a graphical user interface, provided in accordance with at least one embodiment of the present methods and systems, for editing and viewing client ticklers.

FIG. 87 is an example of a graphical user interface, provided in accordance with at least one embodiment of the present methods and systems, for editing and viewing client ticklers or reminders.

Figure 88:
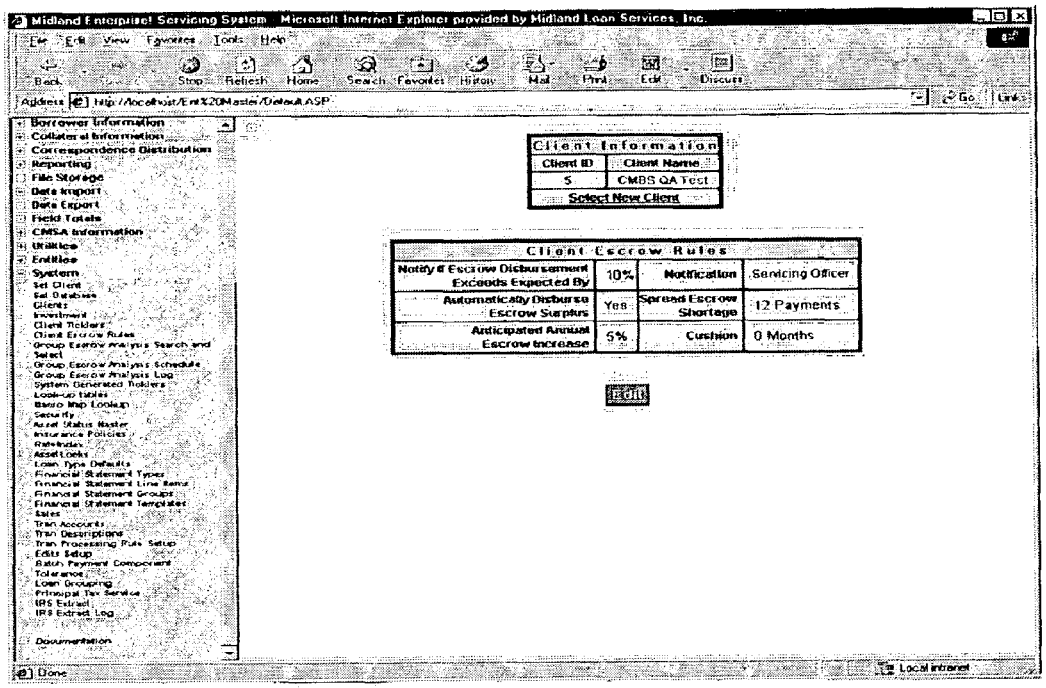
FIG. 88 is an example of a graphical user interface, provided in accordance with at least one embodiment of the present methods and systems, for editing and viewing client escrow rules.

FIG. 88 is an example of a graphical user interface, provided in accordance with at least one embodiment of the present methods and systems, for editing and viewing client escrow rules.

Figure 89:
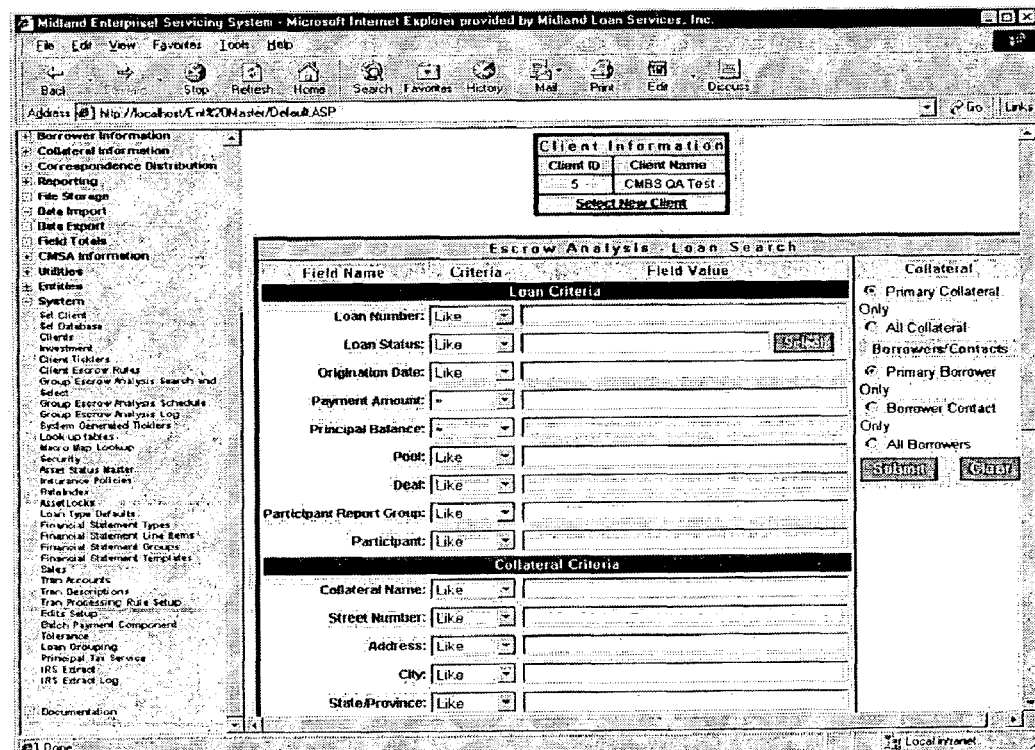
FIG. 89 is an example of a graphical user interface, provided in accordance with at least one embodiment of the present methods and systems, for searching and viewing escrow analysis information related to a particular loan.

FIG. 89 is an example of a graphical user interface, provided in accordance with at least one embodiment of the present methods and systems, for searching and viewing escrow analysis information related to a particular loan.

Figure 90:
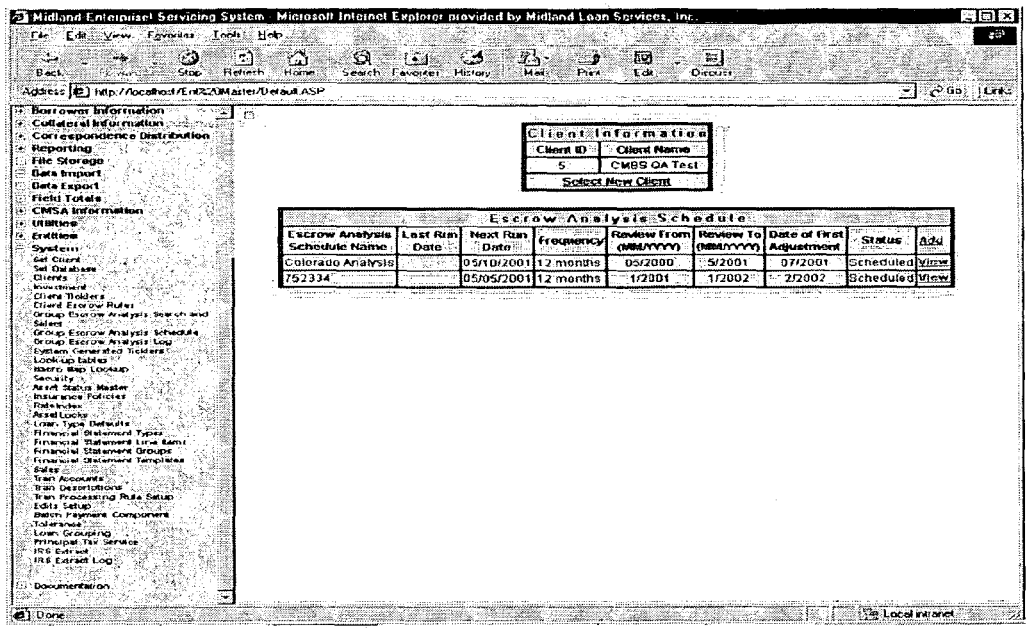
FIG. 90 is an example of a graphical user interface, provided in accordance with at least one embodiment of the present methods and systems, for entering and viewing an escrow analysis schedule.

FIG. 90 is an example of a graphical user interface, provided in accordance with at least one embodiment of the present methods and systems, for entering and viewing an escrow analysis schedule.

Figure 91:
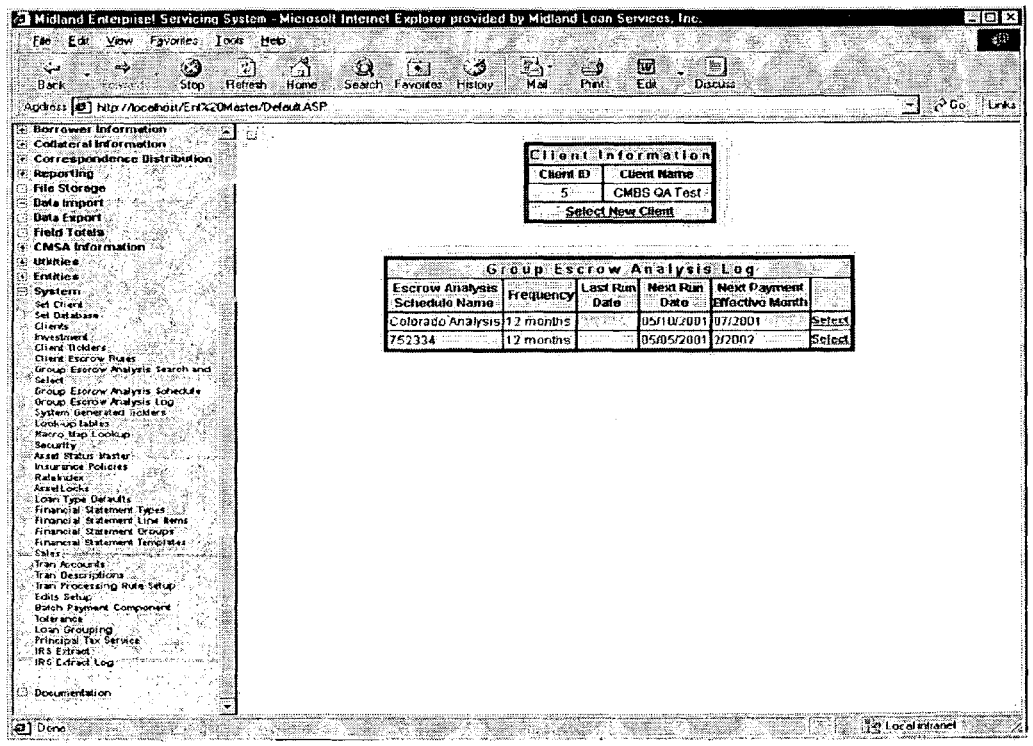
FIG. 91 is an example of a graphical user interface, provided in accordance with at least one embodiment of the present methods and systems, for viewing a group escrow analysis log.

FIG. 91 is an example of a graphical user interface, provided in accordance with at least one embodiment of the present methods and systems, for viewing a group escrow analysis log.

Figure 92:
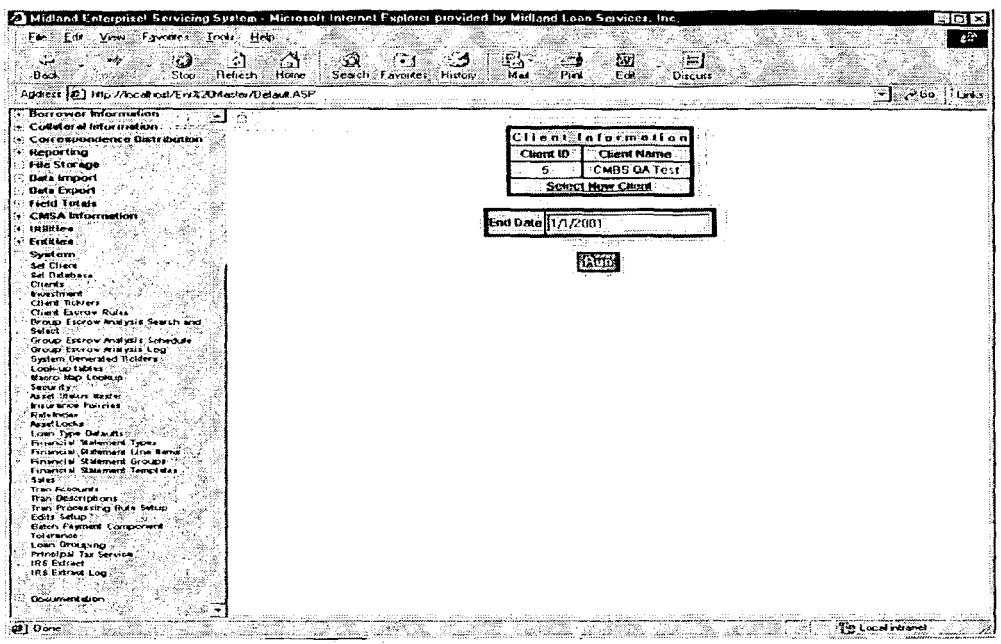
FIG. 92 is an example of a graphical user interface, provided in accordance with at least one embodiment of the present methods and systems, for running system generated ticklers.

FIG. 92 is an example of a graphical user interface, provided in accordance with at least one embodiment of the present methods and systems, for running system generated ticklers.

Figure 93:
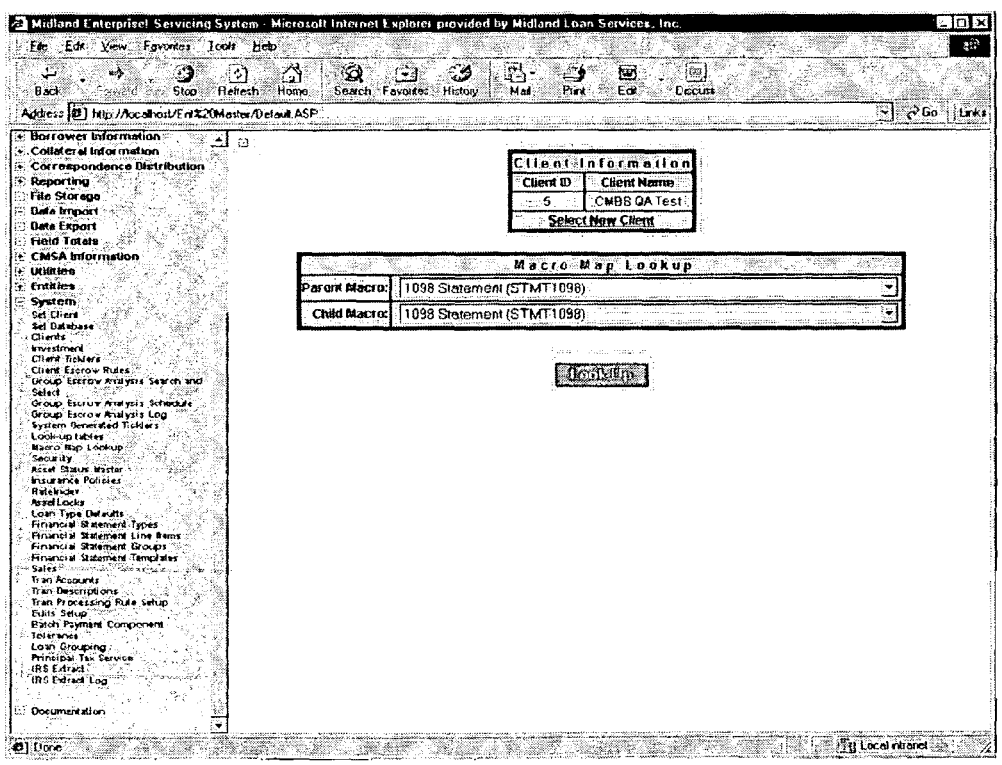
FIG. 93 is an example of a graphical user interface, provided in accordance with at least one embodiment of the present methods and systems, for viewing and editing rules for user drop down values.

FIG. 93 is an example of a graphical user interface, provided in accordance with at least one embodiment of the present methods and systems, for viewing and editing rules for user drop down values. In one embodiment of the present methods and systems, a user defines certain values that are associated with stored values. For example, a user may define a particular collateral type and the present methods and systems in turn associate the user defined collateral type with a general collateral type.

Figure 94:
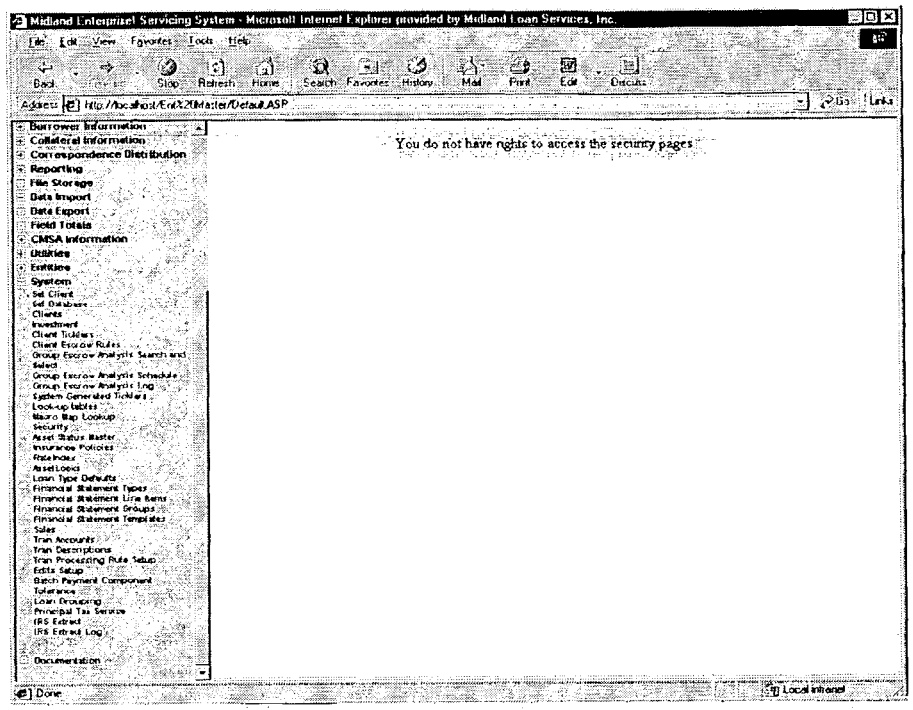
FIG. 94 is an example of a graphical user interface, provided in accordance with at least one embodiment of the present methods and systems, for entering and viewing information relating to security levels for a particular user and user group.

FIG. 94 is an example of a graphical user interface, provided in accordance with at least one embodiment of the present methods and systems, for entering and viewing information relating to security levels for a particular user and user group.

Figure 95:
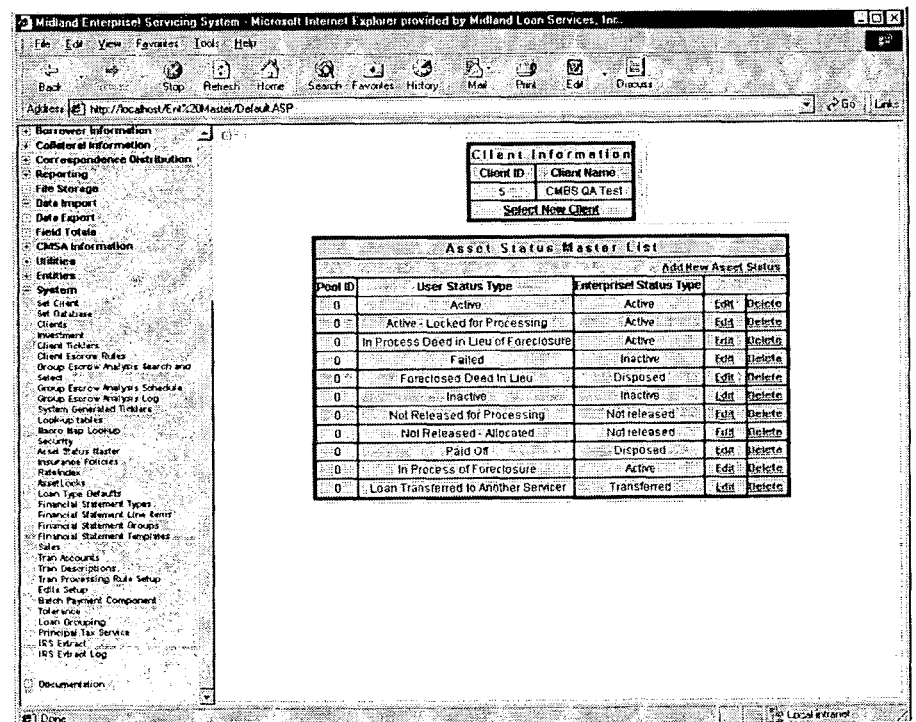
FIG. 95 is an example of a graphical user interface, provided in accordance with at least one embodiment of the present methods and systems, for entering and viewing asset status related to a particular pool of loans.

FIG. 95 is an example of a graphical user interface, provided in accordance with at least one embodiment of the present methods and systems, for entering and viewing asset status related to a particular pool of loans.

Figure 96:
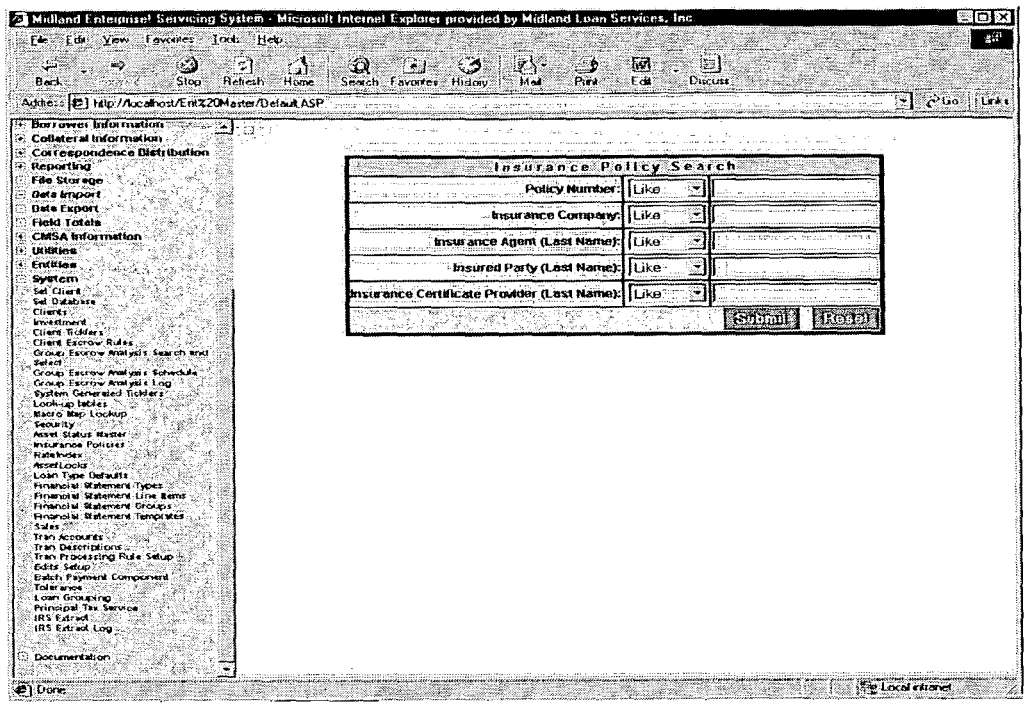
FIG. 96 is an example of a graphical user interface, provided in accordance with at least one embodiment of the present methods and systems, for searching for insurance policies related to collateral.

FIG. 96 is an example of a graphical user interface, provided in accordance with at least one embodiment of the present methods and systems, for searching for insurance policies related to collateral.

Figure 97:
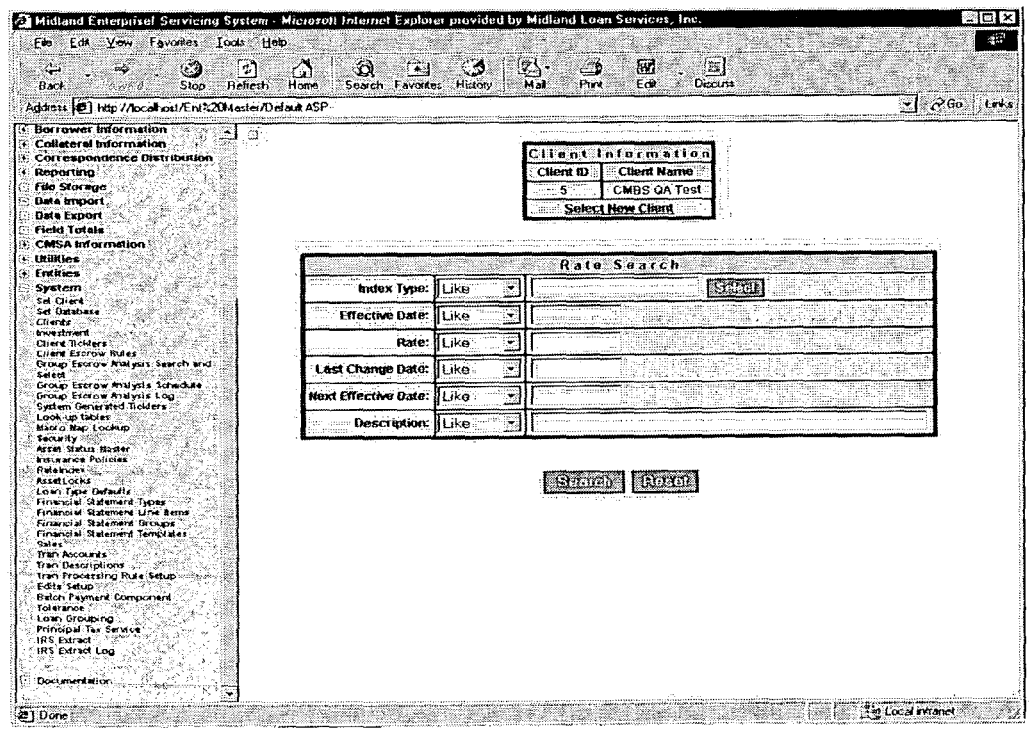
FIG. 97 is an example of a graphical user interface, provided in accordance with at least one embodiment of the present methods and systems, for searching for particular loan interest rate indices.

FIG. 97 is an example of a graphical user interface, provided in accordance with at least one embodiment of the present methods and systems, for searching for particular loan interest rate indices.

Figure 98:
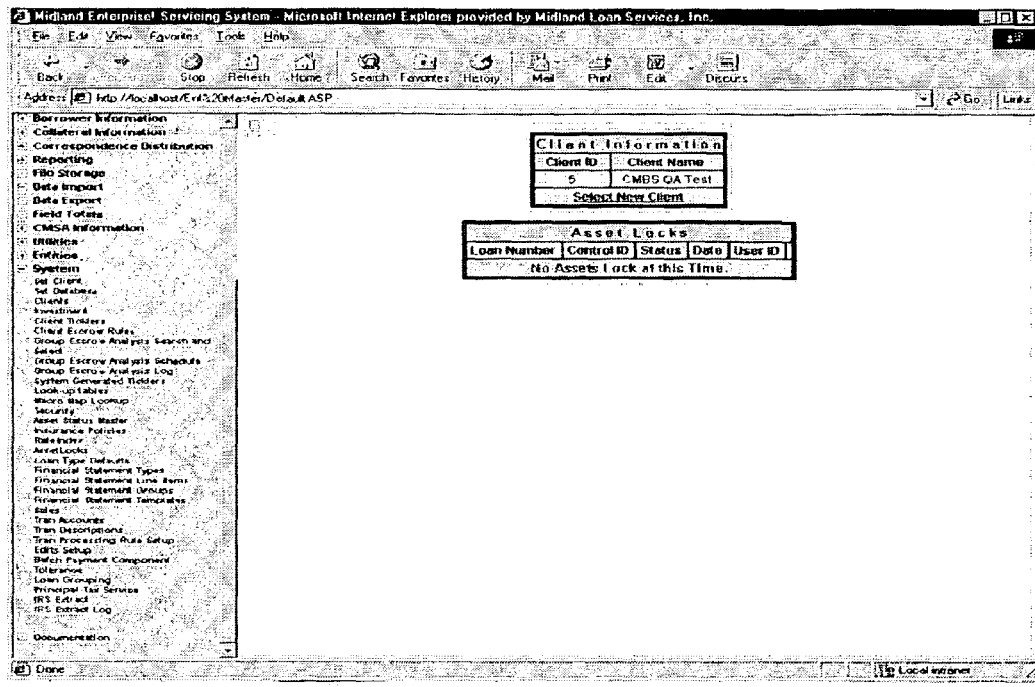
FIG. 98 is an example of a graphical user interface, provided in accordance with at least one embodiment of the present methods and systems, for locking records at the asset level.

FIG. 98 is an example of a graphical user interface, provided in accordance with at least one embodiment of the present methods and systems, for locking records at the asset level. In a shared servicing environment, this functionality prohibits two users from simultaneously writing information to the asset at the same time.

Figure 99:
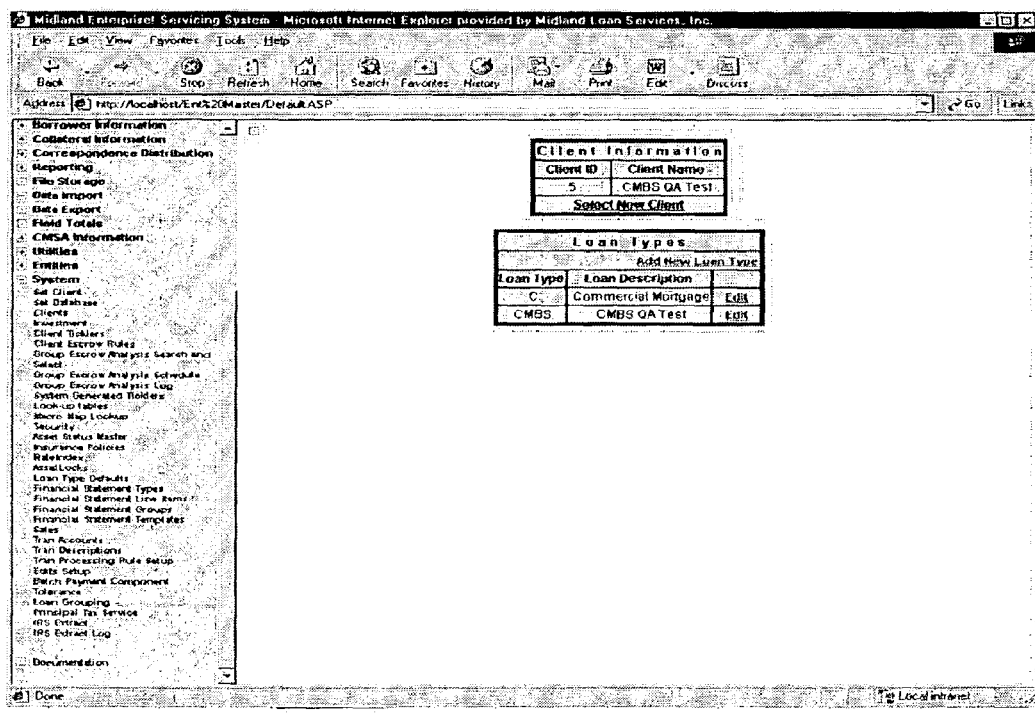
FIG. 99 is an example of a graphical user interface, provided in accordance with at least one embodiment of the present methods and systems, for entering and viewing loan type defaults.

FIG. 99 is an example of a graphical user interface, provided in accordance with at least one embodiment of the present methods and systems, for entering and viewing loan type defaults.

Figure 100:
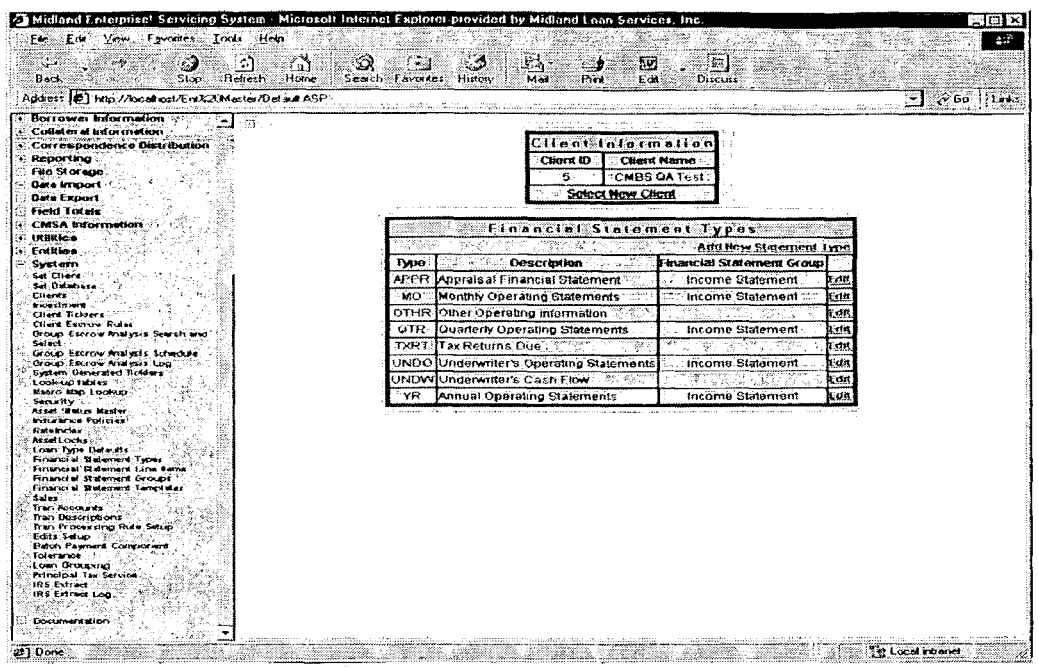
FIG. 100 is an example of a graphical user interface, provided in accordance with at least one embodiment of the present methods and systems, for entering and viewing various types of financial statements.

FIG. 100 is an example of a graphical user interface, provided in accordance with at least one embodiment of the present methods and systems, for entering and viewing various types of financial statements.

Figure 101:
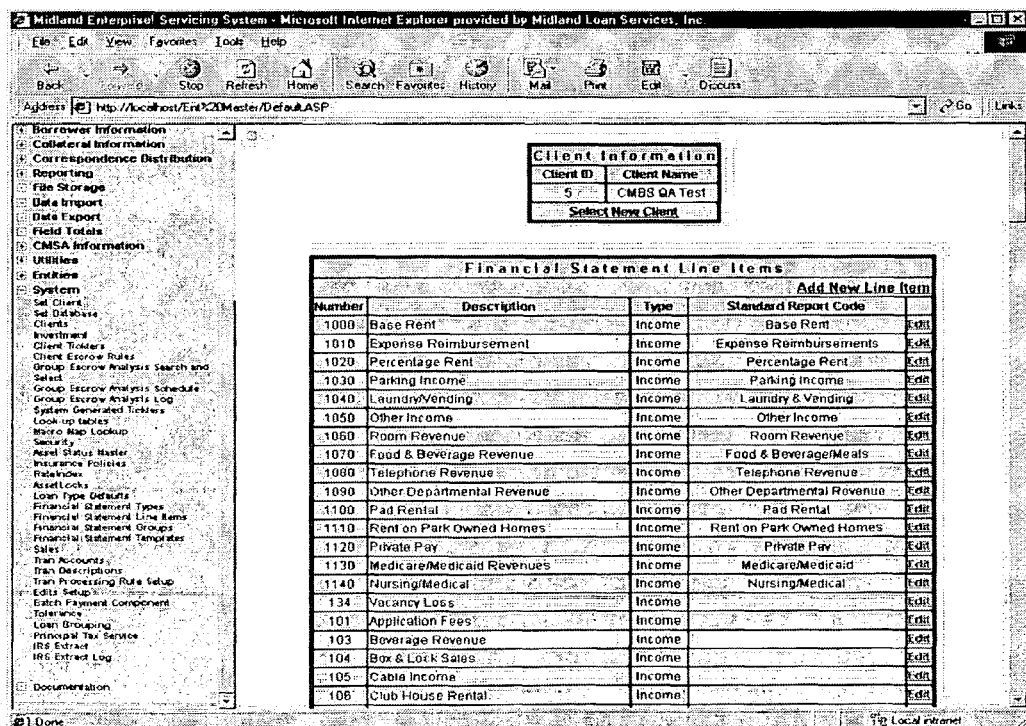
FIG. 101 is an example of a graphical user interface, provided in accordance with at least one embodiment of the present methods and systems, for adding, editing and viewing line items in a financial statement.

FIG. 101 is an example of a graphical user interface, provided in accordance with at least one embodiment of the present methods and systems, for adding, editing and viewing line items in a financial statement.

Figure 102:
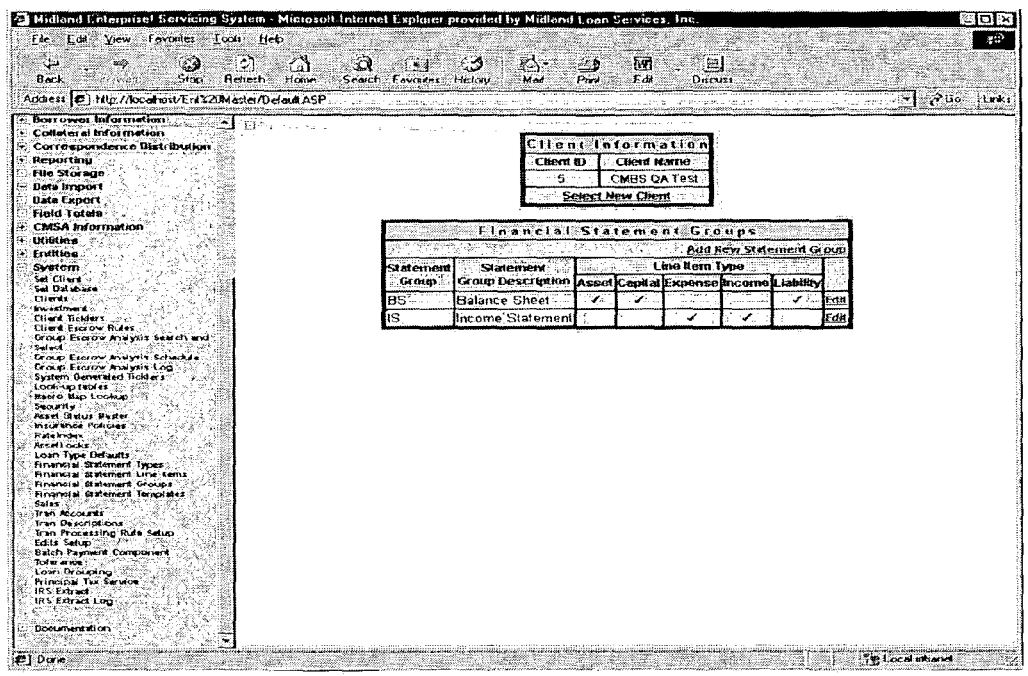

FIG. 102 is an example of a graphical user interface, provided in accordance with at least one embodiment of the present methods and systems, for adding, editing and viewing the association of a group with a particular financial statement.

Figure 103:
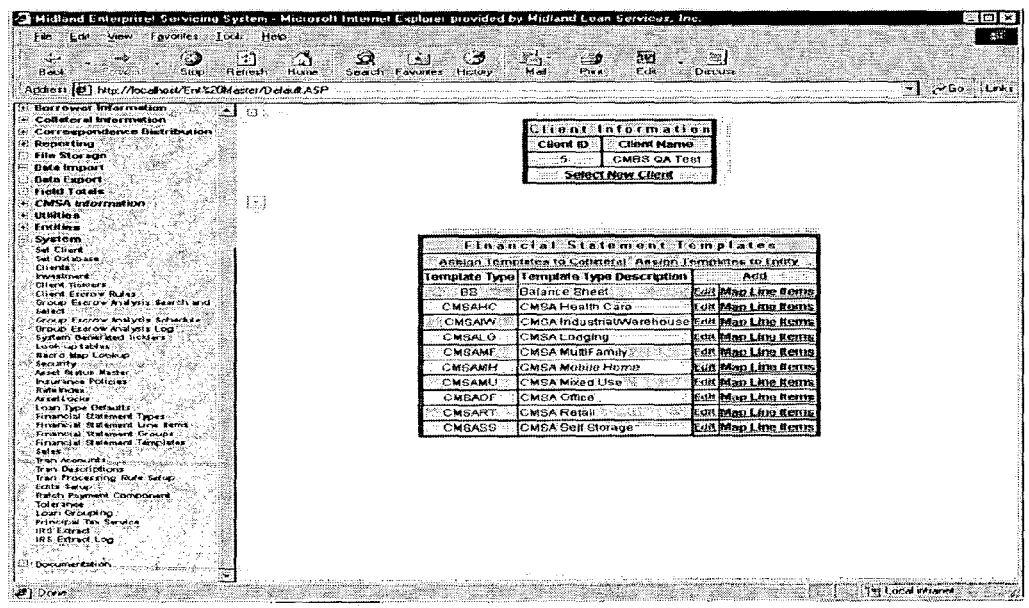
FIG. 103 is an example of a graphical user interface, provided in accordance with at least one embodiment of the present methods and systems, for entering and viewing financial statement templates.

FIG. 103 is an example of a graphical user interface, provided in accordance with at least one embodiment of the present methods and systems, for entering and viewing financial statement templates. The templates may be assigned to particular collateral types or to specific entities where the template type is defined by CMSA®.

Figure 104:
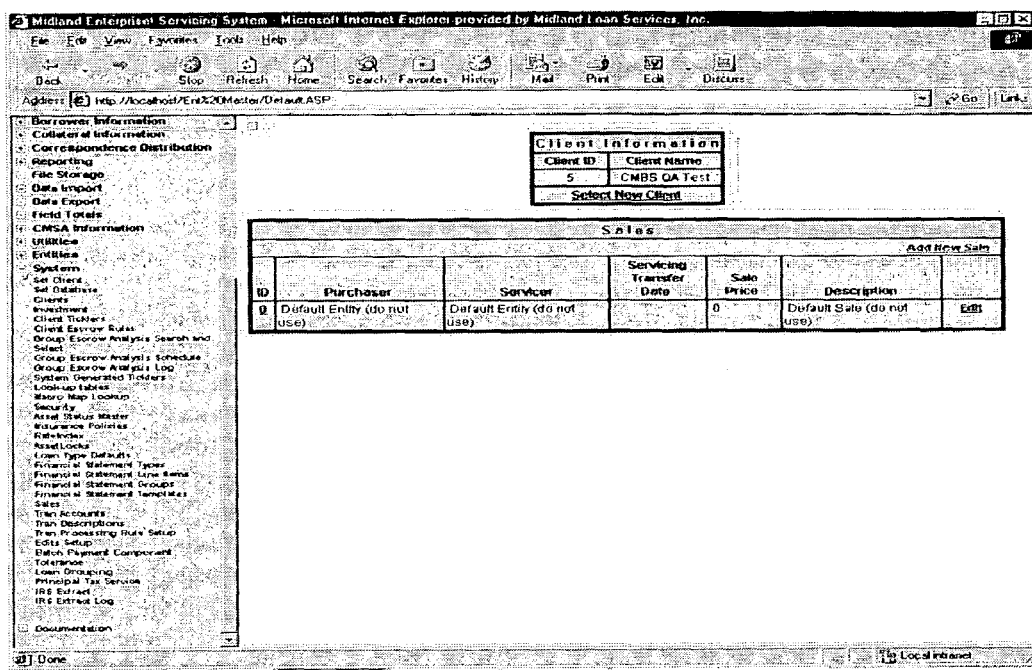
FIG. 104 is an example of a graphical user interface, provided in accordance with at least one embodiment of the present methods and systems, for adding, editing and viewing mortgage loan sales information.

FIG. 104 is an example of a graphical user interface, provided in accordance with at least one embodiment of the present methods and systems, for adding, editing and viewing mortgage loan sales information.

Figure 105:
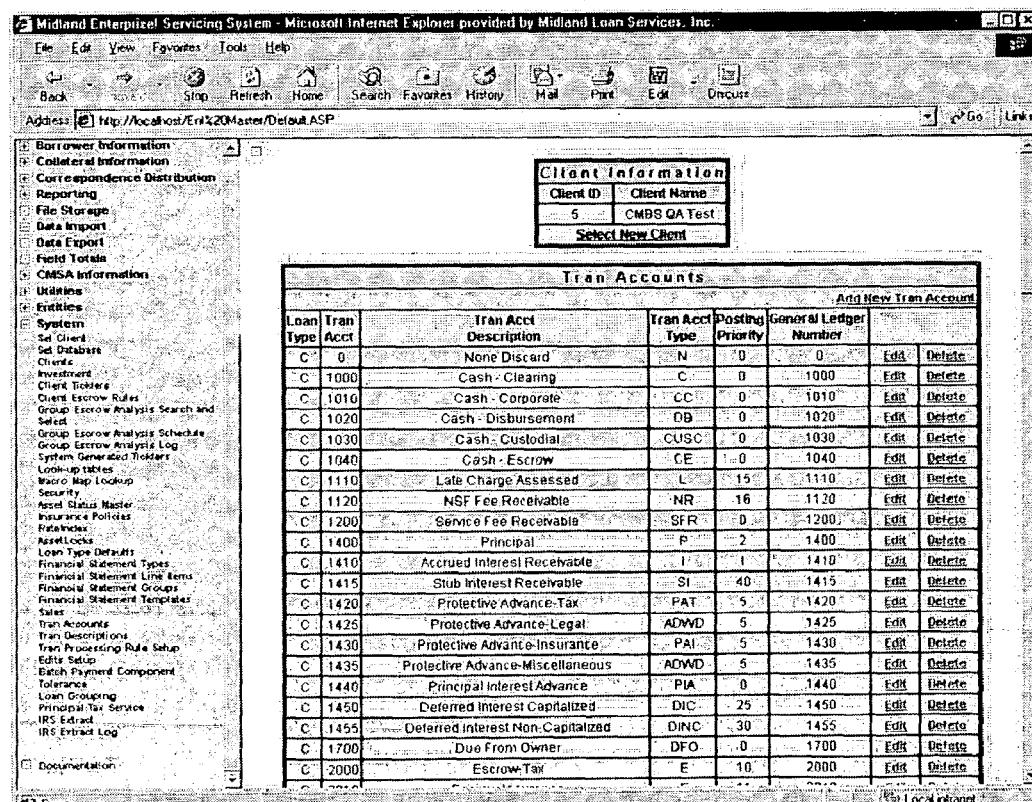
FIG. 105 is an example of a graphical user interface, provided in accordance with at least one embodiment of the present methods and systems, for entering and viewing rules associated with asset balances permitted for a particular asset type or category.

FIG. 105 is an example of a graphical user interface, provided in accordance with at least one embodiment of the present methods and systems, for entering and viewing rules associated with asset balances permitted for a particular asset type or category.

Figure 106:
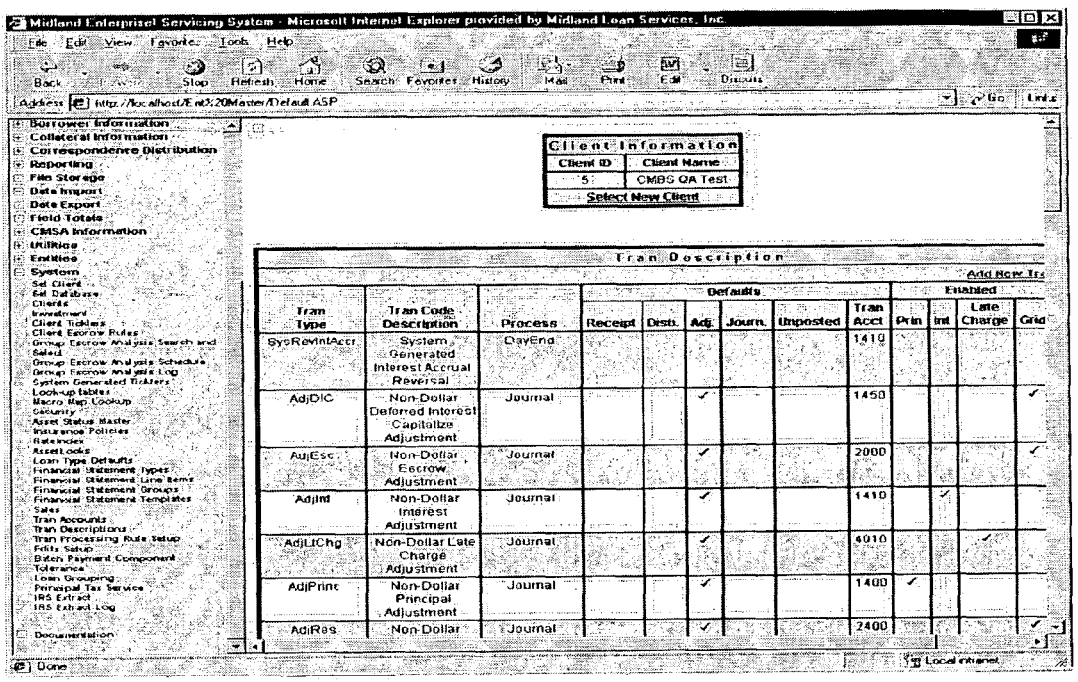
FIG. 106 is an example of a graphical user interface, provided in accordance with at least one embodiment of the present methods and systems, for editing and viewing rules that drive which monetary transaction types that are permitted for this client.

FIG. 106 is an example of a graphical user interface, provided in accordance with at least one embodiment of the present methods and systems, for editing and viewing rules that drive which monetary transaction types that are permitted for this client. In one example of the present methods and systems, a loan may be foreclosed. In the foreclosure it may be necessary to track legal fees associated with the foreclosure in addition to standard legal expenses associated with the particular loan. This functionality allows a user to define and edit, without necessitating complex coding, a business rule to accumulate legal fees that are recoverable from a borrower in the event of a foreclosure.

Figure 107:
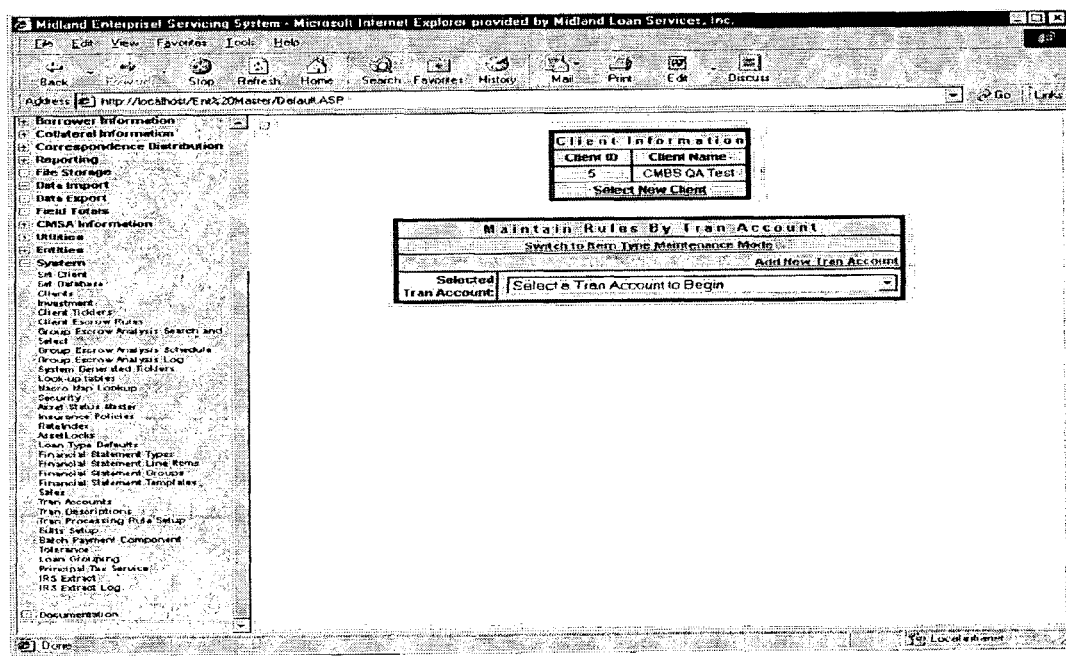
FIG. 107 is an example of a graphical user interface, provided in accordance with at least one embodiment of the present methods and systems, for entering and viewing rules for short transaction ("tran") accounts.

FIG. 107 is an example of a graphical user interface, provided in accordance with at least one embodiment of the present methods and systems, for entering and viewing rules for tran accounts. These accounts, in one embodiment, are added by a user on an as-needed basis. In one embodiment, the tran accounts form a bridge between transaction types (e.g. regular payment, new loan advance) and item types (e.g. scheduled principal collected, scheduled interest collected).

Figure 108:
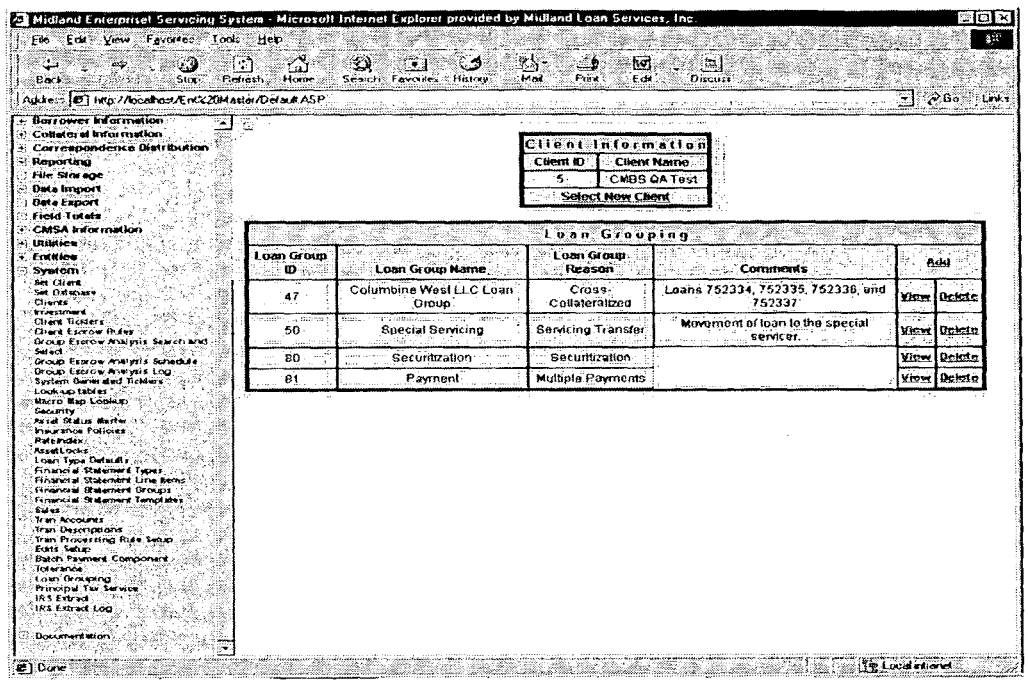
FIG. 108 is an example of a graphical user interface, provided in accordance with at least one embodiment of the present methods and systems, for adding, editing and viewing loan grouping information.

FIG. 108 is an example of a graphical user interface, provided in accordance with at least one embodiment of the present methods and systems, for adding, editing and viewing loan grouping information.

Figure 109:
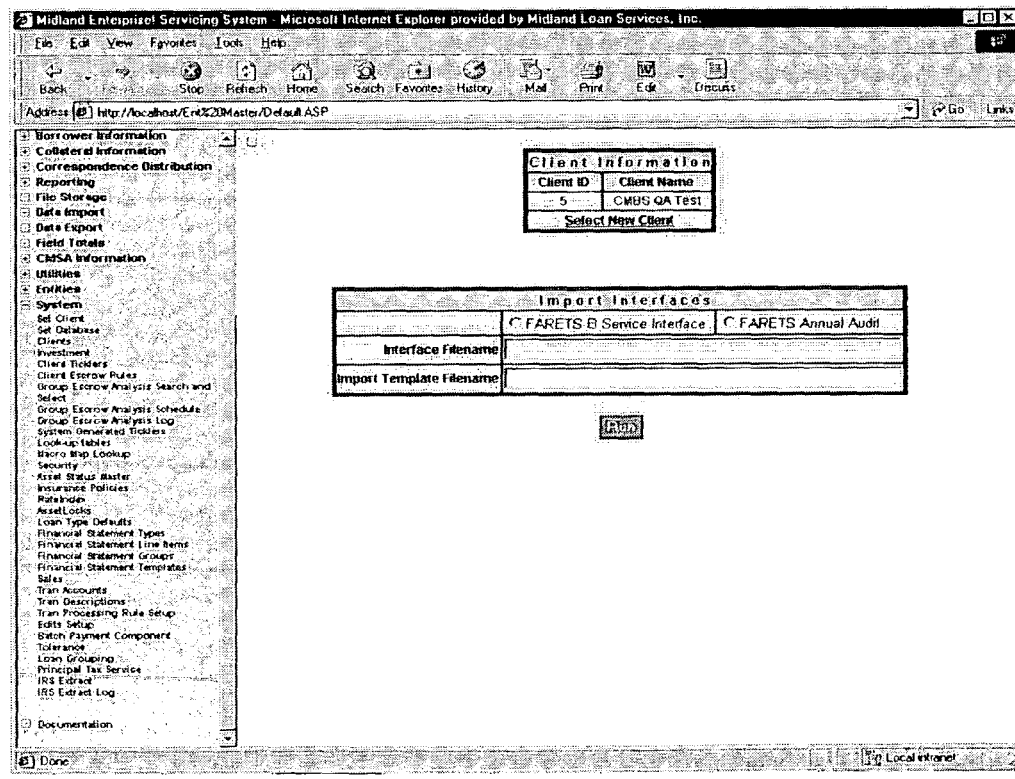
FIG. 109 is an example of a graphical user interface, provided in accordance with at least one embodiment of the present methods and systems, for running import interfaces.

FIG. 109 is an example of a graphical user interface, provided in accordance with at least one embodiment of the present methods and systems, for running import interfaces. This interface, in one embodiment, imports First American Real Estate Tax Service (FARETS) information. In another embodiment, this interface imports information from a third-party vendor.

Figure 110:
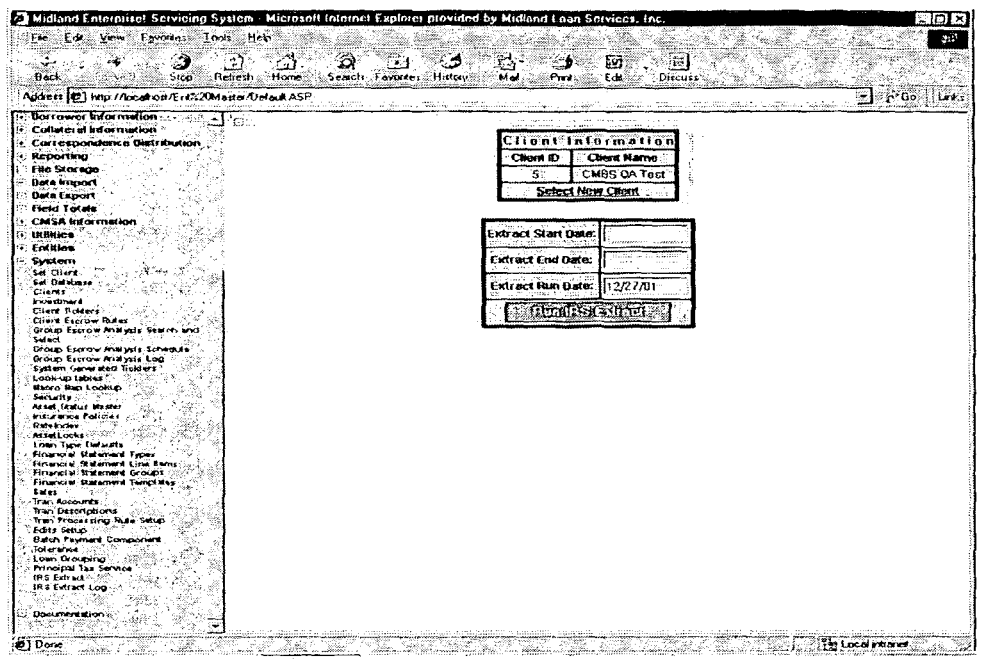
FIG. 110 is an example of a graphical user interface, provided in accordance with at least one embodiment of the present methods and systems, for extracting information necessary for IRS reporting.

FIG. 110 is an example of a graphical user interface, provided in accordance with at least one embodiment of the present methods and systems, for extracting information necessary for IRS reporting.

Figure 111:
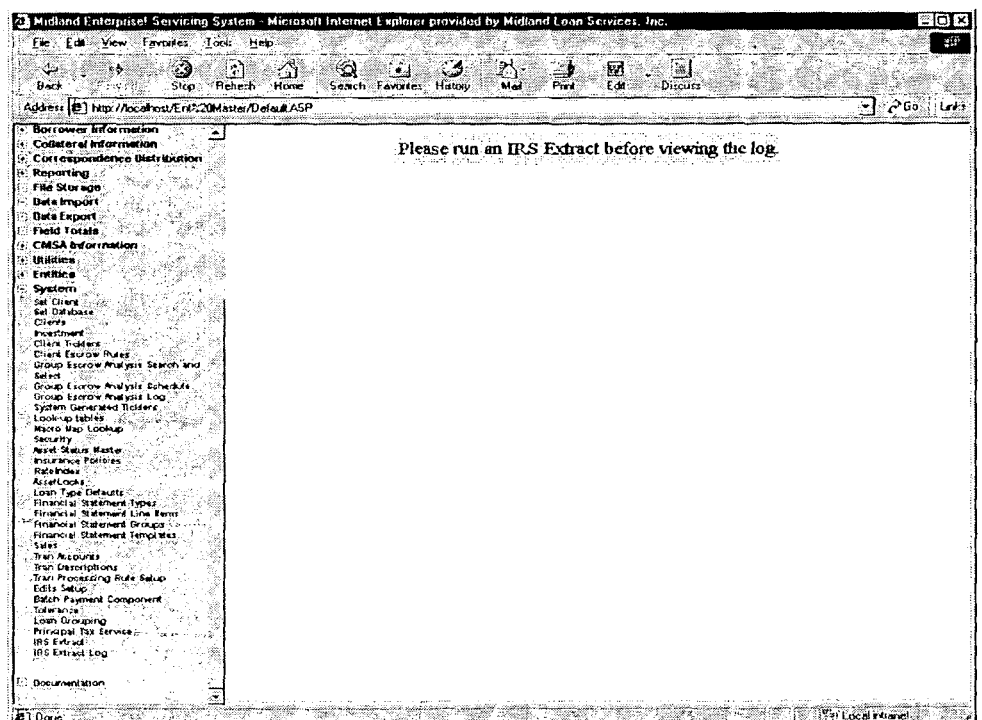
FIG. 111 is an example of a graphical user interface, provided in accordance with at least one embodiment of the present methods and systems, for viewing information extracted for IRS reporting.

FIG. 111 is an example of a graphical user interface, provided in accordance with at least one embodiment of the present methods and systems, for viewing information extracted for IRS reporting.

Figure 112:
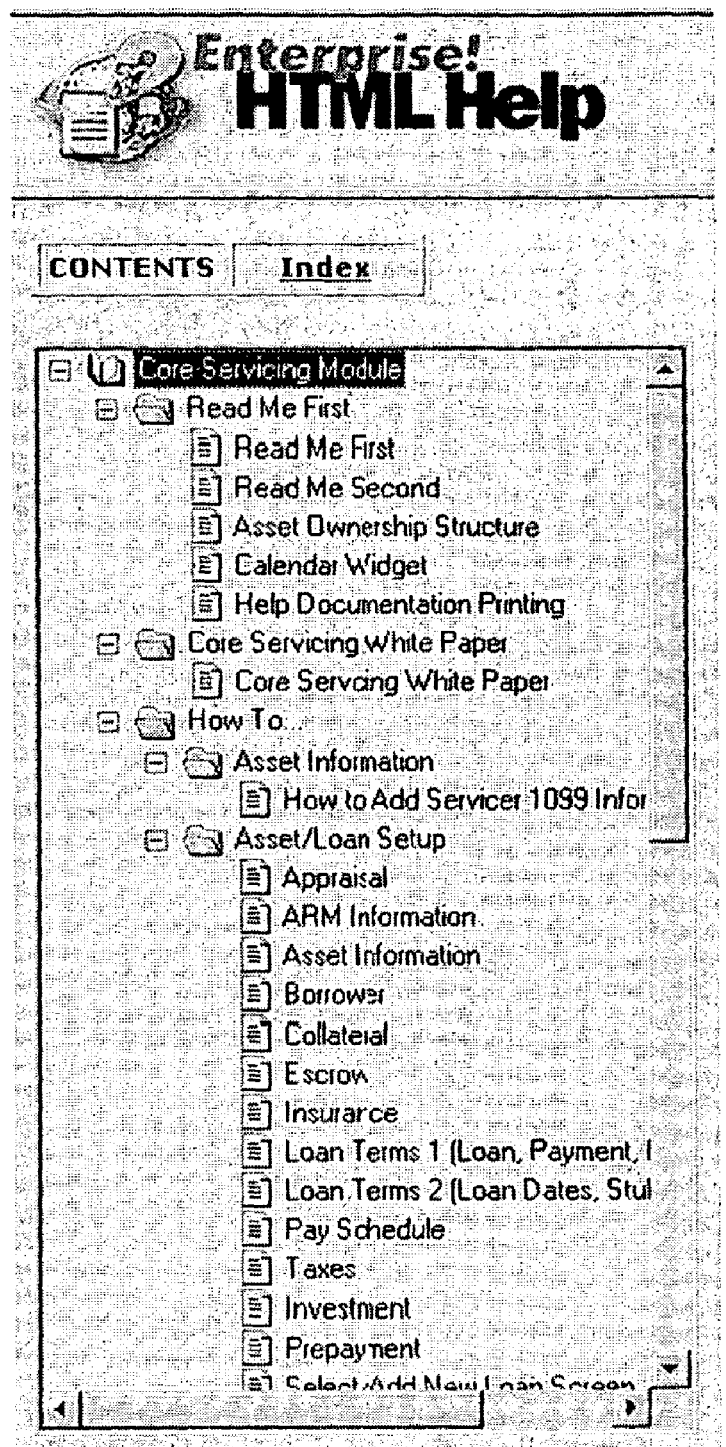
FIG. 112 is an example of a graphical user interface, provided in accordance with at least one embodiment of the present methods and systems, for selecting and viewing help information related to the present system.

FIG. 112 is an example of a graphical user interface, provided in accordance with at least one embodiment of the present methods and systems, for selecting and viewing help information related to the present system.

FIG. 113 is an example of a graphical user interface, provided in accordance with at least one embodiment of the present methods and systems, for viewing snapshot information related to a particular loan including an image of the collateral securing the loan, borrower information, loan information, and loan documents.

Figure 114:
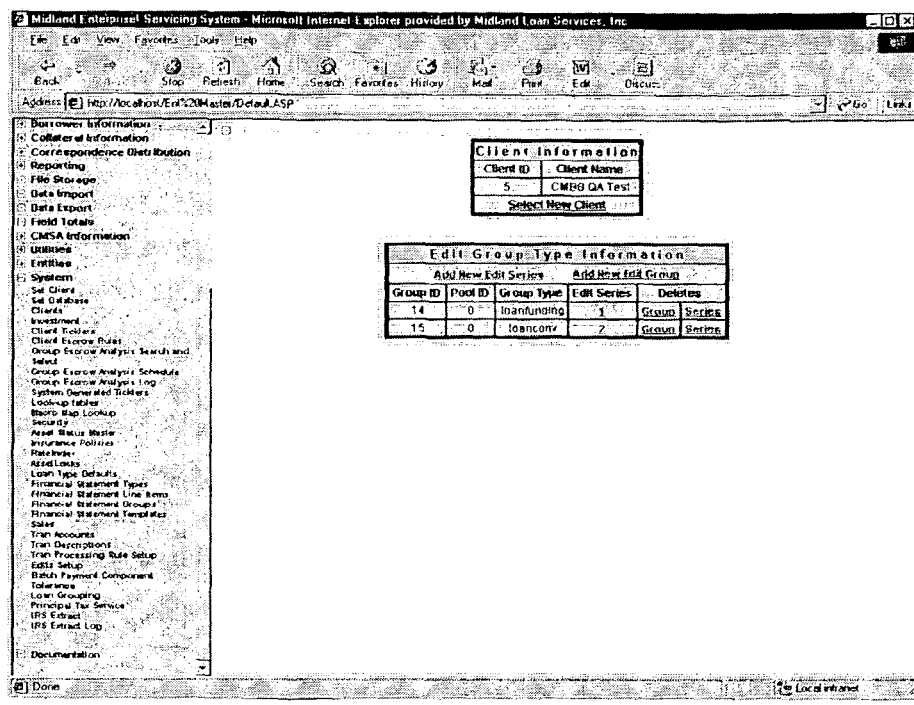
FIG. 114 is an example of a graphical user interface, provided in accordance with at least one embodiment of the present methods and systems, for adding and editing group type information.
Figure 115:
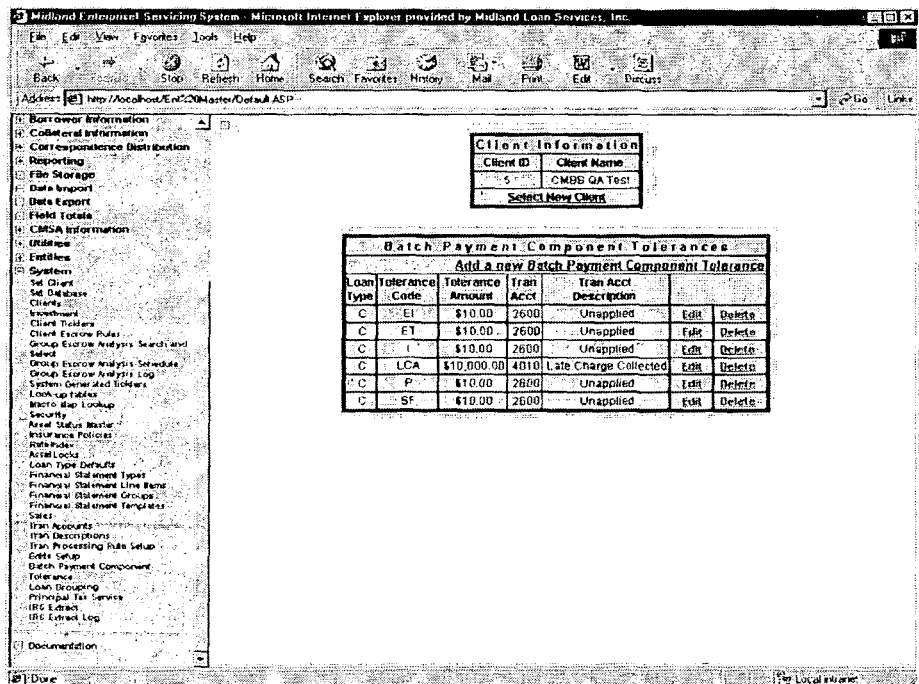
FIG. 115 is an example of a graphical user interface, provided in accordance with at least one embodiment of the present methods and systems, for adding and editing batch payment component tolerances.

FIG. 114 is an example of a graphical user interface, provided in accordance with at least one embodiment of the present methods and systems, for adding and editing group type information; and FIG. 115 is an example of a graphical user interface, provided in accordance with at least one embodiment of the present methods and systems, for adding and editing batch payment component tolerances.

The term "computer-readable medium" is defined herein as understood by those skilled in the art. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention.

What is claimed is:

1. In a servicing entity, a computer-assisted method for managing commercial mortgages, said method comprising:

storing information associated with a plurality of mortgages in a data model in an electronic data storage medium;

allowing a plurality of participants to electronically access said mortgage information using a computer system to enable shared servicing of said plurality of mortgages;

selecting and grouping at least a portion of said plurality of mortgages for securitization of said selected and grouped portion of said plurality of mortgages;

electronically associating at least one user group with the plurality of mortgages, wherein the associated user group defines at least one critical loan field for the plurality of mortgages;

tracking collateral information related to the underlying collateral of said mortgage associated with said mortgage information using the computer system;

tracking cash flow information associated with said collateral information included within said mortgage information using the computer system, including:
  rolling together cash flow information at a loan level to interface the cash flow information with a general ledger, and
  rolling together cash flow information by at least one criterion selected from the group consisting of date, company, department, and cost center;

storing a set of business rules in an electronic database, said set of business rules being configured for application to said mortgage information, wherein each business rule comprises discrete components stored in separate tables, wherein the discrete components comprise (i) a rule name and description, (ii) a rule operand, (iii) a rule operator, and (iv) an operand object type, said database being operatively associated with said data model; and, allowing said plurality of participants to electronically access said mortgage information using the computer system from origination of said plurality of mortgages to disposition of said plurality of mortgages, wherein the origination begins when a potential borrower requests a loan, and wherein the disposition occurs upon expiration of the mortgage or upon full payment of the mortgage.

2. The method of claim 1, wherein said set of business rules includes a plurality of business objects associated with ownership of at least a portion of said plurality of mortgages.

3. The method of claim 1, further comprising storing said mortgage information in said data model in substantially real time.

4. The method of claim 1, wherein said data model includes a plurality of data tables.

5. The method of claim 1, further comprising using an asset management module included within said data model for managing at least one asset management activity associated with said plurality of mortgages, wherein said management activity comprises at least one of loan covenant tracking, disbursement of escrows, and third party reports.

6. The method of claim 1, further comprising using a contractor module included within said data model for receiving data related to said plurality of mortgages from at least one entity external with respect to said servicing entity.

7. The method of claim 1, further comprising communicating at least a portion of said mortgage information to a web server.

8. The method of claim 7, further comprising accessing said mortgage information from said web server by employing an access device.

9. The method of claim 1, further comprising accessing said mortgage information using at least one graphical user interface.

10. The method of claim 1, further comprising performing at least one underwriting function in association with said mortgage information.

11. The method of claim 1, further comprising using an asset management module included within said data model for managing loan level information selected from the group consisting of loan write-ups, risks and mitigants, exceptions, rates and terms, prepayments, amortization, legal issues, and investor file contents.

12. The method of claim 1, further comprising using an asset management module included within said data model for managing borrower and guarantor financial statements associated with said plurality of mortgages.

13. The method of claim 1, further comprising using an asset management module included within said data model for managing loan covenant tracking associated with said plurality of mortgages.

14. The method of claim 1, further comprising using an asset management module included within said data model for managing prepayment penalty information associated with said plurality of mortgages.

15. The method of claim 1, further comprising using an asset management module included within said data model for managing rent rolls associated with said plurality of mortgages.

16. The method of claim 1, further comprising using an asset management module included within said data model for managing disbursement of escrows associated with said plurality of mortgages.

17. The method of claim 1, further comprising using an asset management module included within said data model for managing third party reports associated with said plurality of mortgages.

18. In a servicing entity, a system for managing commercial mortgages during a period from origination to disposition, said system comprising:
 an electronic computer system programmed to execute a data model stored in an electronic data storage medium;
 a data model configured for storing commercial mortgage information associated with a plurality of mortgages and configured for allowing a plurality of participants to access said commercial mortgage information to enable shared servicing of said plurality of mortgages;
 an electronic commercial mortgage management database operatively associated with said data model, said commercial mortgage management database configured for storing at least a portion of said commercial mortgage information;
 an electronic production and administration database operatively associated with said data model, said production and administration database configured for storing at least a portion of said commercial mortgage information, wherein said production and administration database includes:
  a loan information module configured for associating at least one user group with the plurality of mortgages, wherein the user group defines at least one critical loan field for the plurality of mortgages;
  a property information module configured for tracking collateral information associated with said commercial mortgage information using the computer system;
  a cash flow management module configured for tracking cash flow information related to collateral information included within said commercial mortgage information using the computer system, and further configured for rolling together cash flow information at a loan level to interface the cash flow information with a general ledger, and for rolling together cash flow information by at least one criteria selected from the group consisting of date, company, department, and cost center; and
  a securitization module configured for selecting and grouping at least a portion of said plurality of mortgages for securitization;
 at least one set of business rules stored on at least one of said commercial mortgage management database and said production and administration database, said set of business rules being configured for processing said commercial mortgage information, wherein each business rule comprises discrete components stored in separate tables, wherein the discrete components comprise (i) a rule name and description, (ii) a rule operand, (iii) a rule operator, and (iv) an operand object type; and,
 said data model being configured to allow said plurality of participants to electronically access said commercial mortgage information from origination of said plurality of mortgages to disposition of said plurality of mortgages, wherein the origination begins when a potential borrower requests a loan, and wherein the disposition occurs upon expiration of the mortgage or upon full payment of the mortgage.

19. The system of claim 18, further comprising a web server configured for enabling communication between said data model and an access device.

20. The system of claim 19, wherein said access device is configured to view at least one graphical user interface generated by said web server.

21. The system of claim 19, wherein said access device is selected from the group consisting of a desktop computer, a laptop, a workstation, and a personal data assistant.

22. The system of claim 18, wherein said production and administration database includes at least a loan information module configured for tracking said commercial mortgage information.

23. The system of claim 18, wherein said production and administration database includes at least a stages/status module.

24. The system of claim 18, wherein said production and administration database includes at least an underwriting module configured for performing at least one underwriting function associated with said commercial mortgage information.

25. The system of claim 18, further including an asset management module operatively associated with at least one of said databases, said asset management module configured for managing at least one asset management activity associated with said commercial mortgage information.

26. The system of claim 18, further including a contractor module operatively associated with at least one of said databases, said contractor module configured for receiving data related to said commercial mortgage information from at least one entity external with respect to said servicing entity.

27. A computer-readable medium including instructions for performing a method for managing commercial, mortgages, said method comprising:
 storing information associated with a plurality of mortgages in a data model in an electronic data storage medium;
 allowing a plurality of participants to electronically access said mortgage information using a computer system to enable shared servicing of said plurality of mortgages;

associating at least one user group with the plurality of mortgages, wherein the associated user group defines at least one critical loan field for the plurality of mortgages;

selecting and grouping at least a portion of said plurality of mortgages for securitization of said selected and grouped portion of said plurality of mortgages;

tracking collateral information related to the underlying collateral of said mortgage associated with said mortgage information using the computer system;

tracking cash flow information associated with said collateral information included within said mortgage information using the computer system, including:
  rolling together cash flow information at a loan level to interface the cash flow information with a general ledger, and
  rolling together cash flow information by at least one criterion selected from the group consisting of date, company, department, and cost center;

storing a set of business rules in an electronic database, said set of business rules being configured for application to said mortgage information, wherein each business rule comprises discrete components stored in separate tables, wherein the discrete components comprise (i) a rule name and description, (ii) a rule operand, (iii) a rule operator, and (iv) an operand object type, said database being operatively associated with said data model; and, allowing said plurality of participants to electronically access said mortgage information using the computer system from origination of said plurality of mortgages to disposition of said plurality of mortgages, wherein the origination begins when a potential borrower requests a loan, and wherein the disposition occurs upon expiration of the mortgage or upon full payment of the mortgage.

28. In a servicing entity, a computer-assisted method for managing commercial mortgages, said method comprising:

storing information associated with a plurality of mortgages in a data model in an electronic data storage medium;

allowing a plurality of participants to electronically access said mortgage information using a computer system to enable shared servicing of said plurality of mortgages;

storing a set of business rules in a database, said set of business rules being configured for application to said mortgage information, wherein each business rule comprises discrete components stored in separate tables, wherein the discrete components comprise (i) a rule name and description, (ii) a rule operand, (iii) a rule operator, and (iv) an operand object type, said database being operatively associated with said data model;

allowing said plurality of participants to electronically access said mortgage information using the computer system from origination of said plurality of mortgages to disposition of said plurality of mortgages, wherein the origination begins when a potential borrower requests a loan, and wherein the disposition occurs upon expiration of the mortgage or upon full payment of the mortgage;

performing at least one underwriting function in association with said mortgage information;

selecting and grouping at least a portion of said plurality of mortgages for securitization of said selected and grouped portion of said plurality of mortgages;

tracking collateral information associated with said mortgage information using the computer system;

tracking cash flow information associated with said collateral information included within said mortgage information using the computer system, including rolling together cash flow information at a loan level to interface the cash flow information with a general ledger, and rolling together cash flow information by at least one criteria selected from the group consisting of date, company, department, and cost center;

electronically associating at least one user group with the plurality of mortgages, wherein the associated user group defines at least one critical loan field for the plurality of mortgages;

using an asset management module included within said data model for managing at least one asset management activity associated with said plurality of mortgages, wherein said management activity comprises at least one of loan covenant tracking, disbursement of escrows, and third party reports.

29. In a servicing entity, a computer-assisted method for managing commercial mortgages, said method comprising:

storing information associated with a plurality of mortgages in a data model in an electronic data storage medium;

allowing a plurality of participants to electronically access said mortgage information using a computer system to enable shared servicing of said plurality of mortgages;

storing a set of business rules in an electronic database, said set of business rules being configured for application to said mortgage information, wherein each business rule comprises discrete components stored in separate tables, wherein the discrete components comprise (i) a rule name and description, (ii) a rule operand, (iii) a rule operator, and (iv) an operand object type, said database being operatively associated with said data model;

allowing said plurality of participants to electronically access said mortgage information using the computer system from origination of said plurality of mortgages to disposition of said plurality of mortgages, wherein the origination begins when a potential borrower requests a loan, and wherein the disposition occurs upon expiration of the mortgage or upon full payment of the mortgage;

performing at least one underwriting function in association with said mortgage information;

selecting and grouping at least a portion of said plurality of mortgages for securitization of said selected and grouped portion of said plurality of mortgages;

electronically associating at least one user group with the plurality of mortgages, wherein the associated user group defines at least one critical loan field for the plurality of mortgages;

tracking collateral information and cash flow information associated with said mortgage information using the computer system, wherein tracking cash flow information includes rolling together cash flow information at a loan level to interface the cash flow information with a general ledger, and rolling together cash flow information by at least one criteria selected from the group consisting of date, company, department, and cost center; and managing at least one asset management activity associated with said plurality of mortgages with an asset management module included within said data model, wherein said management activity comprises at least one of loan covenant tracking, disbursement of escrows, and third party reports.

\* \* \* \* \*